(12) United States Patent
Ashikaga et al.

(10) Patent No.: US 7,012,773 B2
(45) Date of Patent: Mar. 14, 2006

(54) DISK DEVICE AND DISK MEDIUM, IN WHICH A PLURALITY OF SERVO CYLINDERS FORMED CONCENTRICALLY FROM THE INNER DIAMETRICAL PORTION TO THE OUTER DIAMETRICAL PORTION OF AT LEAST ONE DISK ARE DIVIDED INTO PREDETERMINED AREAS

(75) Inventors: Hiroshi Ashikaga, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 147 days.

(21) Appl. No.: 10/357,105

(22) Filed: Feb. 3, 2003

(65) Prior Publication Data
US 2003/0197964 A1 Oct. 23, 2003

(30) Foreign Application Priority Data
Apr. 18, 2002 (JP) ............................. 2002-116600

(51) Int. Cl.
G11B 5/09 (2006.01)
G11B 5/596 (2006.01)

(52) U.S. Cl. .................. 360/48; 360/77.08; 360/78.14

(58) Field of Classification Search .................. 360/39, 360/40, 46, 48, 77.08, 78.14

See application file for complete search history.

(56) References Cited

U.S. PATENT DOCUMENTS

| | | | |
|---|---|---|---|
| 5,684,651 A | 11/1997 | Yaegashi et al. | 360/77.08 |
| 6,084,738 A | 7/2000 | Duffy | 360/75 |
| 6,178,056 B1 | 1/2001 | Cloke et al. | 360/46 |
| 6,278,568 B1 * | 8/2001 | Cloke et al. | 360/51 |

FOREIGN PATENT DOCUMENTS

| | | |
|---|---|---|
| JP | 3-120968 | 6/1991 |
| JP | 5-94674 | 4/1993 |
| JP | 5-174516 | 7/1993 |
| JP | 10-255416 | 9/1998 |
| JP | 2973247 | 9/1999 |

* cited by examiner

Primary Examiner—David Hudspeth
Assistant Examiner—Daniell L. Negrón
(74) Attorney, Agent, or Firm—Greer, Burns & Crain, Ltd.

(57) ABSTRACT

A disk device and a disk medium are disclosed in which a plurality of servo cylinders on the surface of at least one disk are divided into several areas, and a different servo signal frequency is set and recorded for each of the areas. The servo cylinders are divided into predetermined areas, and a different servo signal frequency for each of the areas is set so that the recording density of the servo signal recorded in the disk can be set so as to allow the servo signal demodulation characteristic to be included in a relatively superior range. In the disk device, the boundary between the area of a first servo signal frequency and the area of a second servo signal frequency adjoining the first servo signal frequency area is preferably formed with an area in which a servo signal pattern written with the first servo signal frequency and a servo signal pattern written with the second servo signal frequency are arranged on the same servo cylinders.

18 Claims, 40 Drawing Sheets

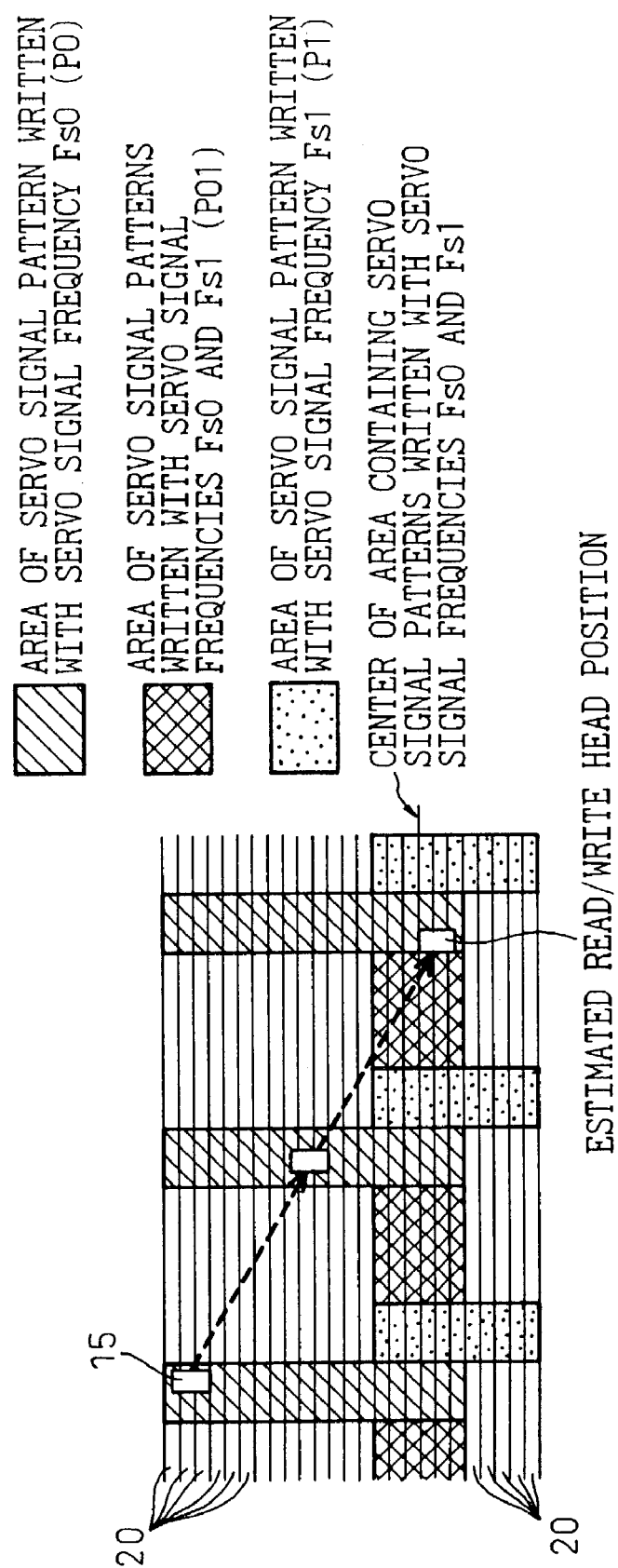

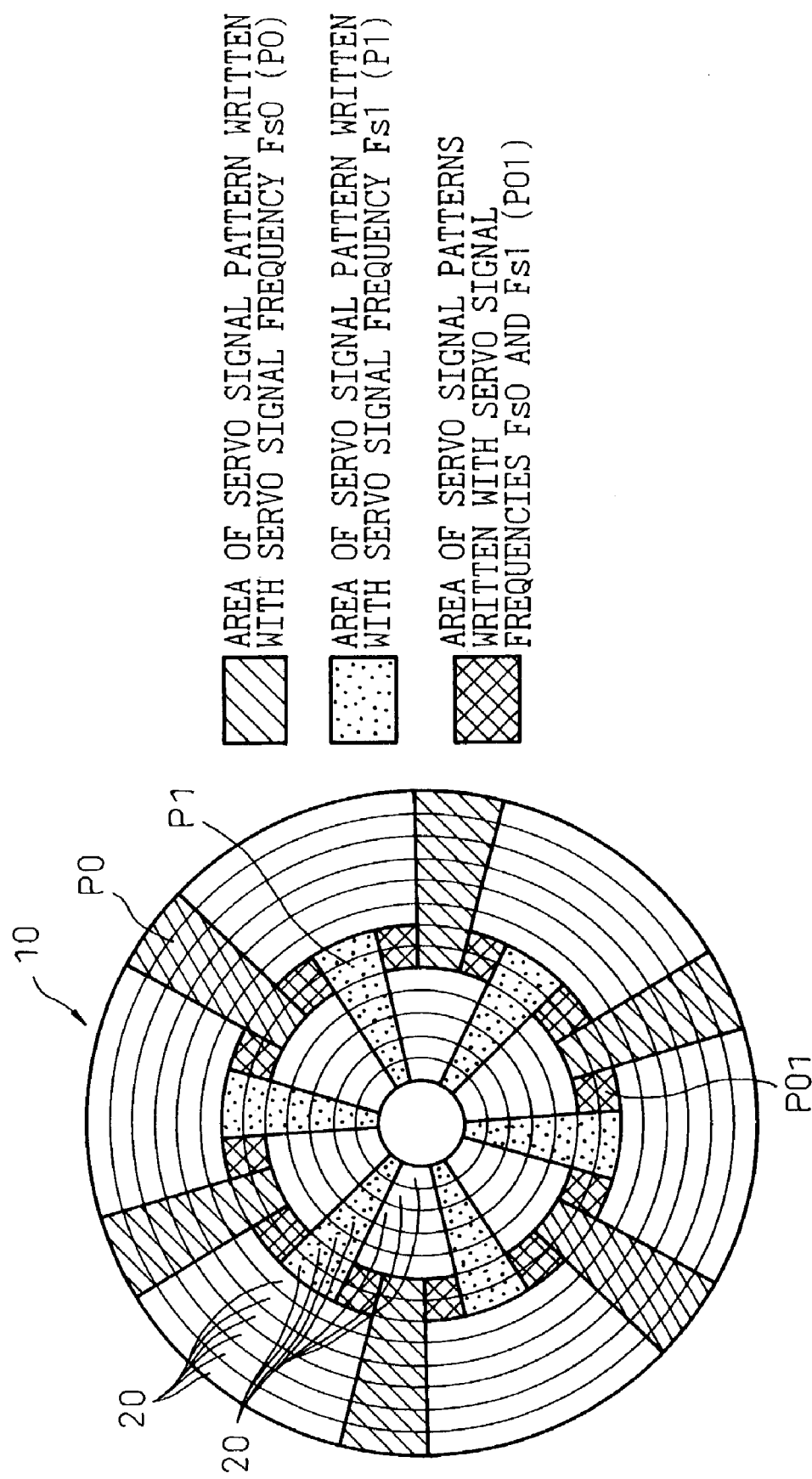

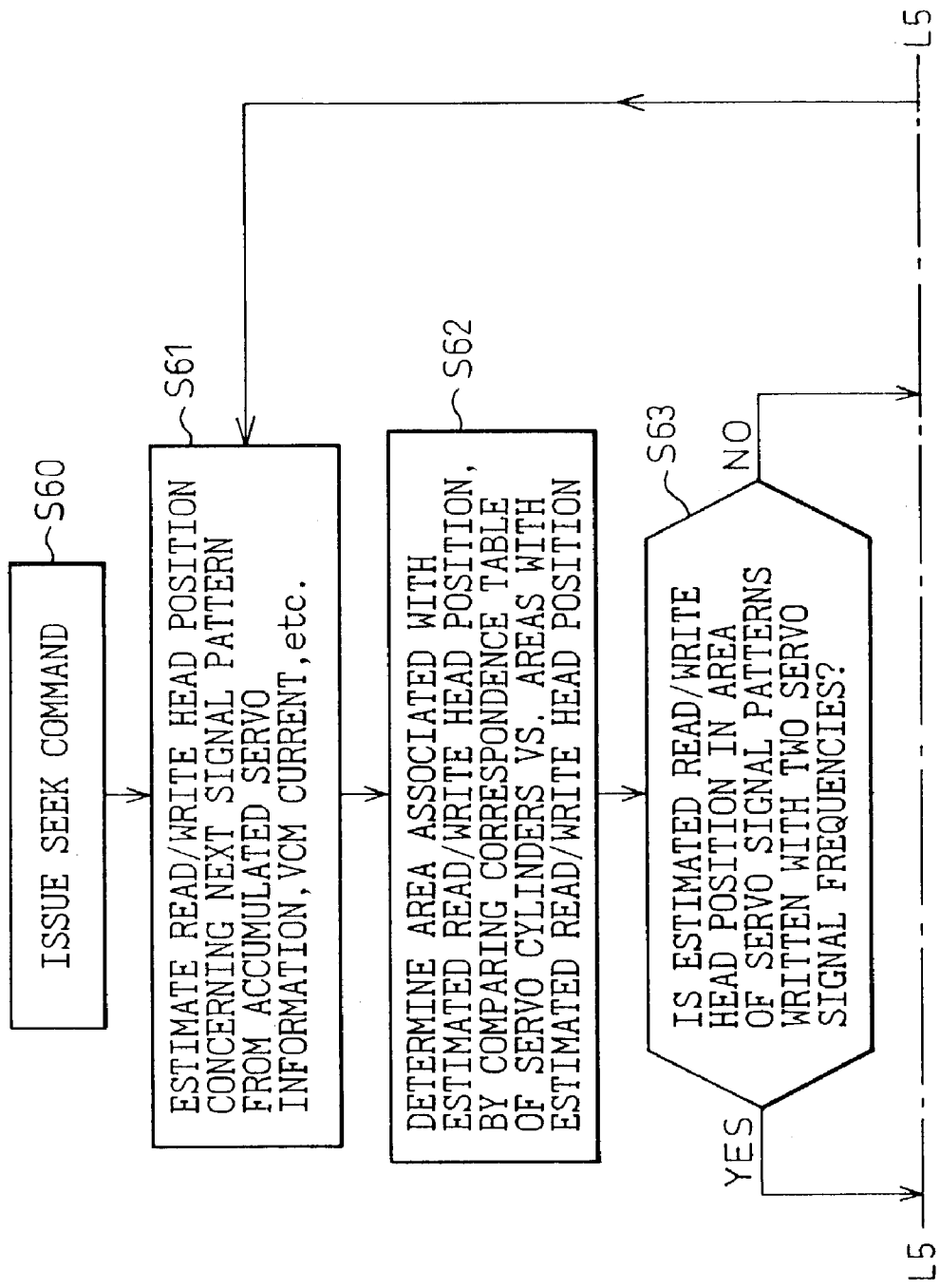

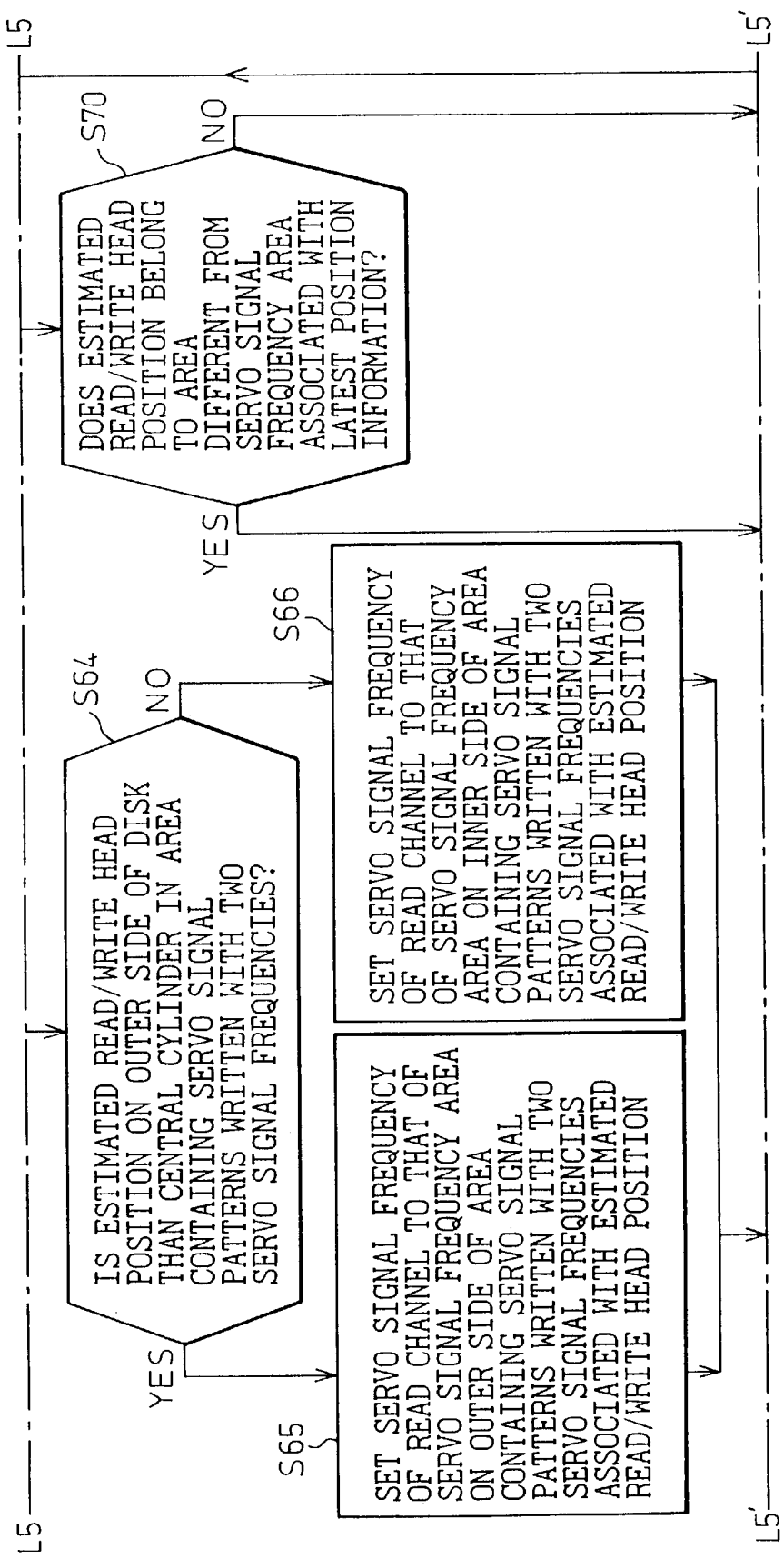

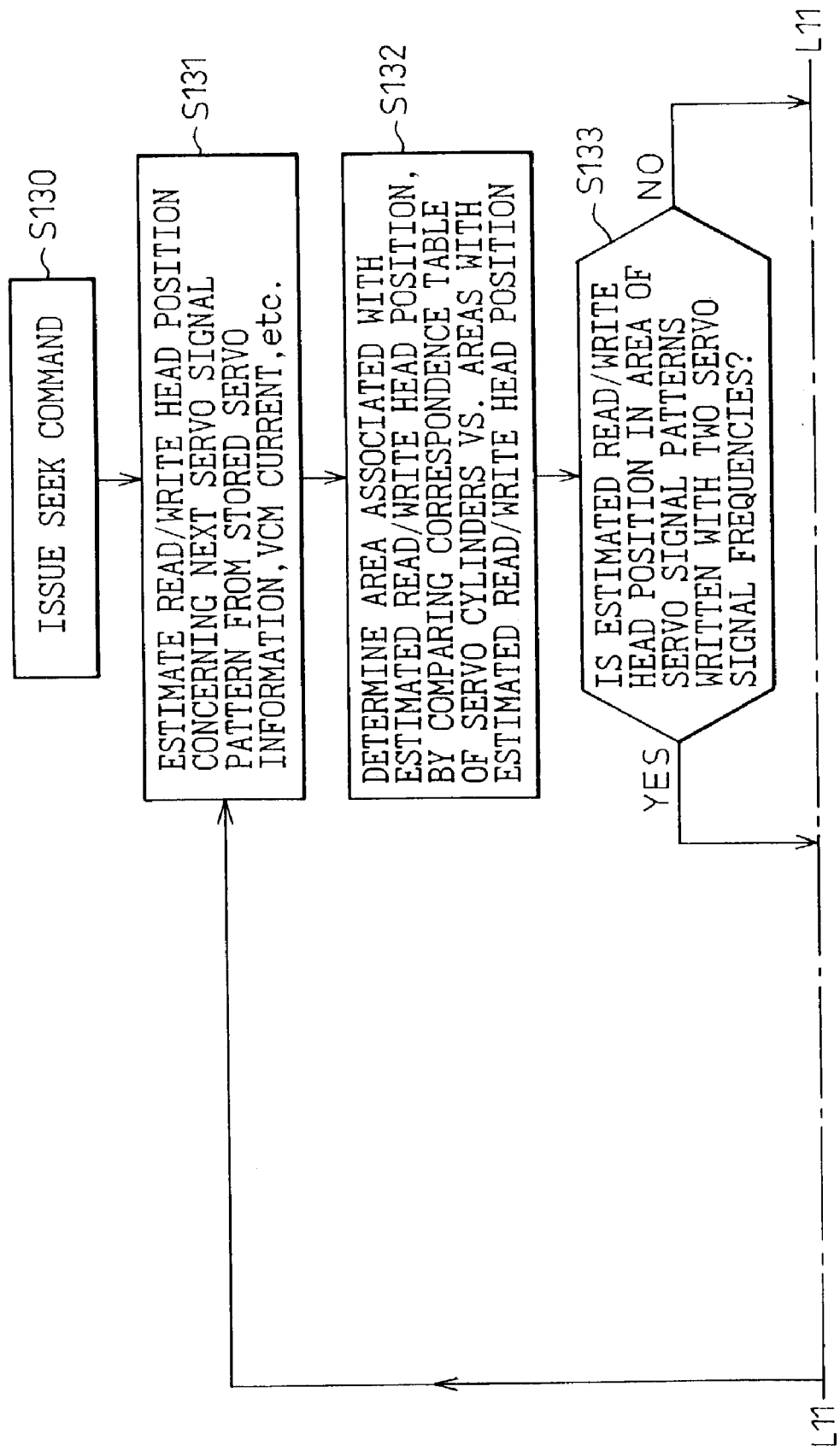

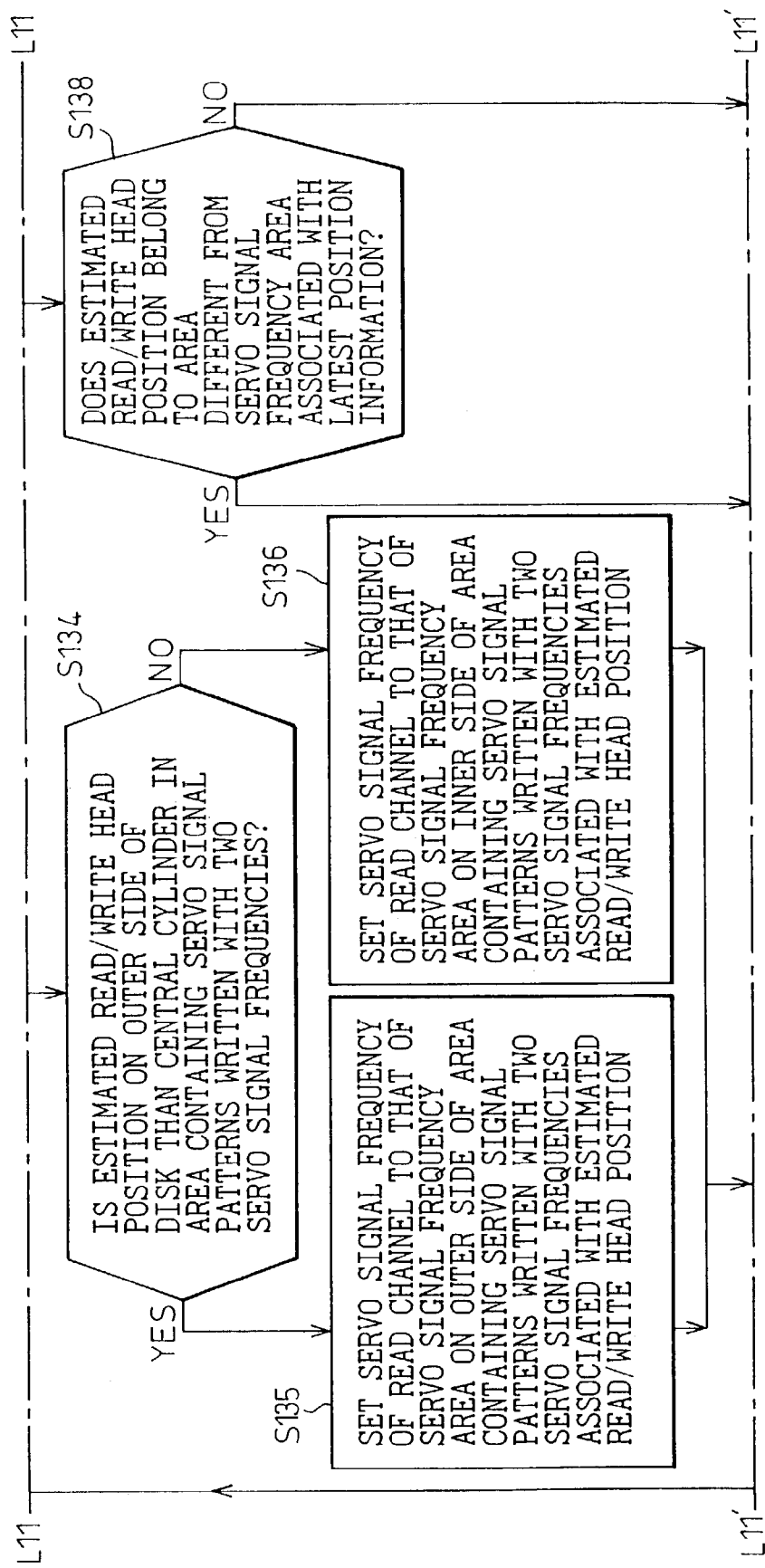

DISK DEVICE AND DISK MEDIUM, IN WHICH A PLURALITY OF SERVO CYLINDERS FORMED CONCENTRICALLY FROM THE INNER DIAMETRICAL PORTION TO THE OUTER DIAMETRICAL PORTION OF AT LEAST ONE DISK ARE DIVIDED INTO PREDETERMINED AREAS

BACKGROUND OF THE INVENTION

1. Field of the Invention

The present invention relates to a disk device, and a disk medium, in which a plurality of servo cylinders formed concentrically from the inner diametrical portion to the outer diametrical portion of at least one disk, such as a magnetic disk, are divided into several areas, and a different servo signal frequency is set for each of these areas and recorded in advance.

A disk rotatably set on a disk device, such as a magnetic disk device, may be removable from the disk device as in the case in which it is used as a single sheet of a disk of servo track writer (STW). In such a case, the disk may be shipped independently with servo signal patterns written in the servo cylinders. This disk (or a plurality of disks) is generally called "a disk medium" (or "disk media").

2. Description of the Related Art

In order to facilitate the understanding of the problems of a disk device with servo signal patterns arranged according to the prior art, the configuration and the operation of a disk device with ordinary servo signal patterns arranged thereon will be explained with reference to FIGS. 1 to 6 that will be described later in the section "BRIEF DESCRIPTION OF THE DRAWINGS" herein.

A schematic diagram, showing an example of an arrangement of a conventional servo signal patterns, is illustrated in FIG. 1. Further, a diagram showing the relationship between magnetization reversal patterns of the servo signal recorded with a predetermined servo signal frequency and the reproduced servo signal waveform, is illustrated in FIG. 2.

As shown in FIG. 1, the servo signal pattern SSP of a conventional magnetic disk device is generally recorded with a predetermined fundamental servo signal frequency in a plurality of servo cylinders 200 formed concentrically from the inner diametrical portion to the outer diametrical portion of a disk 100. As a result, each area of the servo signal patterns is arranged sectorially on the disk 10.

The "the servo cylinder" is defined as an aggregate of a plurality of servo tracks (i.e., a cylinder of a plurality of servo tracks) of a plurality of disks arranged in a stacked form, on which the servo signal patterns are embedded in advance and which are arranged in vertical direction so that an access to these servo tracks can be made simultaneously by using a plurality of read/write heads.

The disks 100 of the magnetic disk device are rotated at a constant rate and, therefore, the distance in which each disk is moved by the rotation of each disk in the outer diametrical portion of each disk (outer side) is longer than that in the inner diametrical portion (inner side) of each disk, within the same time length. In the case in which servo signal patterns of the same number of bits are recorded with a predetermined servo signal frequency by using a read/write head 500 suspended by an arm 400, therefore, the servo signal pattern on the outer side occupies a larger area than that on the inner side. In other words, the recording density of the servo signal pattern on the outer side tends to be smaller than the recording density of the servo signal pattern on the inner side.

In view of this, a variable servo signal frequency recording system described later has been conceived of as a conventional technique in which the recording operation is carried out with a higher servo signal frequency for the servo cylinders on the outer side than that for the servo cylinders on the inner side thereby to relatively reduce the area occupied by the servo signal pattern on the outer side.

Generally, in the case in which the servo signal patterns are recorded with a predetermined servo signal frequency for a plurality of servo cylinders on the surface of the disk, as shown in FIG. 2, the reproduced servo signals each having the different waveform are generated from the magnetization reversal patterns of the servo signal, even though the same servo signal frequency is used, among the outer side (outer diametrical portion), the center side (intermediate portion) and the inner side (inner diametrical portion). The reason for this is that, in fact, the recording density of the servo signal patterns is relatively high on the inner side and relatively low on the outer side, so that the waveforms of the reproduced servo signals are different from each other, in spite of the fact that the same servo signal patterns are written.

In the read channel for demodulating the servo information from the servo signal waveforms, therefore, as shown in the graph of FIG. 3, the servo signal error rate of the gray code having the servo cylinder information in an ordinate of the graph is varied with the recording density of the servo signal patterns (i.e., servo signal pattern density in an abscissa of the graph). In order to use a disk device having a comparatively superior characteristic of the servo signal error rate of the gray code, the recording density of the servo signal patterns is required to be substantially constant.

From this viewpoint, the employment of a conventional system of a variable servo signal frequency type, in which the servo signal patterns are recorded by changing the servo signal frequency from the inner side of the disk to the outer side of the disk, is expected to maintain a substantially constant recording density of the servo signal patterns and thus to improve the servo signal error rate of the gray code.

A schematic diagram showing an example of a layout of the servo signal patterns used in the prior art described above, is illustrated in FIG. 4. Among various examples according to the prior art, examples of the layout of the servo signal patterns, in which some representative conventional systems of a variable servo signal frequency type are employed, will be described below (please refer to Japanese Unexamined Patent Publication (Kokai) Nos. 3-130968, 5-174516, 5-94674, and 10-255416 and Japanese Patent No. 2973247, if necessary). In the example shown in FIG. 4, a plurality of servo cylinders 200 of a disk 100 are divided into three areas (PP0, PP1 and PP2) from the inner side to the outer side, and servo signal patterns are recorded with different servo signal frequencies (Fs0, Fs1 and Fs2) in each area.

A schematic diagram showing an example of the locus of the read/write head, in which the estimated position of the read/write head contains an error, according to the conventional system of a variable servo signal frequency type, is illustrated in FIG. 5. Further, a diagram showing the reproduced servo signal waveforms in the boundaries between different servo signal patterns according to the conventional system of a variable servo signal frequency type, is illustrated in FIG. 6.

As far as the function of the currently-employed servo signal demodulation for the read channel is concerned, any other servo signals than the servo signal of the given servo signal frequency which is set in advance so as to have the function of the servo signal demodulation, cannot be accurately demodulated. Although there also exists a read channel that is capable of demodulating a servo signal of a servo signal frequency deviating from the given servo signal frequency which is set in advance so as to have the function of servo signal demodulation, the tolerable range of the frequency deviation from the given servo signal frequency is very narrow.

In the case in which the conventional system of a variable servo signal frequency type is employed, therefore, the servo signal frequency for the read channel is required to be set beforehand, with respect to the change in the servo signal frequency of the given servo signal pattern read by the read/write head 500. In order to set the servo signal frequency beforehand, the position of the read head at the time of reading the next servo signal pattern is estimated by using the servo information thus far demodulated.

When the read/write head carries out the seek operation, the position of the read/write head at the time of reading the next servo signal pattern is estimated. No problem would occur if the estimated position is always estimated accurately.

Assume that the value of the estimated position contains an error such that, for example, the estimated position of the read/write head is in the neighborhood of the boundary (B01) between the area PP0 of the servo signal pattern written with the first servo signal frequency Fs0 and the area PP1 of the servo signal pattern written with the second servo signal frequency Fs1. In the case in which the area actually reached by the read/write head and the area associated with the estimated position of the read/write head are different from each other, a servo signal frequency different from the servo signal frequency of the area actually reached by the read/write head is undesirably set for the read channel, thereby leading to the problem that it becomes impossible to demodulate the servo information.

More specifically, while several servo signal patterns are read during a low-speed seek operation, assume that the read/write head passes through the neighborhood of the boundary between the area of the servo signal pattern written with the first servo signal frequency and the area of the servo signal pattern written with the second servo signal frequency adjoining the first area. In the case in which the estimated position of the read/write head contains an error, the area of the servo signal frequency associated with the estimated position of the read/write head and the area of the servo signal frequency associated with the actual position of the read/write head are different from each other. Thus, the setting of the servo signal frequency of the read channel is different from the servo signal frequency of the servo signal actually read, and therefore, the servo signal cannot be demodulated.

Further, when reading the next servo signal pattern, the position of the read/write head is estimated in the absence of accurate position information about the read/write head for the latest read operation. Therefore, the estimated locus containing an error is estimated again. As a result, an inaccurate servo signal frequency, which is different from that associated with the actual position of the read/write head, is set.

Assume that the actual position of the read/write head and the estimated position of the read/write head is moved as shown in FIG. 5. Once the servo signal frequency for the read channel is erroneously set to the value for the area different from the actual position of the read/write head, the servo signal frequency continuously fails to be set and the servo signal often cannot be demodulated, thereby causing a seek error undesirably.

When the read/write head is positioned on the track (i.e., positioned in an on-track condition) in the boundary between the areas of the servo signal patterns written with different servo signal frequencies, the servo signal patterns of the adjoining different servo signal frequencies are read simultaneously. Therefore, the waveform read by the read/write head, as shown in FIG. 6, is composed by a combination of the reproduced servo waveforms of the adjoining two areas.

In the case in which the servo signal frequency Fs0 is set for the read channel at this time, the component of the servo signal written with the servo signal frequency Fs1 in the servo signals that have been read makes up noise. This noise is greatly correlated with the servo signal of the servo signal frequency Fs0. Thus, the error rate of the servo signal of the servo signal frequency Fs0 is deteriorated, and demodulation errors frequently occurs, thereby leading to the problem that the read/write head cannot be positioned on the track in an accurate position.

SUMMARY OF THE INVENTION

The prevent invention has been achieved in view of the problems described above, and the object thereof is to provide a disk device and a disk medium in which, during the seek operation of the read/write head, the position of the read/write head at the time of reading the next servo signal pattern is accurately estimated, thereby making it possible to accurately demodulate the servo signals in the actual positions of the read/write head over the whole areas ranging from the inner diametrical portion to the outer diametrical portion of the disk.

In order to solve the problems described above, according to the present invention, there is provided a disk device, in which a plurality of servo cylinders formed concentrically from the inner diametrical portion to the outer diametrical portion of at least one disk are divided into predetermined areas, and different servo signal frequencies are set for the divided predetermined areas, respectively, and a servo signal pattern corresponding to the servo signal frequency set for each area is formed in each area, and the servo signal frequency set for each area is stored in advance, and in which a plurality of the servo cylinders are divided into predetermined areas, and at the same time, the servo signal frequency for each area is set so that the recording density of the servo signal recorded on the disk can be set so as to allow the demodulation characteristic of the servo signal to be included in a relatively superior range.

According to one preferred embodiment of the present invention, there is provided a disk device, in which a plurality of servo cylinders formed concentrically from the inner diametrical portion to the outer diametrical portion of at least one disk are divided into predetermined areas, and different servo signal frequencies are set for the divided predetermined areas, respectively, and a servo signal pattern corresponding to the servo signal frequency set for each area is formed in each area, and the servo signal frequency set for each area is stored in advance, and in which the boundary between the area of a first servo signal frequency and the area of a second servo signal frequency adjoining the area of the first servo signal frequency is formed with an area in which a servo signal pattern written with the servo signal frequency of the first servo signal frequency area and a servo signal pattern written with the second servo signal frequency of the second servo signal frequency area are arranged on the same servo cylinders.

Preferably, the disk device according to this embodiment of the present invention is configured so that, among the servo signal patterns arranged in the servo signal frequency areas and the servo signal patterns arranged in the area in which the servo signal patterns written by two different servo signal frequencies are arranged on the same servo cylinders, the servo signal patterns having the same servo signal frequency are arranged in the head portions on the same cylinders so as to make the servo signal patterns in phase with each other.

According to another preferred embodiment of the present invention, there is provided a disk device, in which a plurality of servo cylinders formed concentrically from the inner diametrical portion to the outer diametrical portion of at least one disk are divided into predetermined areas, and different servo signal frequencies are set for the divided predetermined areas, respectively, and a servo signal pattern corresponding to the servo signal frequency set for each area is formed in each area, and the servo signal frequency set for each area is stored in advance, and in which a servo signal pattern written with a servo signal frequency set in the area of a first servo signal frequency, and either a servo signal pattern written with a servo signal frequency set in the area of a second servo signal frequency adjoining the area of the first servo signal frequency or a servo signal pattern written with a servo signal frequency set in the area of a third servo signal frequency adjoining the area of the first servo signal frequency, are formed in the area of the first servo signal frequency on the same servo cylinders.

According to still another preferred embodiment of the present invention, there is provided a disk device, in which a plurality of servo cylinders formed concentrically from the inner diametrical portion to the outer diametrical portion of at least one disk are divided into predetermined areas, and different central servo signal frequencies are set for the divided predetermined areas, respectively, and a servo signal pattern corresponding to the central servo signal frequency set for each area is arranged in each area, and the central servo signal frequency set for each area is stored in advance, and in which a servo signal pattern with a different servo signal frequency for each of the servo cylinders is formed around the central servo signal frequency that is set for each area, in such a way that the recording density of the servo signal recorded on the disk is adjusted so as to allow the servo signal demodulation characteristic to be included in a relatively superior range.

According to yet another preferred embodiment of the present invention, there is provided a disk device, in which a plurality of servo cylinders formed concentrically from the inner diametrical portion to the outer diametrical portion of at least one disk are divided into several areas, and different servo signal frequencies are set for different areas thus divided, respectively, and the servo signal pattern of a servo signal frequency set for each area is formed in each area, and the servo signal patterns written with a single servo signal frequency are formed from the inner diametrical portion to the outer diametrical portion of the disk on the same servo cylinders.

According to a further preferred embodiment of the present invention, there is provided a disk medium, in which a plurality of servo cylinders formed concentrically from the inner diametrical portion to the outer diametrical portion of a disk surface are divided into predetermined areas, and different servo signal frequencies are set for the divided predetermined areas, respectively, and the servo signal pattern of the servo signal frequency set for each area is formed in each area, and in which the boundary between the area of a first servo signal frequency and the area of a second servo signal frequency adjoining the area of the first servo signal frequency is formed with an area in which a servo signal pattern written with the servo signal frequency of the first servo signal frequency area and a servo signal pattern written with the servo signal frequency of the second servo signal frequency area are arranged on the same servo cylinders.

According to a still further preferred embodiment of the present invention, there is provided a disk medium, in which a plurality of servo cylinders formed concentrically from the inner diametrical portion to the outer diametrical portion of a disk surface are divided into predetermined areas, and different servo signal frequencies are set for the divided predetermined areas, respectively, and a servo signal pattern of the servo signal frequency set for each area is formed in each area, and in which a servo signal pattern written with a servo signal frequency set in the area of a first servo signal frequency, and either a servo signal pattern written with a servo signal frequency set in the area of a second servo signal frequency adjoining the first servo signal frequency area or a servo signal pattern written with a servo signal frequency set in the area of a third servo signal frequency adjoining the first servo signal frequency area, are formed in the first servo signal frequency area on the same servo cylinders.

According to a yet further preferred embodiment of the present invention, there is provided a disk medium, in which a plurality of servo cylinders formed concentrically from the inner diametrical portion to the outer diametrical portion of a disk surface are divided into predetermined areas, and different central servo signal frequencies are set for the divided predetermined areas, respectively, and in which a servo signal pattern with a different servo signal frequency for each of the servo cylinders is formed around the central servo signal frequency that is set for each area in such a way that the recording density of the servo signals recorded on the disk is adjusted so as to allow the servo signal demodulation characteristic to be included in a relatively superior range.

According to a yet further preferred embodiment of the present invention, there is provided a disk medium, in which a plurality of servo cylinders formed concentrically from the inner diametrical portion to the outer diametrical portion of a disk surface are divided into several areas, and different servo signal frequencies are set for different areas thus divided, respectively, and a servo signal pattern of the servo signal frequency set for each area is formed in each area, and the servo signal patterns written with a single servo signal frequency are formed from the inner diametrical portion to the outer diametrical portion of the disk on the same servo cylinders.

In summary, according to the present invention, a plurality of servo cylinders are divided into several areas, and at the same time, a servo signal frequency is set for each of the areas in such a way that the recording density of the servo signals recorded from the inner diametrical portion to the outer diametrical portion of the disk is adjusted so as to allow the servo signal demodulation characteristic to be included in a relatively superior range. Thus, when the read/write head carries out the seek operation, the position of the read/write head at the time of reading the next servo signal pattern can be accurately estimated and the servo signals in the actual position of the read/write head can be accurately demodulated over the whole areas ranging from the inner diametrical portion to the outer diametrical portion of the disk.

Further, according to the present invention, a plurality of servo cylinders from the inner diametrical portion to the outer diametrical portion of a disk are divided into several areas, and the boundary between the area of a first servo signal frequency and the area of a second servo signal frequency adjoining the first servo signal frequency area is formed with an area in which a servo signal pattern written with the servo signal frequency of the first servo signal frequency area and a servo signal pattern written with the second servo signal frequency area are arranged on the same servo cylinders. When the read/write head carries out the seek operation, therefore, the position of the read/write head at the time of reading the next servo signal pattern can be accurately estimated, thereby making it possible to demodulate the servo signal with high quality regarding the demodulation characteristic of the servo signal.

BRIEF DESCRIPTION OF THE DRAWINGS

The above object and features of the present invention will be more apparent from the following description of the preferred embodiments with reference to the accompanying drawings, wherein:

FIG. 19 is a schematic diagram showing the estimated position of the read/write head according to the second embodiment of the present invention;

FIG. 20 is a diagram showing a layout of the servo signal patterns according to a third embodiment of the present invention;

FIG. 21 is a first part of the flowchart for explaining the seek operation according to the third embodiment of the present invention;

FIG. 22A is a second part of the flowchart for explaining the seek operation according to the third embodiment of the present invention;

FIG. 36 is a first part of the flowchart for explaining the seek operation according to the sixth embodiment of the present invention;

FIG. 37A is a second part of the flowchart for explaining the seek operation according to the sixth embodiment of the present invention;

DESCRIPTION OF THE PREFERRED EMBODIMENTS

The configurations and the operations of preferred embodiments of the present invention will be explained below, with reference to the accompanying drawings (FIGS. 7 to 38).

Figure 1:
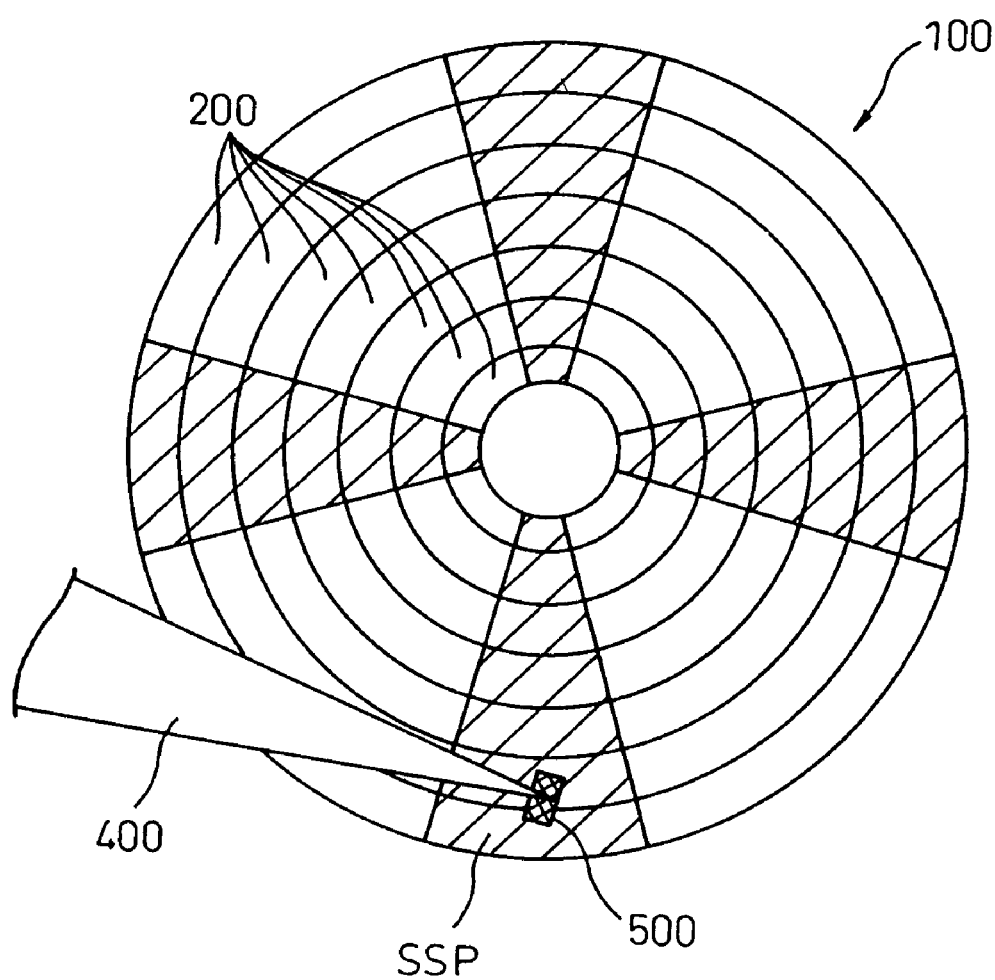
FIG. 1 is a schematic diagram showing an example of an arrangement of conventional servo signal patterns.
Figure 2:
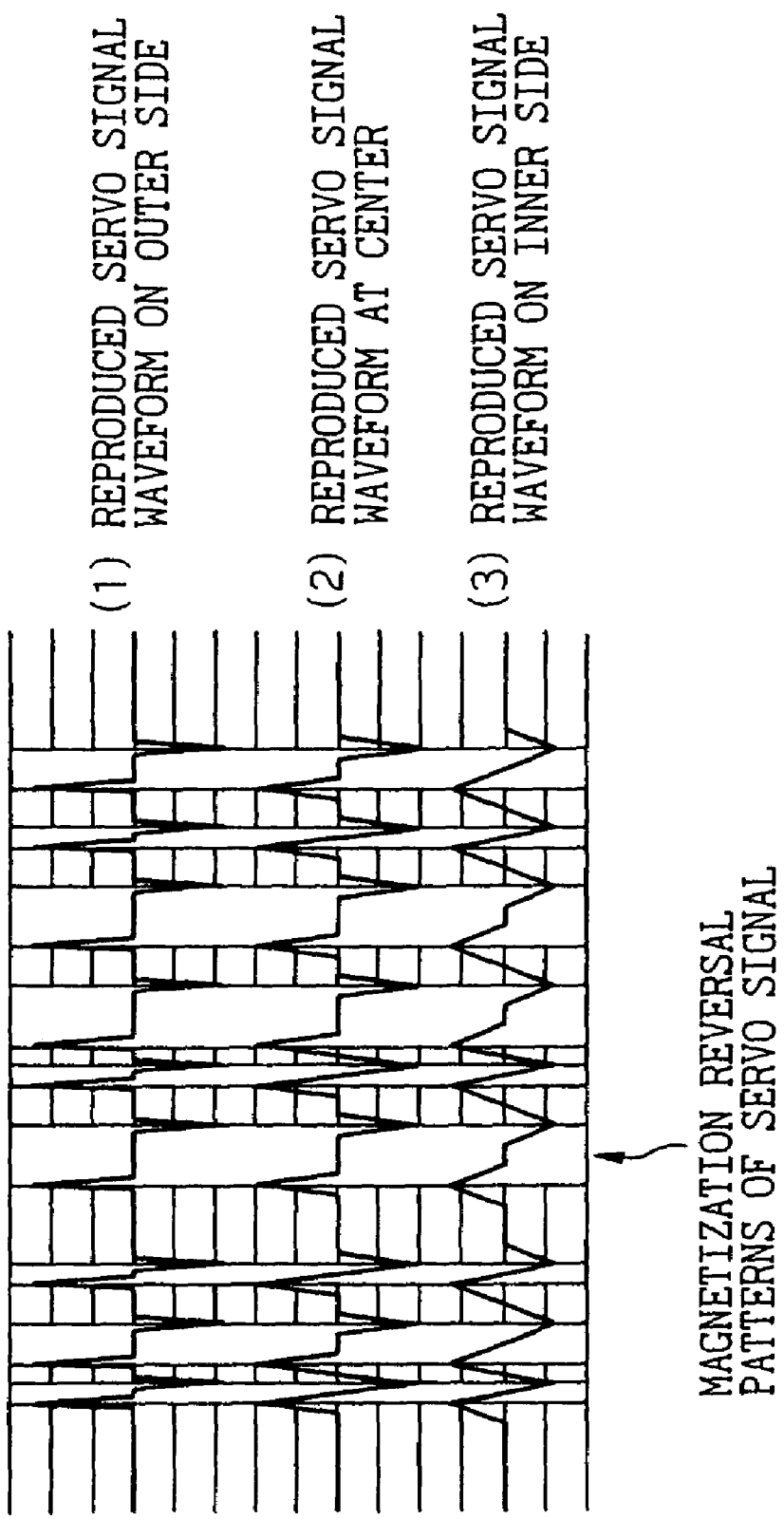
FIG. 2 is a diagram showing the relationship between magnetization reversal patterns of the servo signal recorded with a predetermined servo signal frequency and the reproduced servo signal waveforms.
Figure 3:
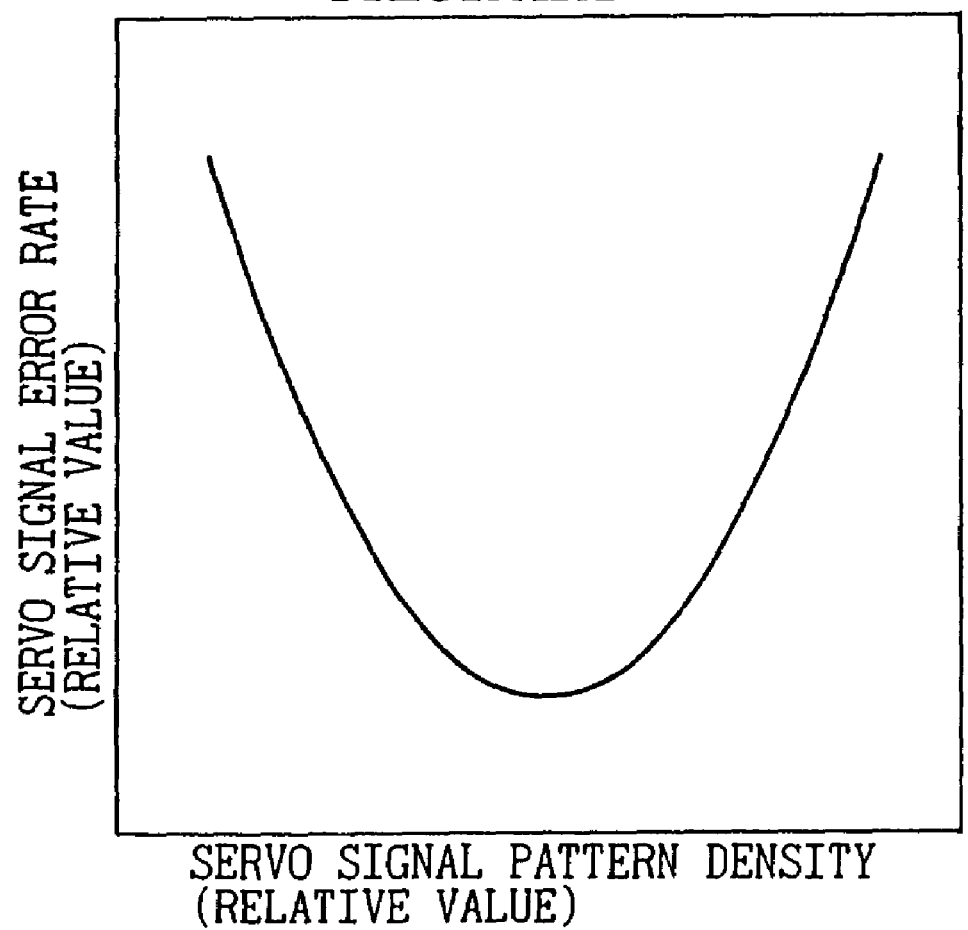
FIG. 3 is a graph showing the state in which the servo signal error rate varies with respect to the servo signal pattern density.
Figure 4:
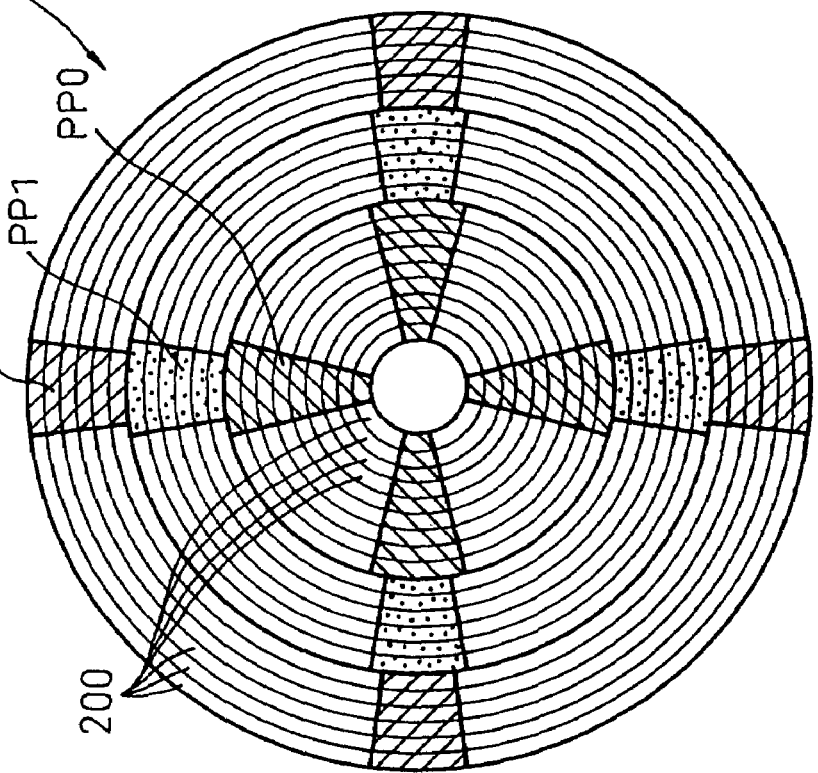
FIG. 4 is a schematic diagram showing an example of a layout of the servo signal patterns according to the prior art.
Figure 5:
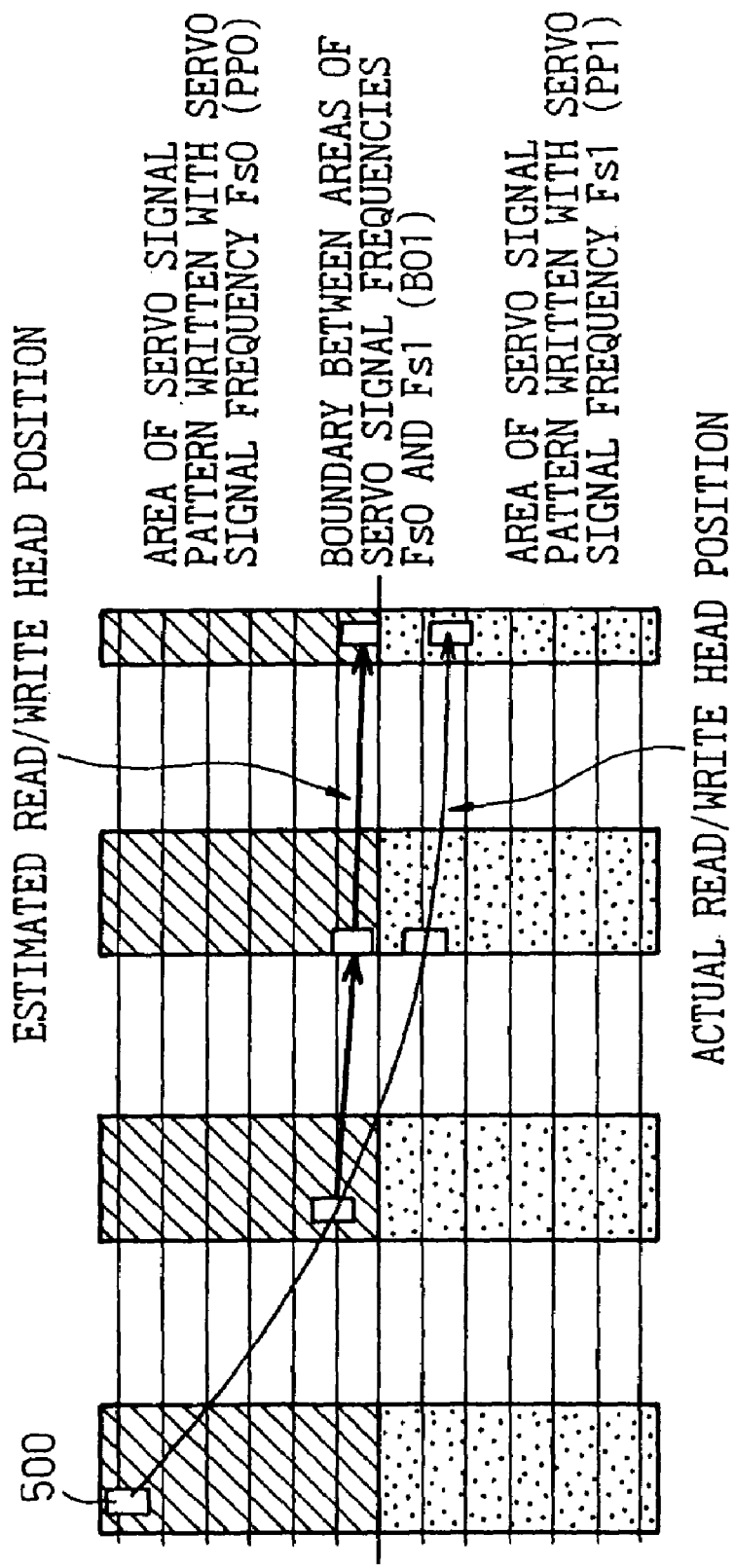
FIG. 5 is a schematic diagram showing an example of the locus of a read/write head, in which the estimated position of the read/write head contains an error according to a conventional system of a variable servo signal frequency type.
Figure 6:
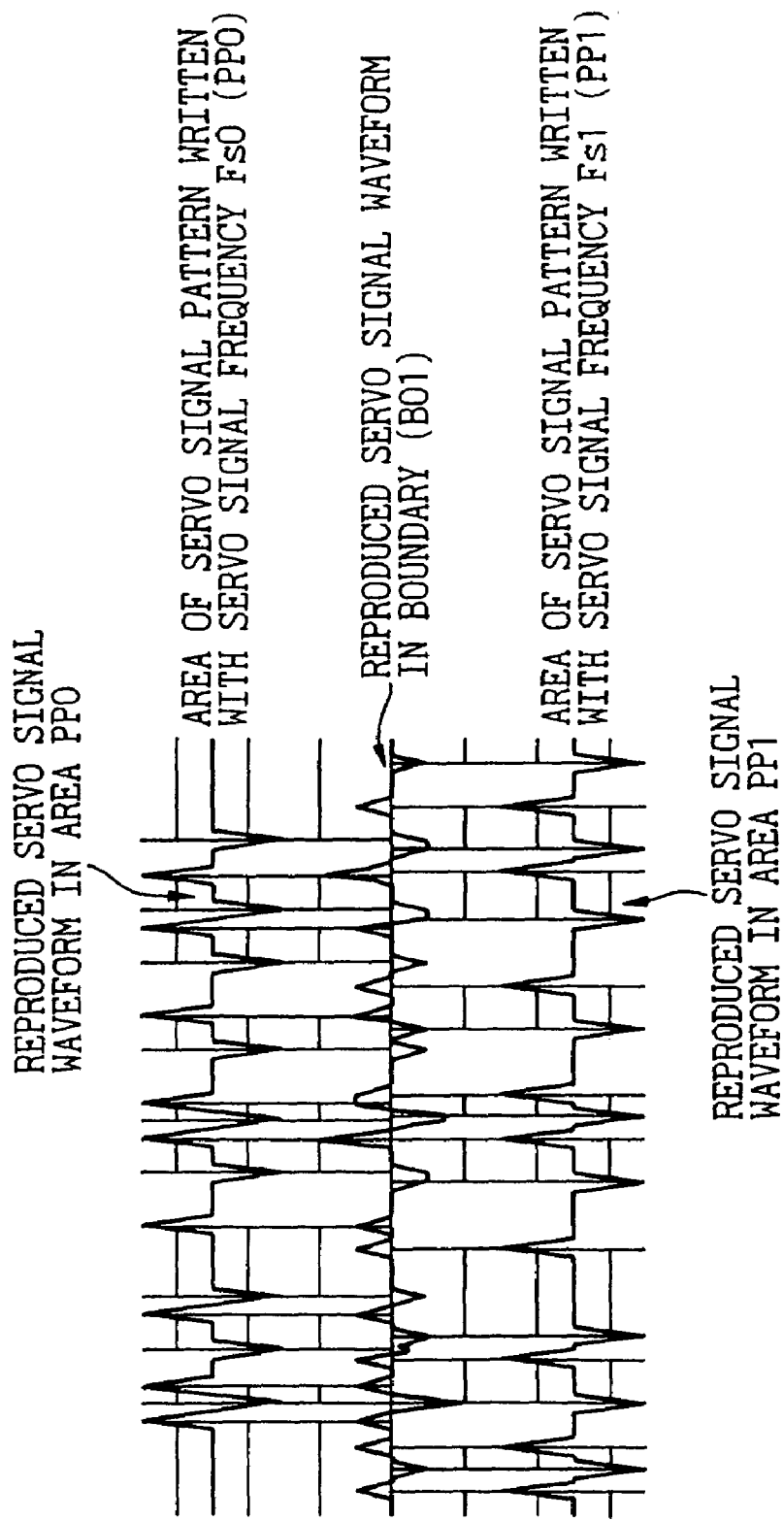
FIG. 6 is a diagram showing the reproduced servo signal waveform in the boundaries between different servo signal patterns according to the conventional system of a variable servo signal frequency type.
Figure 7:
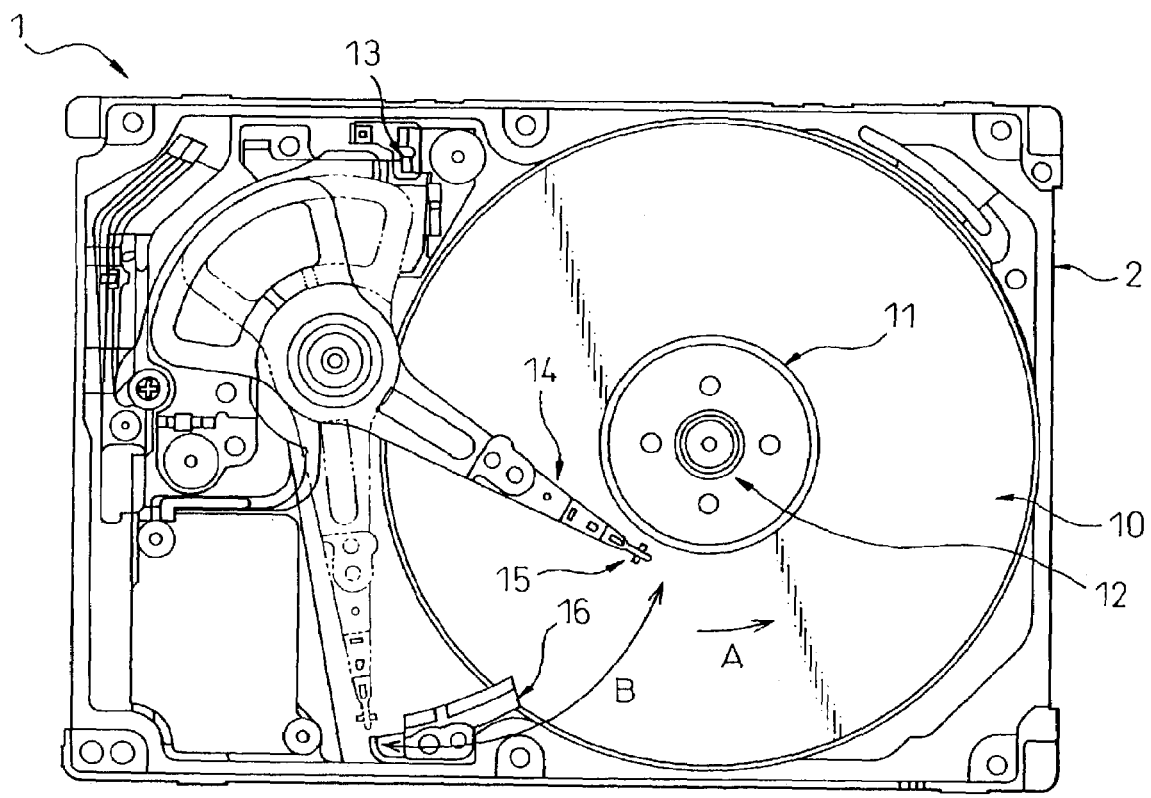
FIG. 7 is a plan view showing a schematic configuration of the mechanism section of a disk device according to an embodiment of the present invention.
Figure 8:
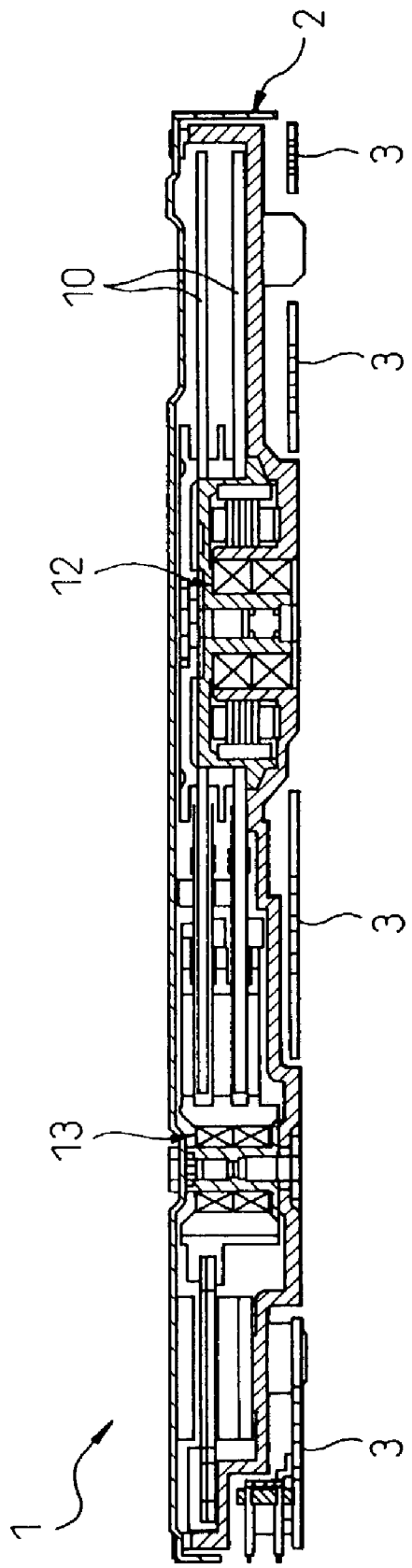
FIG. 8 is a front view showing a schematic configuration of the mechanism section of a disk device according to an embodiment of the present invention.
Figure 9:
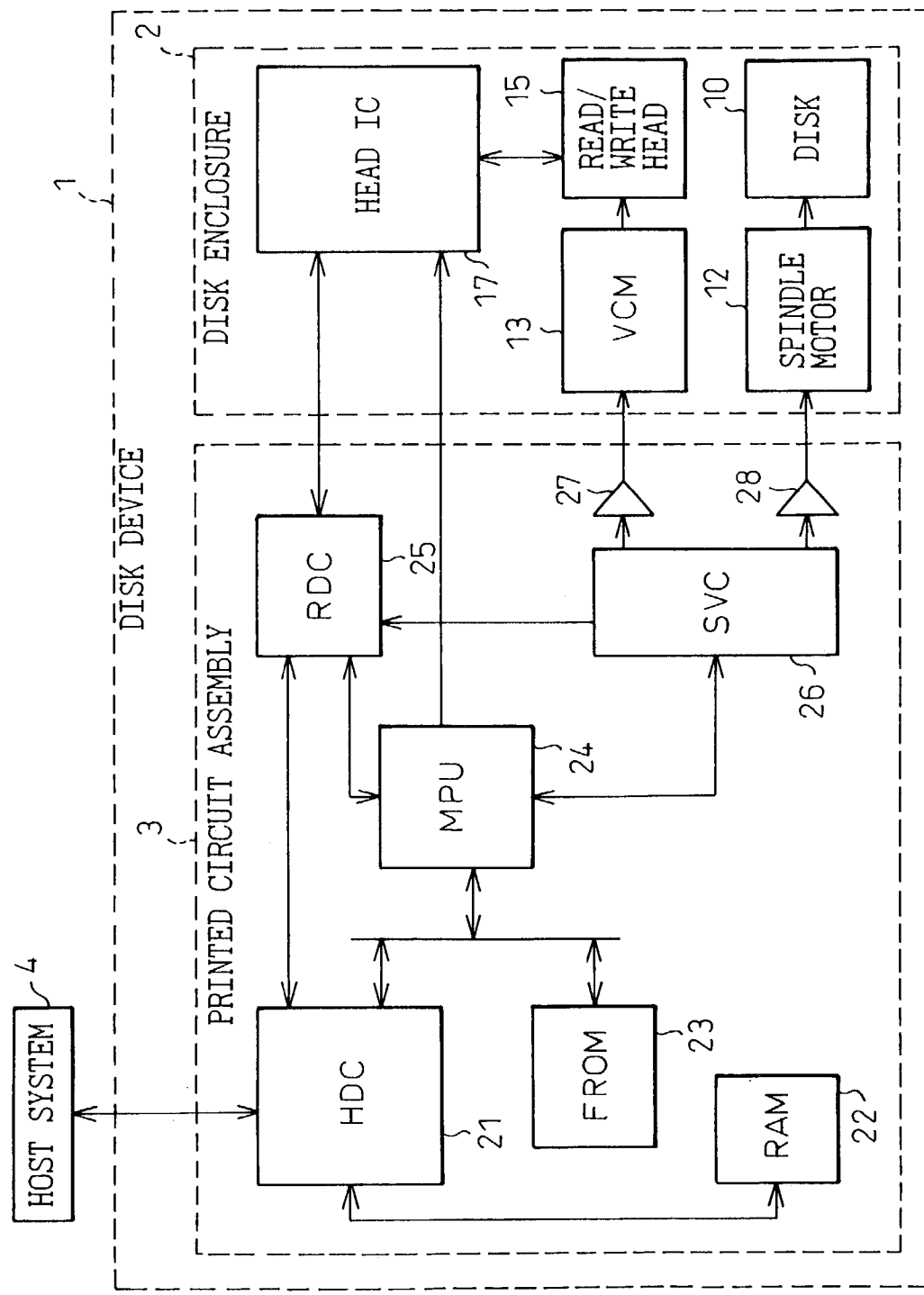
FIG. 9 is a block diagram showing a configuration of the control unit of a disk device according to an embodiment of the present invention.

FIG. 7 is a plan view showing a schematic configuration of the mechanism section of a disk device according to an embodiment of the present invention; FIG. 8 is a front view showing a schematic configuration of the mechanism section of the disk device according to the same embodiment; and FIG. 9 is a block diagram showing the configuration of the control unit of the disk device according to the same embodiment.

A disk device 1, such as a magnetic disk device, for writing and reading the data into and from a rotating disk (or a disk medium) 2, such as a hard disk, is illustrated as a disk device according to the present invention. Further, FIGS. 7 and 8 show the mechanism section of the disk device 1 according to various embodiments of the present invention, as described later, and FIG. 9 shows a control unit for controlling the operation of the disk device 1. In the description that follows, all the component elements similar or identical to those described above will be designated by the same reference numerals, respectively.

The disk device 1 shown in FIGS. 7 and 8 roughly includes a disk enclosure 2 for mechanically protecting a disk 10 in the disk device, a read/write head 15 and a control unit, and a printed circuit assembly 3 with the control unit mounted thereon for controlling the data read/write operation of the read/write head 15. The disk enclosure 2 includes one rotating disk or a plurality of rotating disks 10, such as hard disks, arranged coaxially and driven into rotation by a spindle motor 12 coupled to a spindle 11. Each disk 10 can be rotated in either counterclockwise direction or clockwise direction (please refer to an arrow A) by controlling the operation of the spindle motor 12 by a servo controller 26 (abbreviated to SVC in FIG. 9). The magnetic recording surface on the obverse (or reverse) side of the disk 10 is formed with a plurality of tracks (or a plurality of cylinders), so that a data pattern corresponding to predetermined data are written in an arbitrary position (usually referred to as "a sector") of the tracks.

More specifically, with regard to a disk device of servo surface servo type having a dedicated servo surface of one disk on which servo signal patterns are recorded, the magnetic recording surface of one of a plurality of the disks 10 constitutes a servo surface formed with servo signal patterns corresponding to the servo signal for servo control, while each of the magnetic recording surfaces of all the other disks constitutes a data surface formed with data patterns. With regard to a disk device of data surface servo type in which servo signal patterns are embedded on the surface of each of a plurality of disks, on the other hand, the magnetic recording surface of each of a plurality of disks is formed with both data patterns and servo signal patterns. The typical embodiments of the present invention are intended for the disk device of the latter data surface servo type.

Further, the disk device 1 shown in FIGS. 7 and 8 comprises a read/write head 15 for writing data in an arbitrary position on the magnetic recording surface and reading the data written from an arbitrary position of the magnetic recording surface of the disk 10. The read/write head 15 is mounted at the forward end of a head support arm 14. The arm 14 is driven by a voice coil motor (usually abbreviated to VCM) 13 controlled by a servo controller 26 (FIG. 9) described later, and also, the arm 14 is driven so as to move toward an arbitrary position between the position on the inner peripheral portion and the position on the outer peripheral portion of the disk 10. As a result, it becomes possible to make access to all the data areas of the magnetic recording surface of the disk 10 on which data are written.

In the case in which the arm 14 is rotated in the direction of an arrow B by the voice coil motor 13, for example, the read/write head 15 moves in radial direction of the disk 10, thereby making it possible to scan the desired track. A ramp mechanism unit 16 is arranged on the outer peripheral portion of the disk 10 and is engaged with the forward end of the arm 14 to hold the read/write head 15 with a given space between the disk 10 and the read/write head 15.

Further, the disk device 1 comprises an interface connector (not shown) for connecting the control unit in the magnetic disk device and an external host system 4 to each other, as shown in FIG. 9.

In FIG. 9, the reproduced signal read from the disk 10 by the read/write head 15 is supplied to a head IC 17, and after being amplified there, is applied to a printed circuit assembly 3.

The printed circuit assembly 3 is configured so as to include a hard disk controller (HDC) 21, a RAM (random access memory) 22, a flash ROM (FROM: flash read only memory) 23, a MPU (microprocessor unit) 24, a read channel (RDC) 25, a servo controller (SVC) 26 and drivers 27, 28. The reproduced signal supplied from the head IC 17 is applied to the read channel 25 on the printed circuit assembly 3 to demodulate data information and servo positioning information.

Further, the servo positioning information demodulated by the read channel 25 is supplied to the MPU 24. The MPU 24 is operated according to the program stored in the flash ROM 23, so that the information obtained by processing the servo positioning information supplied thereto is supplied to the servo controller 26. The MPU 24 also controls the voice coil motor 13, through the servo controller 26, and thus carries out various control operations, such as an operation for allowing the read/write head 15 to seek a designated track position, and the like. The MPU 24, when the seek operation of the read/write head 15 is executed, also functions as a head position estimation means for estimating the position of the read/write head 15 in advance.

The configuration of the control unit described above is fundamentally the same as that of the control unit of a disk device conventionally used.

Figure 10:
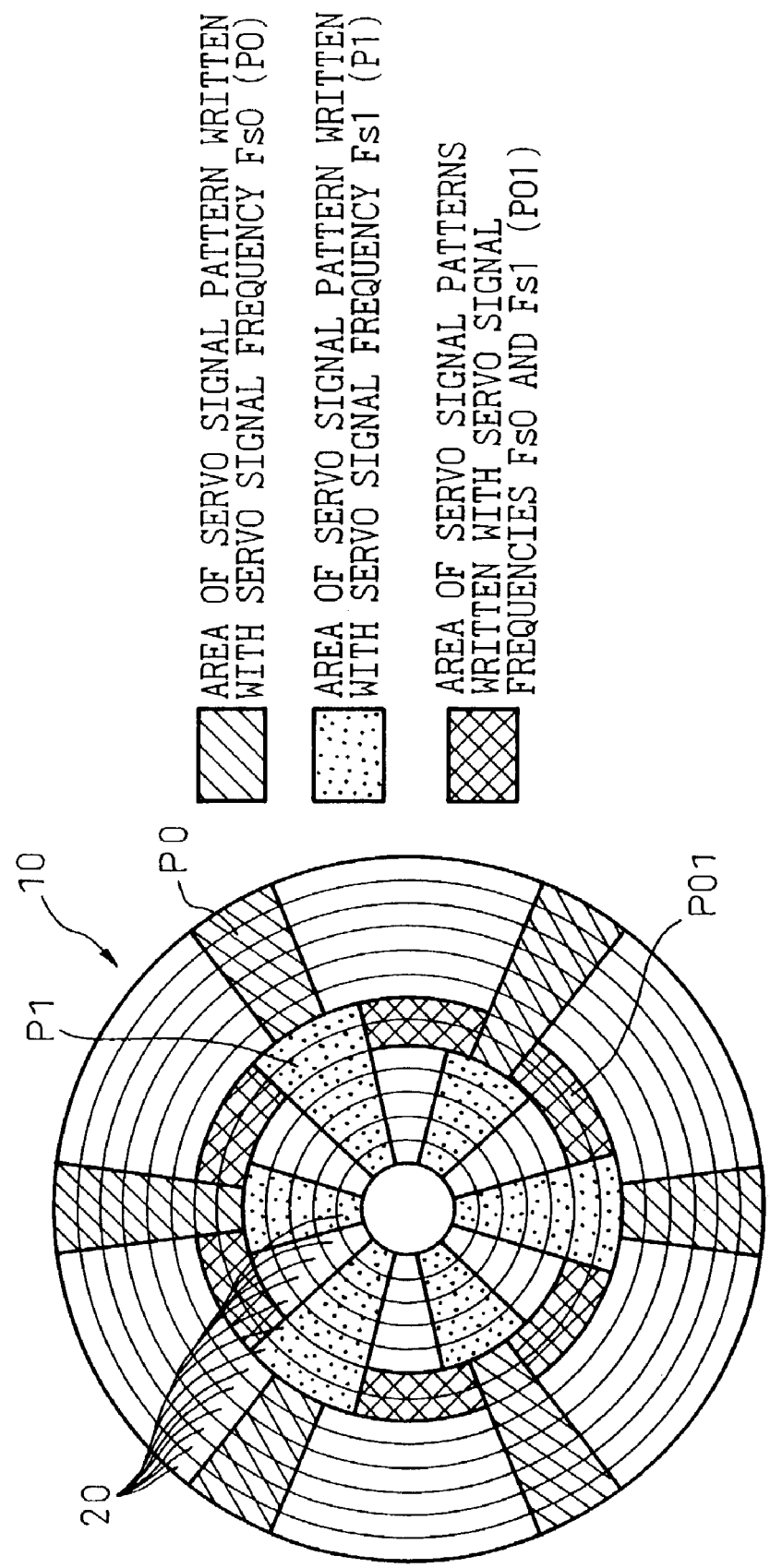
FIG. 10 is a diagram showing a layout of the servo signal patterns according to a first embodiment of the present invention.

FIG. 10 is a diagram showing a layout of the servo signal patterns according to a first embodiment of the present invention. The servo signal patterns formed on the servo cylinders 20 of a single disk 10 are typically illustrated.

According to the first embodiment shown in FIG. 10, the servo signal patterns are recorded with different recording density in the areas in which the servo signal is written on the disk surface. In the case under consideration, the areas of the servo cylinders 20 from the inner side to the outer side of the disk 10 are divided into two areas (P0, P1).

For each of the servo cylinder areas thus divided, different servo signal frequencies Fs0 and Fs1 are set, and a servo signal pattern corresponding to each servo signal frequency thus set is arranged in each area.

On the other hand, the servo signal frequencies are set so as to secure relatively satisfactory values of the error rate characteristic of the servo sync mark, the error rate characteristic of the gray code and the distribution characteristic of the burst value.

Further, an area P01 in which the servo signal pattern written with the servo signal frequency Fs0 and the servo signal pattern written with the servo signal frequency Fs1 are arranged on the same servo cylinders is formed in the boundary between the area P0 in which the servo signal pattern written with the servo signal frequency Fs0 is arranged and the area P1 in which the servo signal pattern written with the servo signal frequency Fs1 is arranged.

On the servo cylinder of the area P01, two servo signal patterns exist, and these two patterns, i.e., the servo signal pattern written with the servo signal frequency Fs0 and the servo signal pattern written with the servo signal frequency Fs1, are arranged alternately.

In the embedded servo system corresponding to the data surface servo system, the servo signal patterns are arranged with a data area therebetween. At the time of the seek operation of the read/write head, therefore, the position of the read/write head for reading the next servo signal pattern is required to be estimated before reading the next servo signal pattern, thereby making it necessary to take the estimation error of the read/write head position into consideration. The area, in which the servo signal pattern written with the servo signal frequency Fs0 and the servo signal pattern written with the servo signal frequency Fs1 are arranged on the same servo cylinders, has a width, in terms of the number of servo cylinders, twice as large as the maximum position estimation error for estimating the position of the read/write head.

Figure 11:
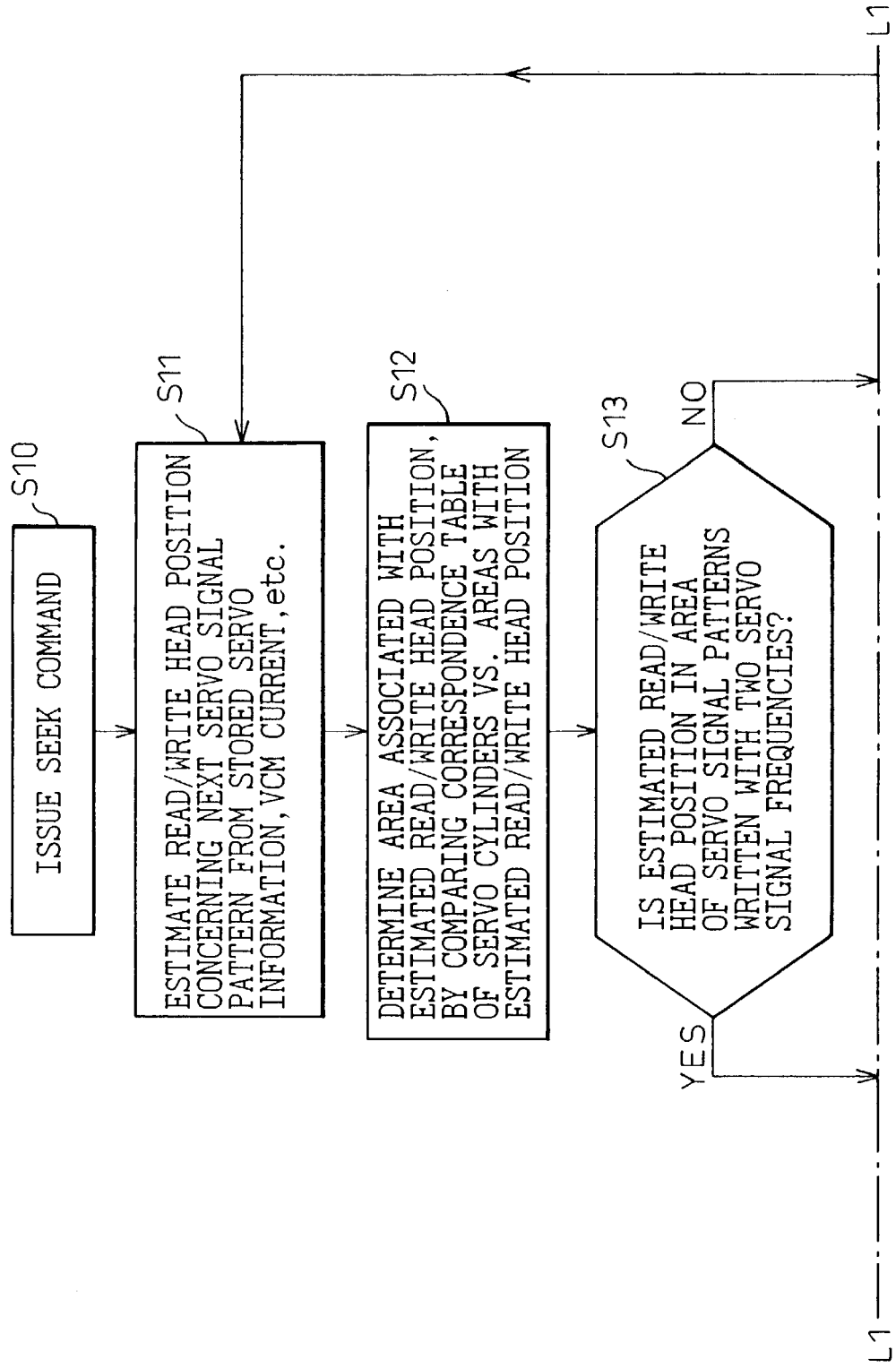
FIG. 11 is a first part of the flowchart for explaining the seek operation according to the first embodiment of the present invention.
Figure 12:
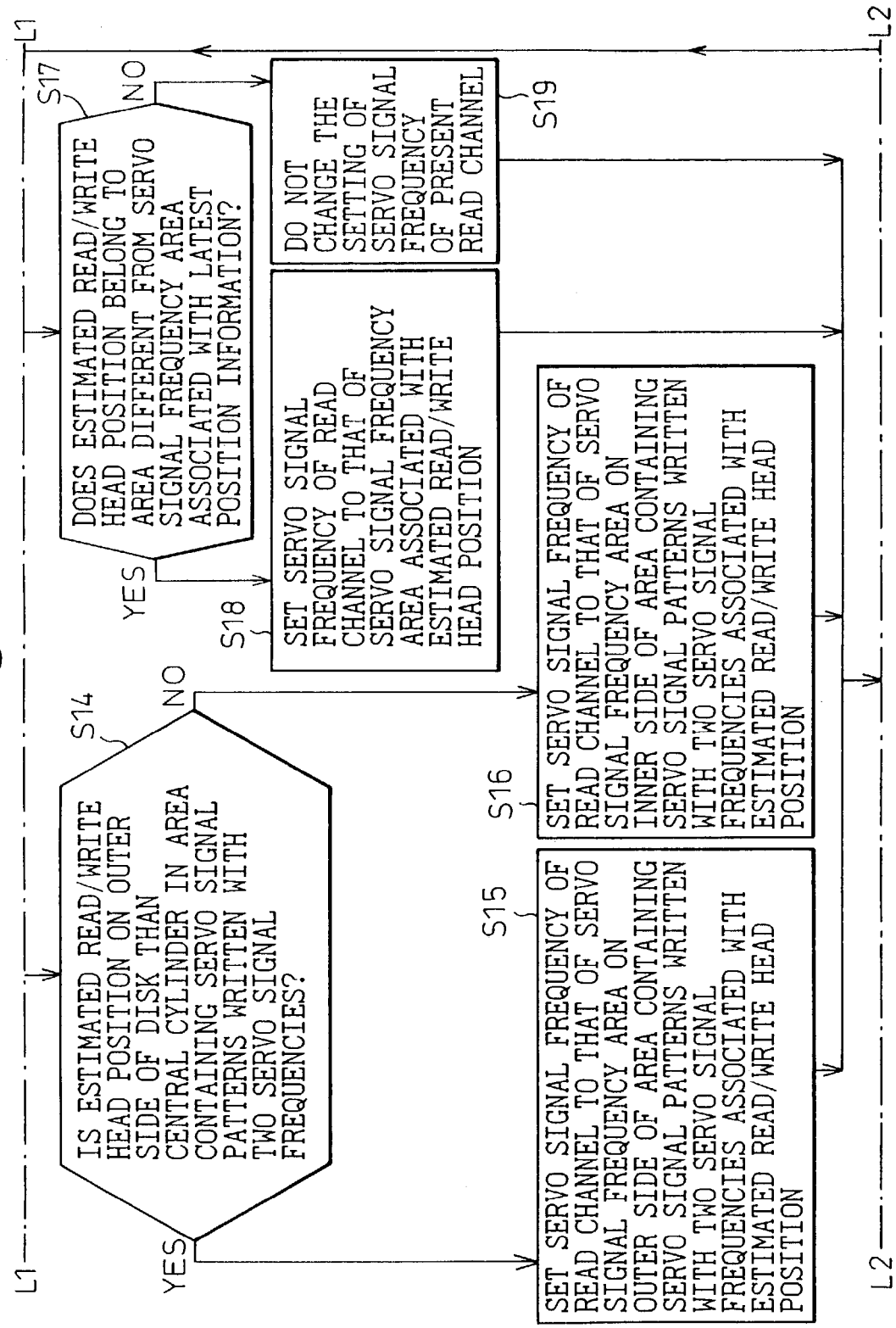
FIG. 12 is a second part of the flowchart for explaining the seek operation according to the first embodiment of the present invention.
Figure 13:
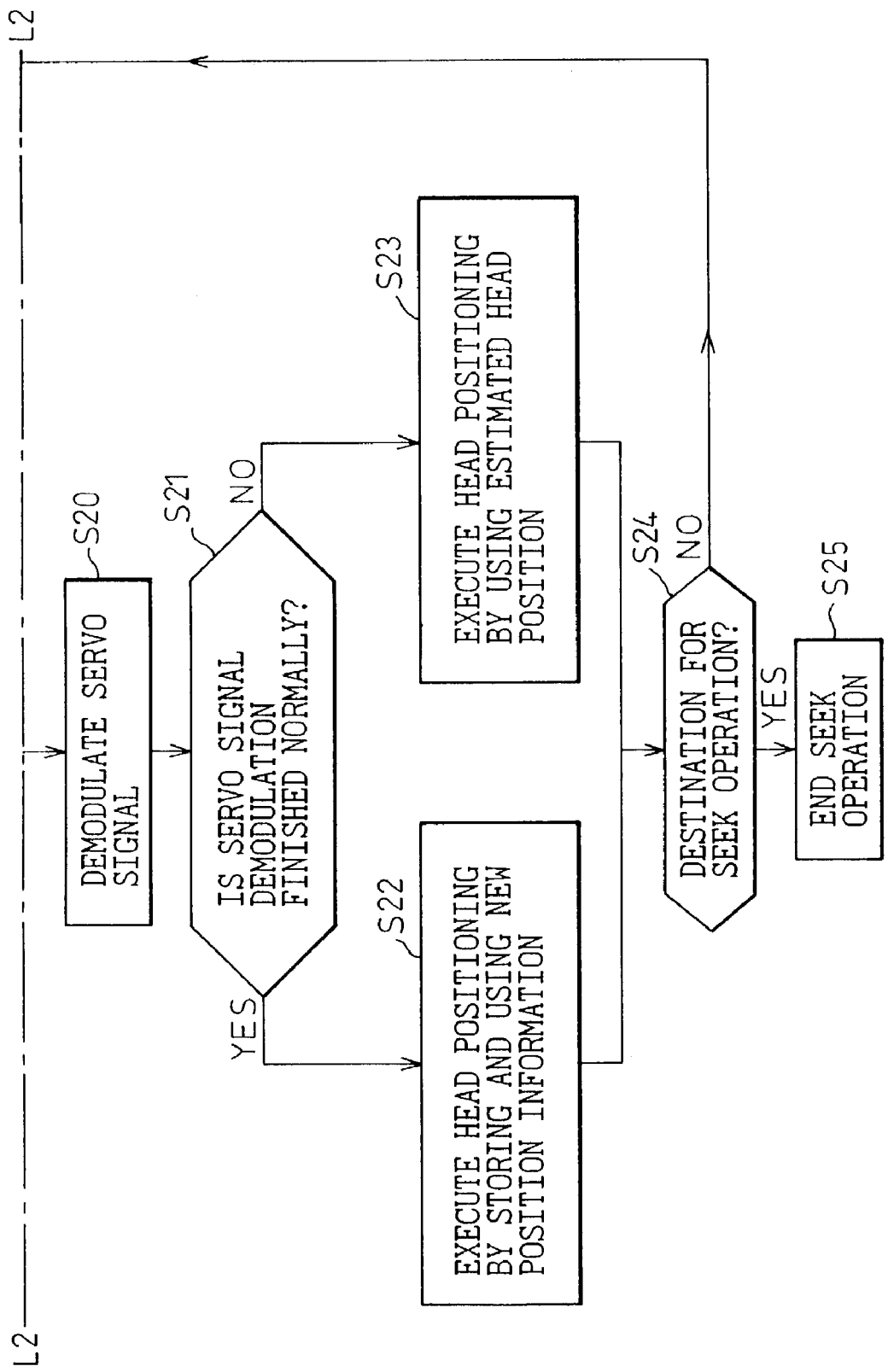
FIG. 13 is a third part of the flowchart for explaining the seek operation according to the first embodiment of the present invention.

FIGS. 11 to 13 are the first part to the third part, respectively, of the flowchart for explaining the seek operation according to the first embodiment of the present invention.

First, upon issuance of a seek command as shown in step S10, the position of the read/write head concerning the next servo signal pattern is estimated from the stored servo information and the VCM current for the read/write head position (step S11).

By comparing the correspondence table of the servo cylinders versus the areas with the estimated position of the read/write head (servo cylinder), the area associated with the estimated position of the read/write head is determined (step S12).

Further, assume that the estimated position of the read/write head (which may be referred to as the estimated read/write head position in the drawings) is in an area containing a servo signal pattern arranged anew in the boundary of servo signal frequencies and written with the two servo signal frequencies (step S13 in FIG. 11), and assume that the estimated read/write head position is on the outer side of the disk than the central servo cylinder in the area containing the servo signal pattern that is written with the two servo signal frequencies associated with the estimated read/write head position (step S14 in FIG. 12). Then, before reading the next servo signal pattern, the servo signal frequency of the read channel is set to that of the servo signal frequency area in contact with the outer side of the area containing the servo signal pattern that is written with the two servo signal frequencies associated with the estimated read/write head position (step S15 in FIG. 12).

On the other hand, assume that the estimated position of the read/write head is in an area containing a servo signal pattern arranged anew in the boundary of servo signal frequencies and written with two servo signal frequencies (step S13 in FIG. 11), and assume that the estimated read/write head position is on the inner side of the disk than the central servo cylinder in the area containing the servo signal pattern that is written with the two servo signal frequencies associated with the estimated read/write head position (step S14 in FIG. 12). Then, before reading the next servo signal pattern, the servo signal frequency of the read channel is set to that of the servo signal frequency area in contact with the inner side of the area containing the servo signal pattern that is written with the two servo signal frequencies associated with the estimated read/write head position (step S16 in FIG. 12).

Also, assume that the estimated position of the read/write head is not in the area containing the servo signal pattern arranged anew in the boundary of servo signal frequencies and written with two servo signal frequencies (step S13 in FIG. 11), and assume that the estimated read/write head position belongs to an area different from the servo signal frequency area associated with the latest position (the most recent position) (step S17 in FIG. 12). Then, before reading the next servo signal pattern, the servo signal frequency of the read channel is set to that of the servo signal frequency area associated with the estimated read/write head position (step S18 of FIG. 12).

On the other hand, assume that the estimated read/write head position is not in the area containing the servo signal pattern arranged anew in the boundary of servo signal frequencies and written with two servo signal frequencies (step S13 in FIG. 11), and assume that the estimated read/write head position belongs to the same area as the servo signal frequency associated with the latest (the most recent) position (step S17 in FIG. 12). Then, the setting of the servo signal frequency of the read channel is not changed (step S19 in FIG. 12).

Further, as shown in step S20 of FIG. 13, the servo demodulation is carried out by reading the next servo signal pattern.

In the case in which the servo demodulation fails (due to a servo sync mark detection error) (step S21), the head is set in position by using the estimated read/write head position (step S23).

In the case in which the servo demodulation is successful (because of the normal detection of the servo sync mark) (step S21), on the other hand, the demodulated positioning information is stored in a memory (RAM in FIG. 9, for example), and the head positioning operation is executed by using the positioning information newly acquired (step S22).

In the case in which the read/write head position coincides with the servo cylinder intended for seek operation (step S24), the seek operation is terminated (step S25). Unless the read/write head position is the servo cylinder intended for seek operation, in contrast, the read/write head position for reading the next servo signal pattern is estimated again to repeat the seek operation.

Figure 14:
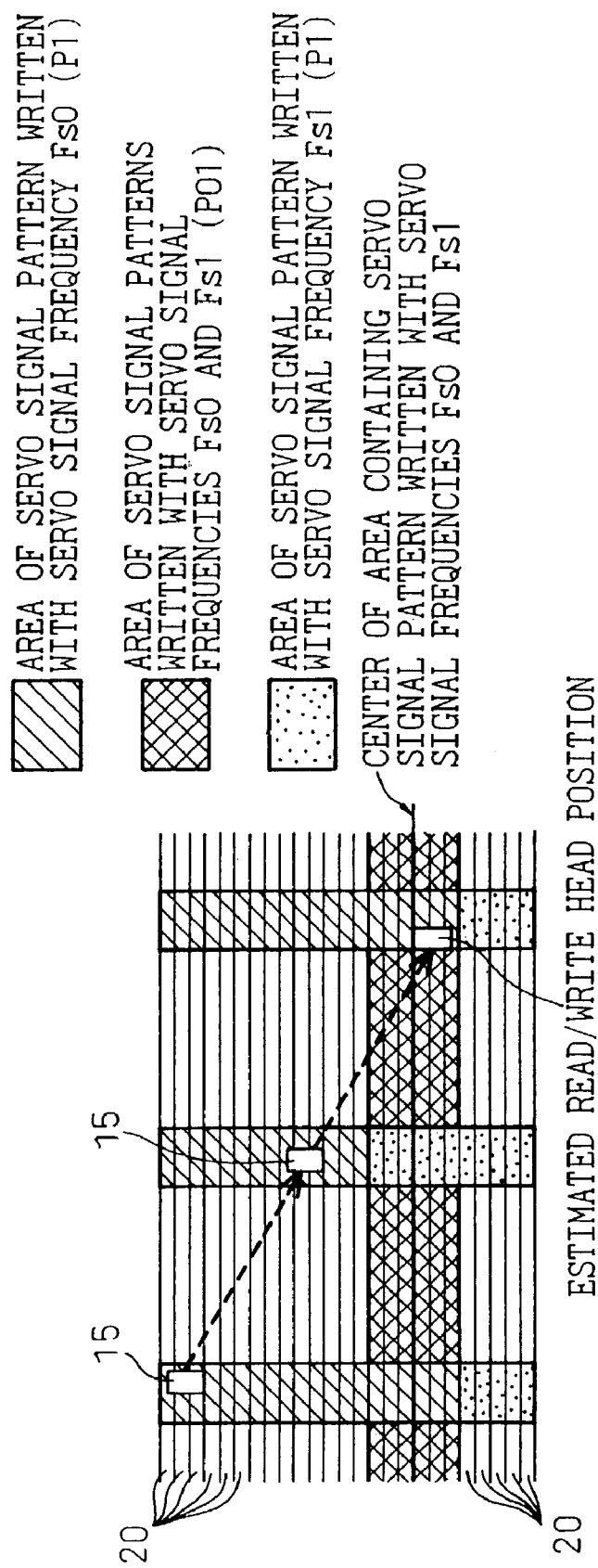
FIG. 14 is a schematic diagram showing the estimated position of the read/write head according to the first embodiment of the present invention.

FIG. 14 is a schematic diagram showing the estimated positions of the read/write head according to the first embodiment of the present invention. With reference to FIG. 14, the effects of the first embodiment described above will be explained.

In the first embodiment described above, assume that the estimation of the position of the read/write head for reading the next servo signal pattern at the time of the seek operation of the read/write head shows that the estimated position of the read/write head is located in the boundary between the servo signal frequency areas, i.e., in the new area in which the servo signal pattern written with two servo signal patterns are arranged on the same servo cylinders. Then, even in the case in which the estimated read/write head position contains an estimation error and is different from the position actually reached by the read/write head, as many cylinders as twice the estimation error are arranged in the area in which the servo signal patterns written with the two new servo signal frequencies are arranged on the same servo cylinders.

By setting the servo signal frequency of the read channel to one of the servo signal frequencies, therefore, the servo signal patterns of the two different servo signal frequencies arranged alternately on the servo cylinder can be successfully demodulated with a probability of 1/2.

Assume, on the other hand, that the read/write head passes through an area or the neighborhood of the area containing the servo signal patterns written with the new two servo signal frequencies arranged on the same servo cylinders at the time of a low-speed seek operation. Assume also that the estimated read/write head position contains an estimation error so that the servo signal frequency of the read channel is different from the servo signal frequency of the servo signal thus read, thereby making it impossible to demodulate the servo signal. Even in such a case, the next servo signal to be read has the servo signal frequency set to that of the read channel, and therefore can be demodulated. Thus, it becomes possible to prevent a seek error in which several successive servo signals cannot be demodulated.

Figure 15:
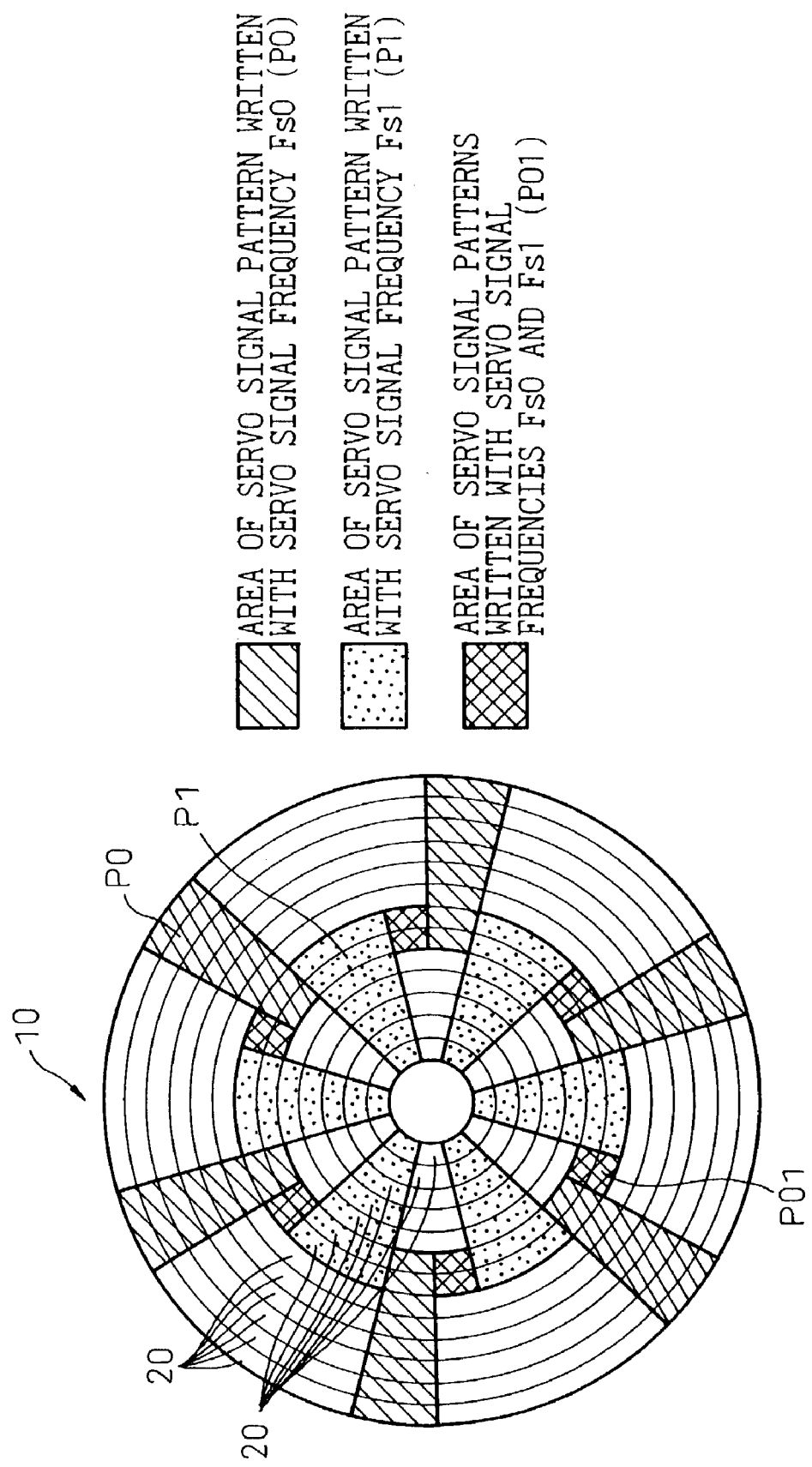
FIG. 15 is a diagram showing a layout of the servo signal patterns according to a second embodiment of the present invention.

FIG. 15 is a diagram showing a layout of the servo signal patterns according to a second embodiment of the present invention. Also in this case, the servo signal patterns formed on the servo cylinders 20 of a single disk 10 are shown as a typical example.

In the second embodiment shown in FIG. 15, the servo signal patterns are recorded with different recording density in the area in which the servo signal is written on the disk surface. In this case, the portion from the inner side to the outer side of the disk 10 containing the servo cylinders 20 is divided into two areas (P0, P1).

For the servo cylinder areas thus divided, different servo signal frequencies Fs0 and Fs1 are set, respectively, so that the servo signal patterns of the set servo signal frequencies are arranged in the divided areas.

On the other hand, the servo signal frequencies are set so as to secure an error rate characteristic of the servo sync mark, the error rate characteristic of the gray code and the distribution characteristic of the burst value in a relatively satisfactory way.

Further, the boundary between the area P0 in which a servo signal pattern written with the servo signal frequency Fs0 is arranged and the area P1 in which a servo signal pattern written with the servo signal frequency Fs1 is arranged, is formed with an area P01 in which the servo signal pattern written with the servo signal frequency Fs0 and the servo signal pattern written with the servo signal frequency Fs1 are arranged on the same servo cylinders.

In the area P01 in which two servo signal patterns including the servo signal pattern written with the servo signal frequency Fs0 and the servo signal pattern written with the servo signal frequency Fs1 are arranged on the same servo cylinders, the servo signal patterns of two different servo signal frequencies are arranged continuously and closely to each other along the circumferential direction of the disk so that the servo signal patterns of different servo signal frequencies may not be read simultaneously by the read/write head.

On the other hand, even in the case in which there is a difference between the area containing two servo signal patterns and the other area of either of the two servo signal frequencies, the servo signal patterns written with the same servo signal frequencies are arranged with the head portions thereof in phase with each other.

In the embedded servo system with the servo signal patterns arranged with a data area therebetween, it is necessary to estimate the position of the read/write head for reading the next servo signal pattern in advance, before reading the next servo signal pattern at the time of the seek operation of the read/write head. The estimation error of the position of the read/write head, therefore, is required to be taken into consideration. The area, in which the servo signal pattern written with the servo signal frequency Fs0 and the servo signal pattern written with the servo signal frequency Fs1 are arranged on the same servo cylinders, has a width, in terms of the number of servo cylinders, twice as large as the maximum position estimation error of the read/write head.

Figure 16:
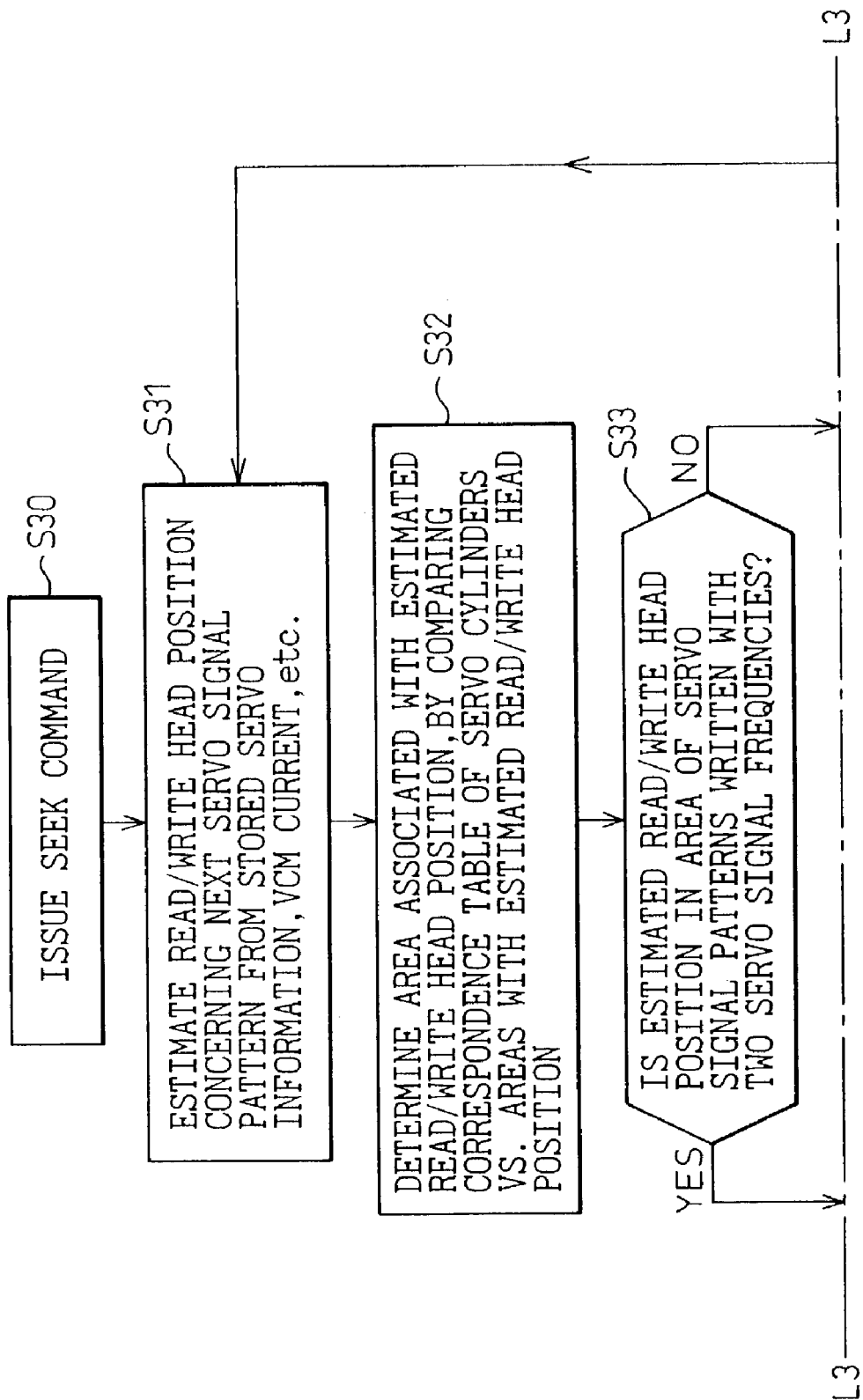
FIG. 16 is a first part of the flowchart for explaining the seek operation according to the second embodiment of the present invention.
Figure 17:
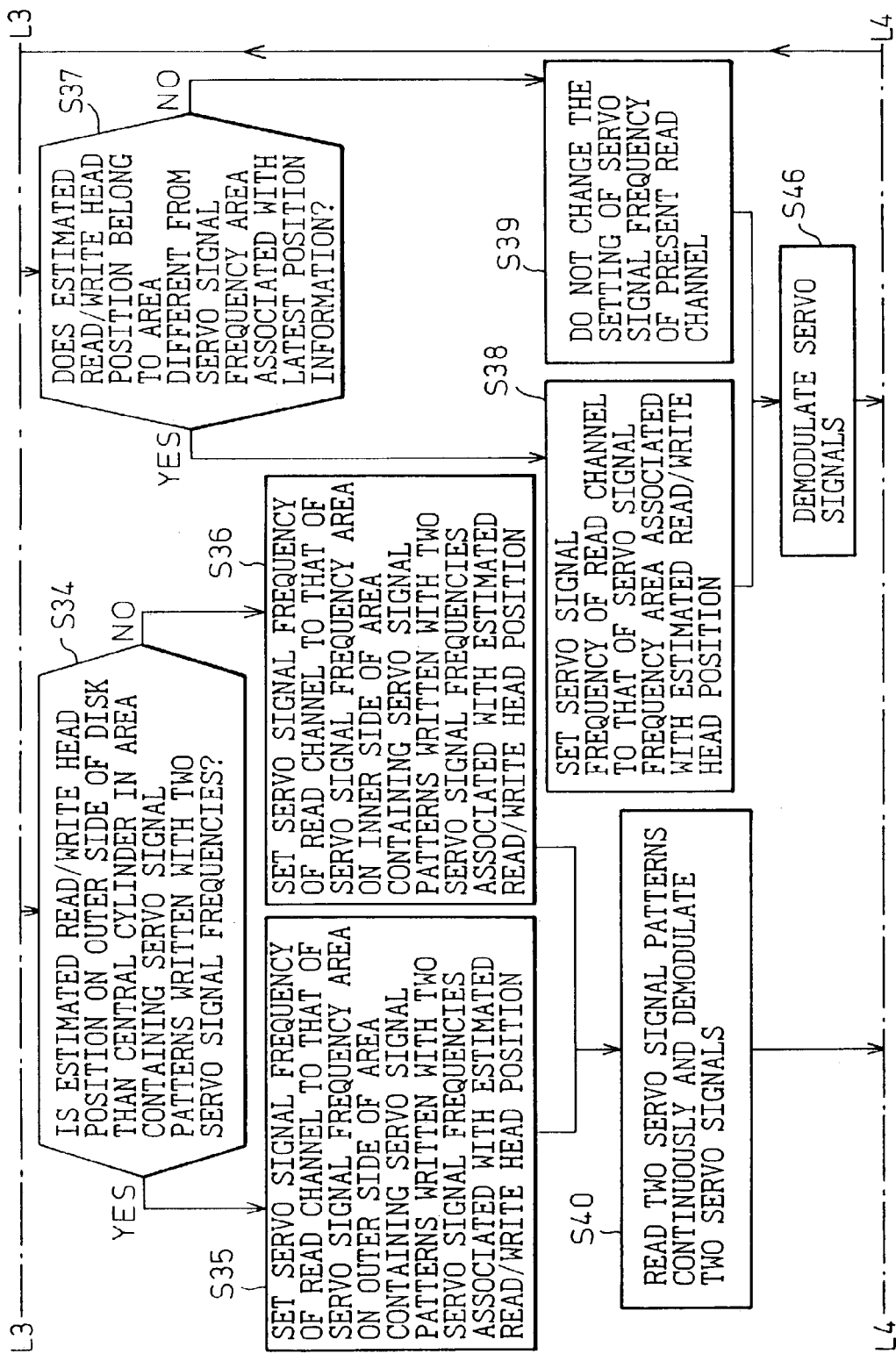
FIG. 17 is a second part of the flowchart for explaining the seek operation according to the second embodiment of the present invention.
Figure 18:
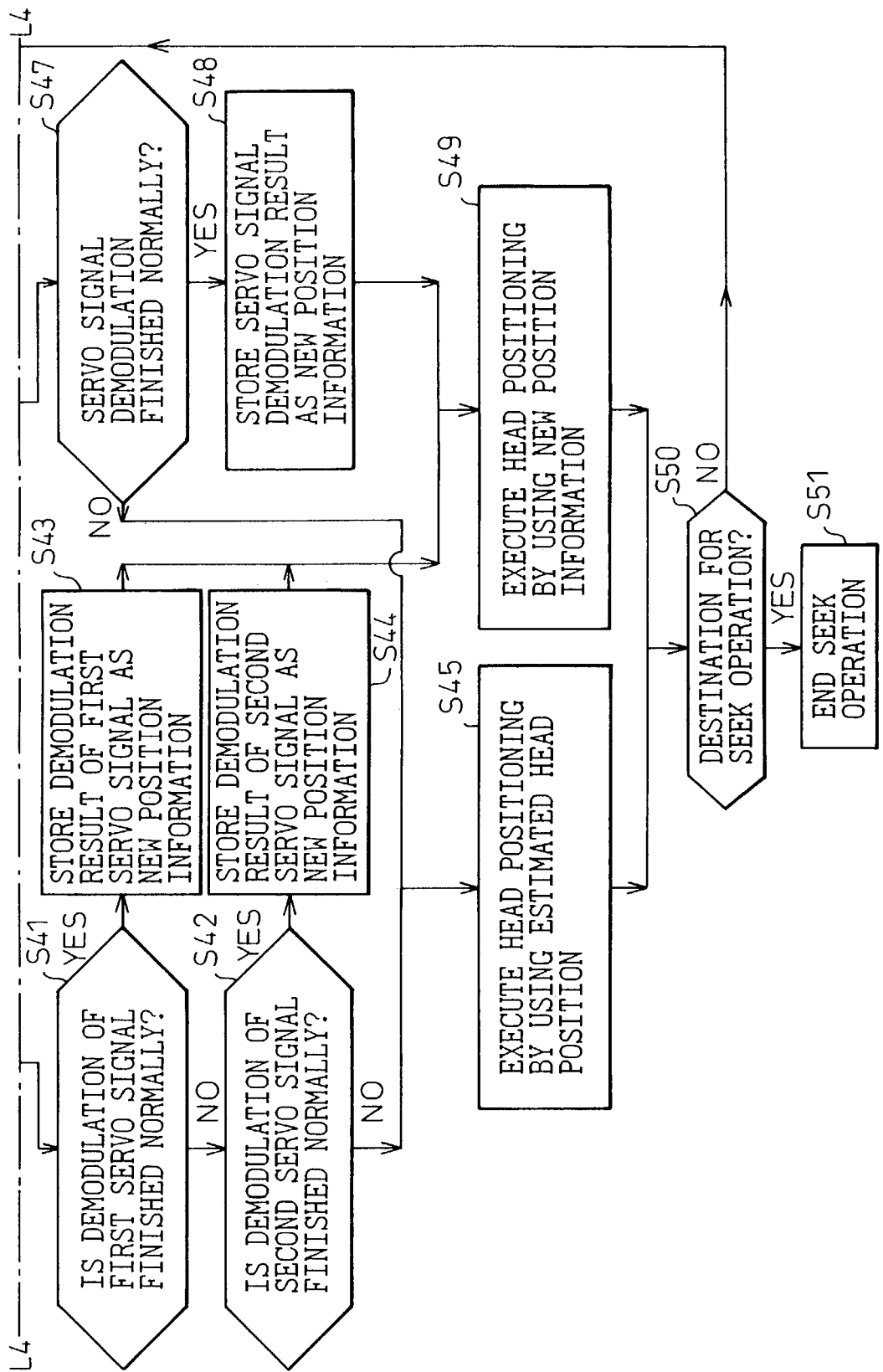
FIG. 18 is a third part of the flowchart for explaining the seek operation according to the second embodiment of the present invention.

FIGS. 16 to 18 are the first part to the third part, respectively, of the flowchart for explaining the seek operation according to the second embodiment of the present invention.

First, upon issuance of a seek command as shown in step S30, the read/write head position concerning the next servo pattern is estimated from the VCM current and the stored servo information on the read/write head position thus far stored.

By comparing the estimated read/write head position with the table of the servo cylinders and the corresponding areas, an area associated with the estimated read/write head position is determined (step S32).

Further, assume that the estimated read/write head position is in an area containing the servo signal patterns written with two servo signal frequencies arranged anew in the boundary of the areas of the servo signal frequencies (step S33 in FIG. 16), and assume that the estimated read/write head position is on the outer side of the disk than the central servo cylinder in the area containing the servo signal patterns written with two servo signal frequencies associated with the estimated read/write head position (step S34 in FIG. 17). Then, before reading the next servo signal pattern, the servo signal frequency of the read channel is set to that of the servo signal frequency area adjoining the outer side of the area containing the servo signal patterns written with the two servo signal frequencies associated with the estimated read/write head position (step S35 in FIG. 17).

On the other hand, assume that the estimated read/write head position is in an area containing the servo signal patterns written with two servo signal frequencies arranged anew in the boundary of the areas of the servo signal frequencies (step S33 in FIG. 16), and assume that the estimated read/write head position is on the inner side of the disk than the central servo cylinder in the area containing the servo signal patterns written with two servo signal frequencies associated with the estimated read/write head position (step S34 in FIG. 17). Then, before reading the next servo signal pattern, the servo signal frequency of the read channel is set to that of the servo signal frequency area adjoining the inner side of the area containing the servo signal patterns written with the two servo signal frequencies associated with the estimated read/write head position (step S36 in FIG. 17).

Also, assume that the estimated read/write head position is not in the area containing the servo signal patterns written with two servo signal frequencies arranged anew in the boundary of the servo signal frequencies (step S33 in FIG. 16), and assume that the estimated read/write head position belongs to an area different from the servo signal frequency area associated with the latest (the most recent) position (step S37 in FIG. 17). Then, before reading the next servo signal pattern, the servo signal frequency of the read channel is set to that of the servo signal frequency area associated with the estimated read/write head position (step S38 in FIG. 17).

On the other hand, assume that the estimated read/write head position is not in an area containing the servo signal patterns written with two servo signal frequencies arranged anew in the boundary of the servo signal frequencies (step S33 in FIG. 16), and assume that the estimated read/write head position belongs to the same area as the servo signal frequency area associated with the latest (the most recent) position (step S37 in FIG. 17). Then, the setting of the servo signal frequency of the read channel is not changed (step S39 in FIG. 17).

Further, in the case in which the estimated read/write head position is included in the area containing the servo signal patterns written with two servo signal frequencies arranged anew in the boundary of the servo signal frequencies, the two continuously read servo signals are demodulated individually (step S40 in FIG. 17).

The servo signal frequency of the read channel is set to that of one of two different servo signals. Therefore, one of the servo signals can be demodulated without fail (steps S41 to S44 in FIG. 18).

The head positioning process is executed by using the positioning information for one of the two servo signals which could be successfully demodulated (owing to the normal detection of a servo sync mark) (step S45 in FIG. 18).

In the case in which the estimated read/write head position is not included in the area containing the servo signal patterns written with the two servo signal frequencies arranged anew in the boundary of the servo signal frequencies, on the other hand, the servo signal is demodulated by reading the next servo signal pattern (step S46 in FIG. 17).

In the case in which the servo demodulation could not be carried out (owing to a servo sync mark detection error) (step S47 in FIG. 18), the head positioning process is executed by using the estimated read/write head position (step S45 in FIG. 18).

In the case in which the servo demodulation could be carried out successfully (due to the normal detection of the servo sync mark) (step S47 in FIG. 18), on the other hand, the demodulated positioning information is stored in a memory unit (step S48 in FIG. 18), and the head positioning process is executed by using the positioning information newly obtained (step S49 in FIG. 18).

As far as the position of the read/write head belongs to the servo cylinder intended for the seek operation (step S50 in FIG. 18), the seek operation is terminated (step S51 in FIG. 18). Unless the read/write head position is coincident with the servo cylinder intended for the seek operation, on the other hand, the read/write head position for reading the next servo signal pattern is estimated again and the seek operation is repeated.

According to the second embodiment described above, in the case in which the servo cylinder on which the read/write head is placed in the given track position (i.e., on-track condition) is located in the area containing the servo signal patterns written with the servo signal frequencies Fs0 and Fs1, the servo signal can be demodulated, as in the seek operation, by continuously reading the servo signal patterns of two different servo signal frequencies arranged continuously.

FIG. 19 is a schematic diagram showing an estimated position of the read/write head according to the second embodiment of the present invention. The effects of the second embodiment will be explained with reference to FIG. 19.

According to the second embodiment, in the seek operation of the read/write head, assume that the estimation of the read/write head position for reading the next servo signal pattern shows that the estimated read/write head position is located in the boundary between the areas of the servo signal frequencies, i.e., in the area in which the servo signal patterns written with two servo signal frequencies anew are arranged on the same servo cylinders. Then, even in the case in which the estimated read/write head position contains an estimation error and the estimated read/write head position is different from the position actually reached by the read/write head, twice as many cylinders as the estimation error are located in the area in which the servo signal patterns written with two servo signal frequencies anew are arranged on the same servo cylinders.

As a result, the servo signal is demodulated by setting the servo signal frequency of the read channel to one of the two servo signal frequencies described above and reading the servo signal patterns written with two different servo signal frequencies arranged continuously along the circumferential direction. Thus, it always becomes possible to demodulate one of the servo signal patterns. Therefore, a servo signal demodulation error, which otherwise might occur owing to the setting of the servo signal frequency of the read channel, can be eliminated.

Also, at the time of a low-speed seek operation, a continuous servo signal demodulation error, which otherwise might occur owing to the setting of the servo signal frequency of the read channel, can be eliminated.

Assume that the read/write head is placed in an on-track condition in the boundary between the areas of the servo signal patterns written with two different servo signal frequencies. In view of the fact that an area having the two servo signal patterns of the servo signal frequencies used in the aforementioned two areas is formed in which the servo signal patterns written with the two different servo signal frequencies are arranged continuously along the circumferential direction, the servo signals of the two different servo signal frequencies are not read simultaneously by the read/write head, and therefore, the servo signal of a single servo frequency can be read.

The servo signal frequency of the read channel is set to one of the two servo signal frequencies. Therefore, the servo signal can be demodulated, and a servo signal demodulation error does not occur which otherwise might occur owing to the setting of the servo signal frequency of the reach channel.

FIG. 20 is a diagram showing a layout of the servo signal patterns according to a third embodiment of the present invention. Also in this embodiment, the servo signal patterns formed on the servo cylinders 20 of a single disk 10 are shown as a typical example.

According to the third embodiment shown in FIG. 20, the servo signal patterns on the disk are recorded with different recording density in the area on the disk surface in which the servo signals are written. In this case, the areas of the servo cylinders 20 from the inner side to the outer side of the disk 10 are divided into several areas (P0 and P1, for example).

Different servo signal frequencies Fs0 and Fs1 are set for different areas of the servo cylinders thus divided, and the servo signal patterns corresponding to the servo signal frequencies thus set are arranged in the respective areas.

On the other hand, the servo signal frequencies are set so as to secure relatively satisfactory values of the error rate characteristic of the servo sync mark, the error rate characteristic of the gray code and the distribution characteristic of the burst value.

Further, an area P01 in which the servo signal patterns set to the servo signal frequencies Fs0 and Fs1 are arranged on the same servo cylinders is formed in the boundary between the servo signal pattern area P0 in which the servo signal frequency is set to Fs0 and the servo signal pattern area P1 adjoining the servo signal pattern area P0 of the servo signal frequency Fs0 which is set to the servo signal frequency Fs1.

In the area P01 in which the servo signal patterns with the servo signal frequencies set to Fs0 and Fs1 are arranged on the same servo cylinders, the servo signal patterns are arranged at an interval of one half the interval at which the servo signal patterns are arranged in the adjoining servo signal frequency areas. In the case under consideration, the servo signal patterns of the servo signal frequencies Fs0 and Fs1 are arranged alternately with the other servo signal patterns on the servo cylinders.

On the other hand, even in the case in which the area containing the two servo signal patterns is different from the other area of either of the two servo signal frequencies, the servo signal patterns written with the same servo signal frequency are recorded with the head portions thereof in phase with each other.

In the embedded servo system having the servo signal patterns arranged with the data area therebetween, the position of the read/write head is required to be estimated before reading the next servo signal pattern at the time of the seek operation of the read/write head.

The area containing the servo signal patterns written with two servo signal frequencies has a width, in terms of the number of cylinders, twice as large as the maximum estimation error of the read/write head position.

Figure 22B:
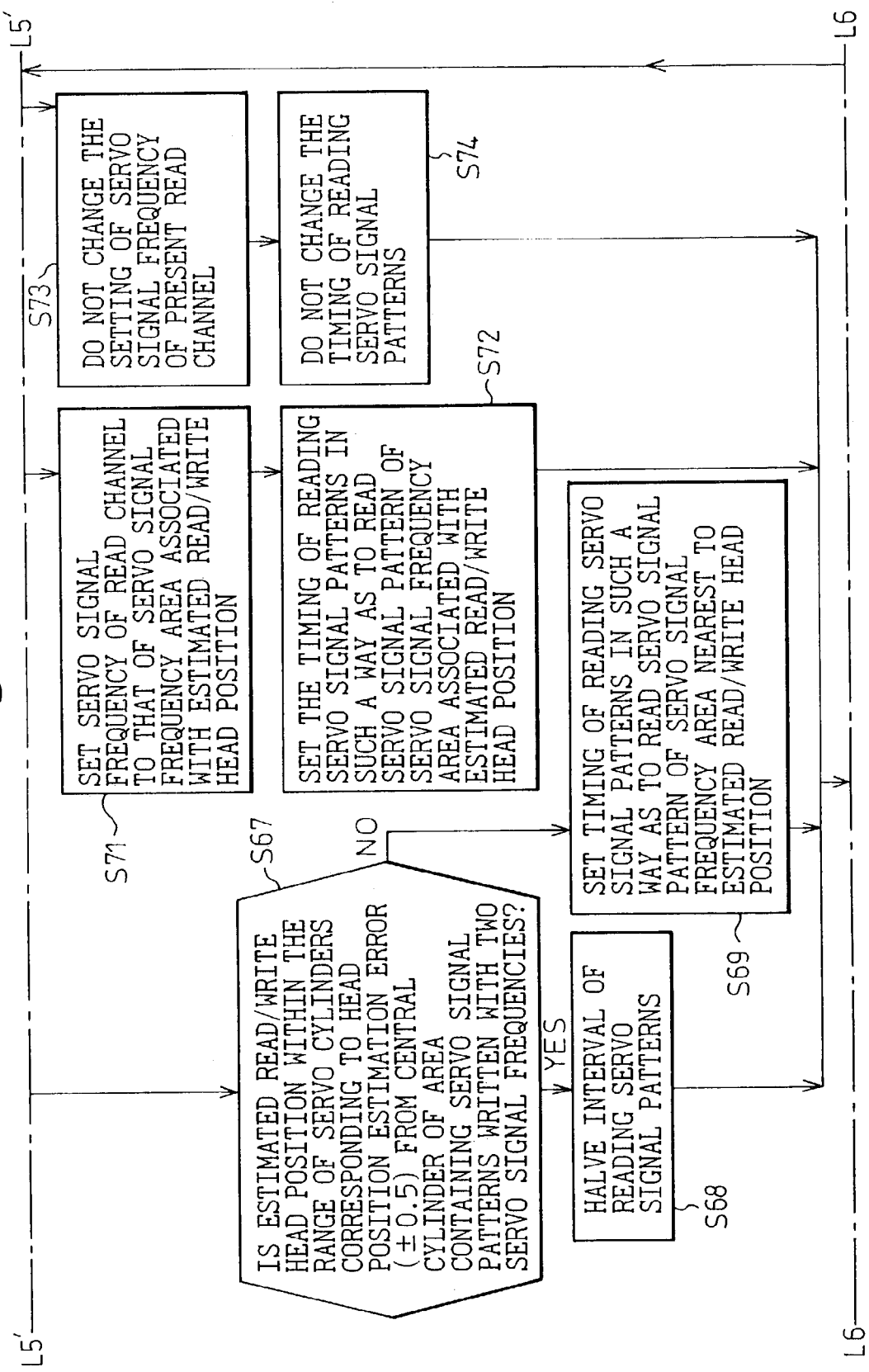
FIG. 22B is a third part of the flowchart for explaining the seek operation according to the third embodiment of the present invention.
Figure 23:
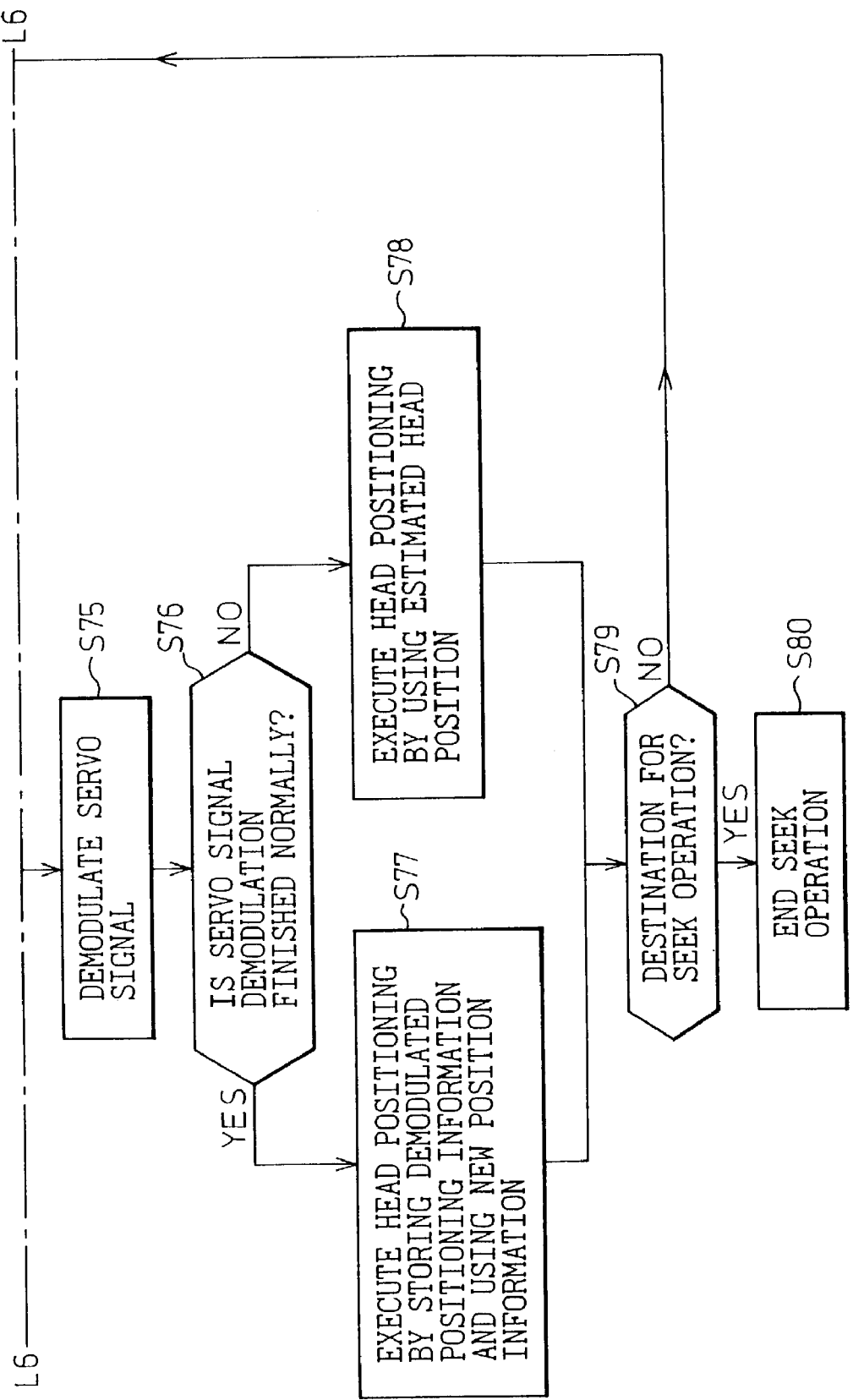
FIG. 23 is a fourth part of the flowchart for explaining the seek operation according to the third embodiment of the present invention.

FIGS. 21 to 23 are the first part to the fourth part, respectively, of the flowchart for explaining the seek operation according to the third embodiment of the present invention.

First, upon issuance of a seek command as shown in step S60, the read/write head position concerning the next servo signal pattern is estimated from the VCM current and the accumulated servo information on the read/write head position (step S61).

By comparing the correspondence table of the servo cylinders versus the areas with the position of the read/write head, the area associated with the estimated read/write head position is determined (step S62).

Further, assume that the estimated position of the read/write head is in the area containing the servo signal patterns written with two servo signal frequencies arranged anew in the boundary of the servo signal frequencies (step S63 in FIG. 21), and assume that the estimated read/write head position is on the outer side of the disk than the central servo cylinder in the area containing the servo signal patterns written with two servo signal frequencies associated with the estimated read/write head position (step S64 in FIG. 22A). Then, before reading the next servo signal pattern, the servo signal frequency of the read channel is set to that of the servo signal frequency area in contact with the outer side of the area containing the servo signal patterns written with the two servo signal frequencies associated with the estimated read/write head position (step S65 in FIG. 22A).

On the other hand, assume that the estimated position of the read/write head is in the area containing the servo signal patterns written with two servo signal frequencies arranged anew in the boundary of the servo signal frequencies (step S63 in FIG. 21) and that the estimated read/write head position is on the inner side of the disk than the central servo cylinder in the area containing the servo signal patterns written with two servo signal frequencies associated with the estimated read/write head position (step S64 in FIG. 22A). Then, before reading the next servo signal pattern, the servo signal frequency of the read channel is set to that of the servo signal frequency area in contact with the inner side of the area containing the servo signal patterns written with the two servo signal frequencies associated with the estimated read/write head position (step S66 in FIG. 22A).

Also, assume that the estimated position of the read/write head is not in the area containing the servo signal patterns written with two servo signal frequencies arranged anew in the boundary of the servo signal frequencies (step S63 in FIG. 21), and assume that the estimated read/write head position belongs to an area different from the servo signal frequency area associated with the latest (the most recent) read/write head position (step S70 in FIG. 22A). Before reading the next servo signal pattern, the servo signal frequency of the read channel is set to that of the servo signal frequency area associated with the estimated read/write head position (step S71 of FIG. 22B).

Further, assume that the estimated read/write head position is not in the area containing the servo signal patterns written with two servo signal frequencies arranged anew in the boundary of the servo signal frequencies (step S63 in FIG. 21), and assume that the estimated read/write head position belongs to the same area as the servo signal frequency associated with the latest (the most recent) read/write head position (step S70 in FIG. 22A). Then, the setting of the servo signal frequency of the read channel is not changed (step S73 in FIG. 22B).

Furthermore, assume that the estimated read/write head position is located in the area containing the servo signal patterns written with two servo signal frequencies arranged anew in the boundary of the servo signal frequencies on the one hand and located within the range of the servo cylinders corresponding to the head position estimation error from the central servo cylinder of the area containing the servo signal patterns written with two servo signal frequencies associated with the estimated read/write head position on the other hand (step S67 in FIG. 22B). Then, the timing of reading the servo signal patterns is set to an interval of one half the timing for the area containing the servo signal pattern written with a single servo signal frequency (step S68 in FIG. 22B).

Also, assume that the estimated read/write head position is located in the area containing the servo signal patterns written with two servo signal frequencies arranged anew in the boundary of the servo signal frequencies on the one hand and not located within the range of the servo cylinders corresponding to the head position estimation error from the central servo cylinder of the area containing the servo signal patterns written with two servo signal frequencies associated with the estimated read/write head position on the other hand (step S67 in FIG. 22B). Then, the timing of reading the servo signal patterns is set in such a way as to read the servo signal pattern written with a single servo signal frequency adjoining the area containing the servo signal patterns written with two servo signal frequencies nearest to the estimated read/write head position (step S69 in FIG. 22B).

Furthermore, assume that the read/write head position is not located in the area containing the servo signal patterns written with two servo signal frequencies arranged anew in the boundary of the servo signal frequency areas (step S63 in FIG. 21), and assume that the estimated read/write head position is located in an area different from the servo signal frequency area associated with the latest (the most recent) read/write head position (step S70 in FIG. 22A). Then, the timing of reading the servo signal patterns is set to the area of a servo pattern written with a single servo signal frequency associated with the estimated read/write head position (step S72 in FIG. 22B).

Also, assume that the estimated read/write head position is not located in the area containing the servo signal patterns written with two servo signal frequencies arranged anew in the boundary of the servo signal frequencies (step S63 in FIG. 21), and assume that the estimated read/write head position is located in the same area as the servo signal frequency associated with the latest (the most recent) read/write head position (step S70 in FIG. 22A). Then, the timing of reading the servo signal patterns is not changed (step S74 in FIG. 22B).

Further, as shown in step S75 in FIG. 23, the next servo signal pattern is read to demodulate the servo signal. In the case in which the servo signal could not be demodulated (due to a servo sync mark detection error) (step S76 in FIG. 23), the read/write head is set in position by using the estimated read/write head position (step S77 in FIG. 23).

In the case in which the servo demodulation could be carried out (due to the successful normal detection of a servo sync mark) (step S76 in FIG. 23), on the other hand, the demodulated positioning information is stored in memory, and the head positioning operation is performed by using the positioning information newly obtained (step S78 in FIG. 23).

In the case in which the read/write head position is on the servo cylinder targeted by the seek operation (step S79 in FIG. 23), the seek operation is terminated (step S80 in FIG. 23). In the case in which the read/write head position is not on the servo cylinder targeted by the seek operation, on the other hand, the position of the read/write head for reading the next servo signal pattern is estimated again.

Next, the effects of the third embodiment of the invention will be explained. In the third embodiment, assume that the estimation of the read/write head position for reading the next servo signal pattern in the seek operation of the read/write head shows that the estimated read/write head position is located in the boundary between the servo signal frequency areas, i.e., in the area in which the servo signal patterns written with two new servo signal frequencies are arranged on the same servo cylinders. Then, even in the case in which the estimated read/write head position includes an estimation error so that the estimated read/write position is different from the position actually reached by the read/write head, twice as many cylinders as the estimation error are located in the area in which the servo signal patterns written with the two new servo signal frequencies are arranged on the same servo cylinders.

By setting the servo signal frequency of the read channel to one of the aforementioned two servo signal frequencies, therefore, the servo signal can be demodulated with the probability of 1/2, with regard to the servo signal patterns of two different servo signal frequencies arranged alternately on the servo cylinders.

On the other hand, assume that the read/write head passes through the neighborhood of the area in which the servo signal patterns written with two new servo signal frequencies are arranged on the same servo cylinders, at the time of a low-speed seek operation and assume that the servo signal cannot be demodulated, owing to the fact that the estimated read/write head position includes an estimation error and the servo signal frequency of the read channel is different from the servo signal frequency of the servo signal that has been read. In view of the fact that the servo signal frequency of the servo signal next to be read is the one set to the servo signal frequency of the read channel, the servo signal can be demodulated, and therefore, a seek error, which otherwise might make it impossible to demodulate several successive servo signals, can be eliminated.

Further, the servo signal patterns of two different servo signal frequencies are arranged alternately with each other at the time interval of 1/2 in the area in which the servo signal patterns written with two different servo signal frequencies are arranged on the same servo cylinders. Even in the case in which the servo signals cannot be demodulated owing to the setting of the frequency, therefore, the servo signal can be demodulated within a short time length, thereby improving the positioning accuracy.

Figure 24:
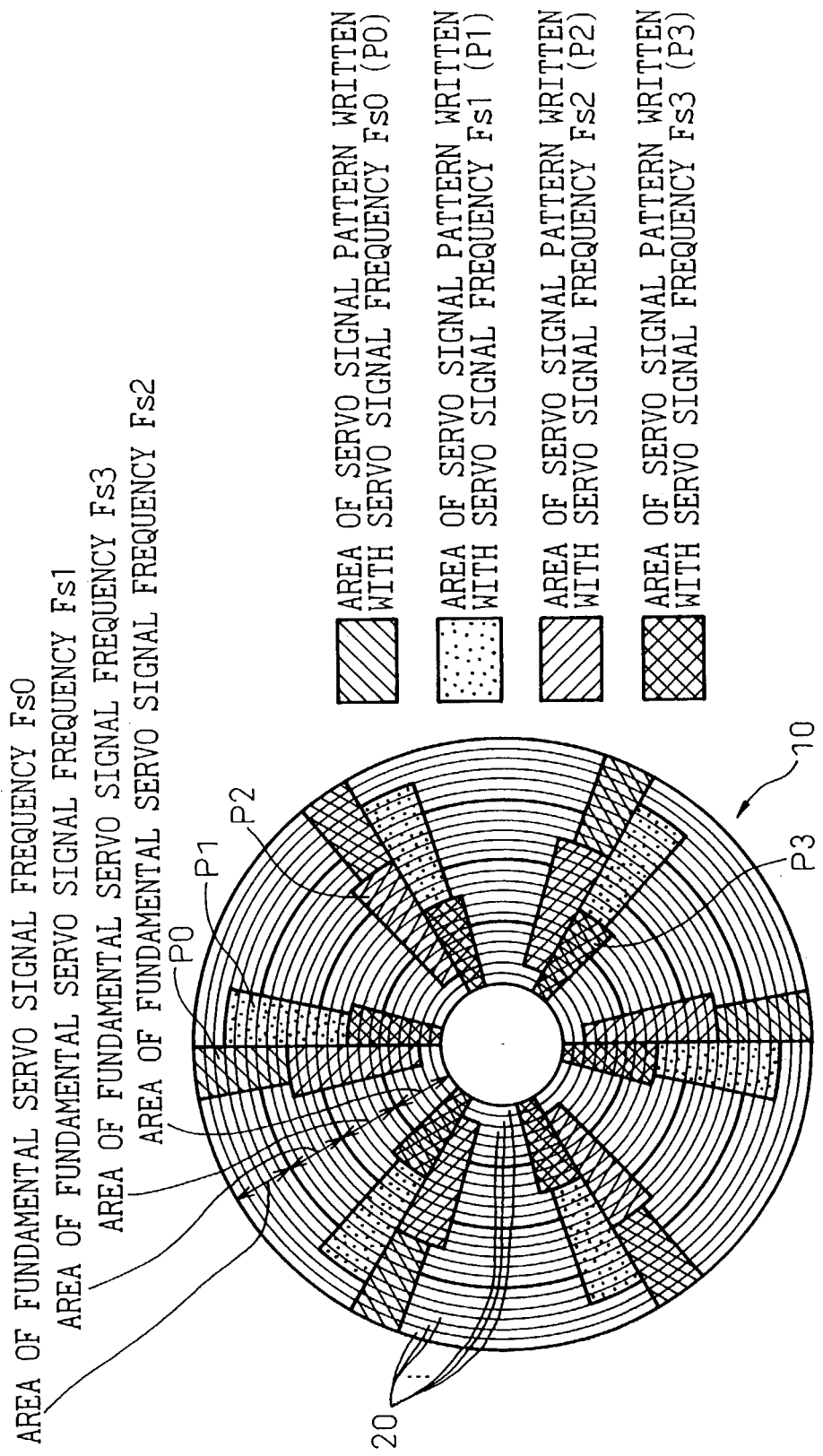
FIG. 24 is a diagram showing a layout of the servo signal patterns according to a fourth embodiment of the present invention.

FIG. 24 is a diagram showing a layout of the servo signal patterns according to a fourth embodiment of the present invention. Also in this embodiment, the servo signal patterns formed on the servo cylinder 20 of a single disk 10 are shown as a typical example.

In the fourth embodiment shown in FIG. 24, the servo signal patterns on the disk surface are recorded with the recording density thereof changed in the area in which the servo signal is written. In this case, the portion from the inner side to the outer side the servo cylinders 20 of the disk 10 is divided into four areas (P0, P1, P2 and P3).

For each of the areas of the servo cylinders thus divided, different fundamental servo signal frequencies Fs0, Fs1, Fs2 and Fs3 are set, respectively.

The servo signal frequencies, on the other hand, are set so as to secure relatively satisfactory values of the error rate characteristic of the servo sync mark, the error rate characteristic of the gray code and the distribution characteristic of the burst value.

The width of the area of the servo signal written with one servo signal frequency is set to a value larger than the number of servo cylinders corresponding to the maximum estimation error of the head position estimation means for the read/write head.

Further, in the servo signal frequency areas on the outer side of the disk than the central servo cylinder, the servo signal pattern written with the fundamental servo signal frequency and the servo signal pattern written with the servo signal frequency in the area adjoining the outer side of the servo signal frequency area are arranged continuously, without any interval, with each other.

Furthermore, in the servo signal frequency area on the inner side of the disk than the central servo cylinder, the servo signal pattern written with the fundamental servo signal frequency and the servo signal pattern written with the servo signal frequency in the area adjoining the inner side of the servo signal frequency area are arranged continuously, without any interval, with each other.

Even though, in the adjoining areas of the servo signal frequencies, the servo signal patterns are written with the same servo signal frequency in different servo signal frequency areas, the servo signal patterns are arranged with the head portions thereof in phase with each other. In the case in which the read/write head is placed in an on-track condition in the boundary of the adjoining servo signal frequency areas, on the other hand, the servo signal patterns are displaced from each other to avoid reading the servo signal patterns of different servo signal frequencies simultaneously.

Figure 25:
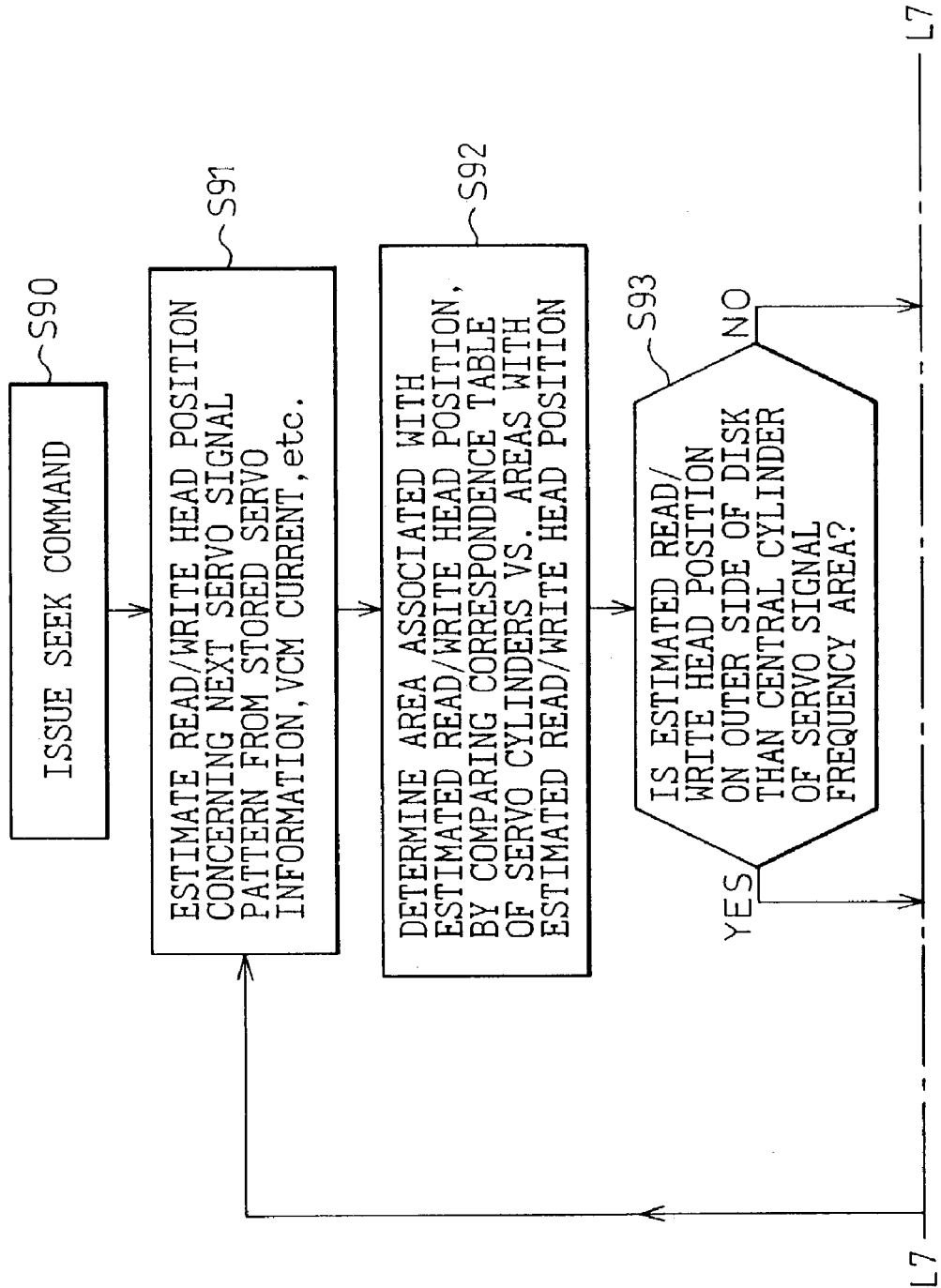
FIG. 25 is a first part of the flowchart for explaining the seek operation according to the fourth embodiment of the present invention.
Figure 26:
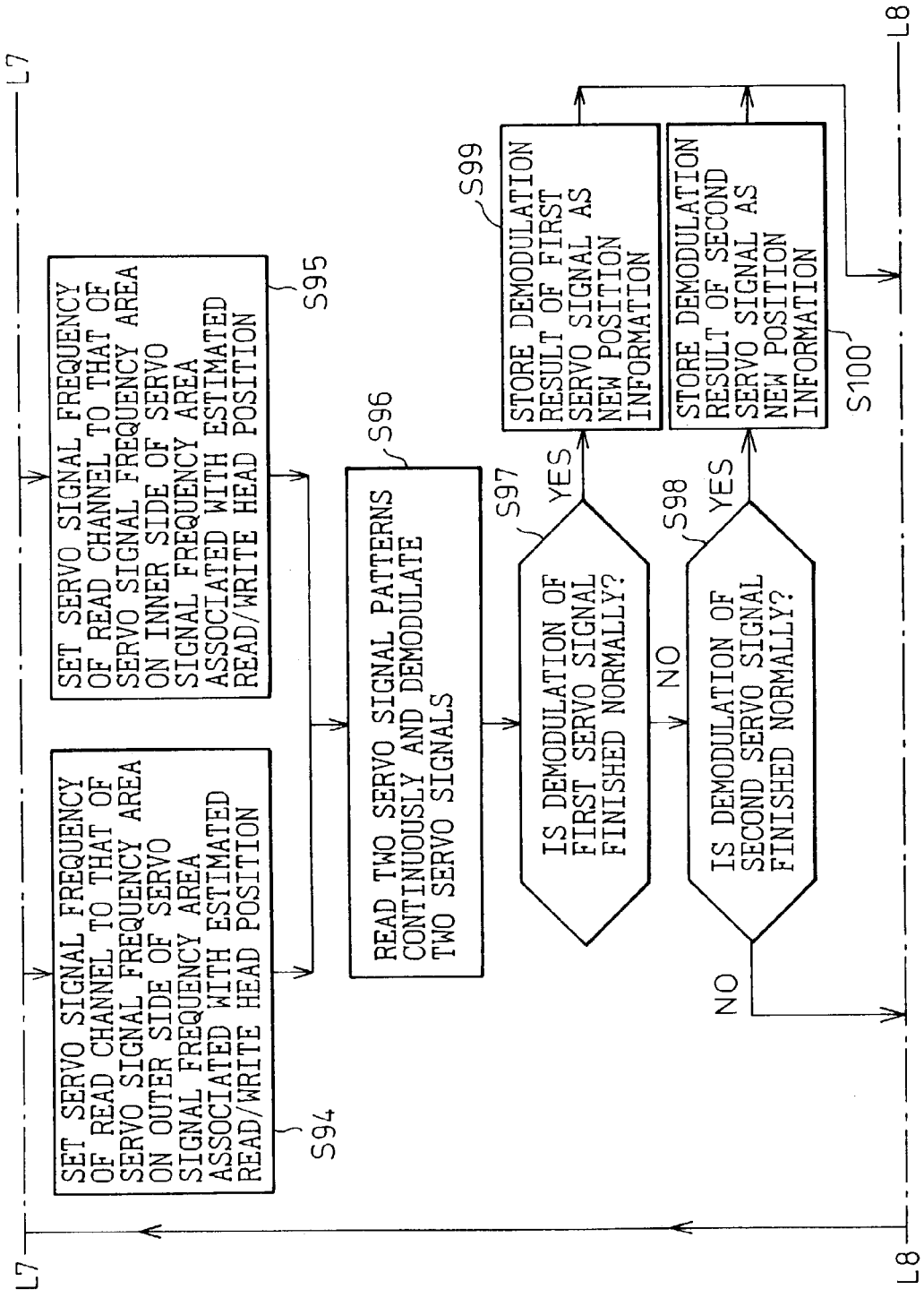
FIG. 26 is a second part of the flowchart for explaining the seek operation according to the fourth embodiment of the present invention.
Figure 27:
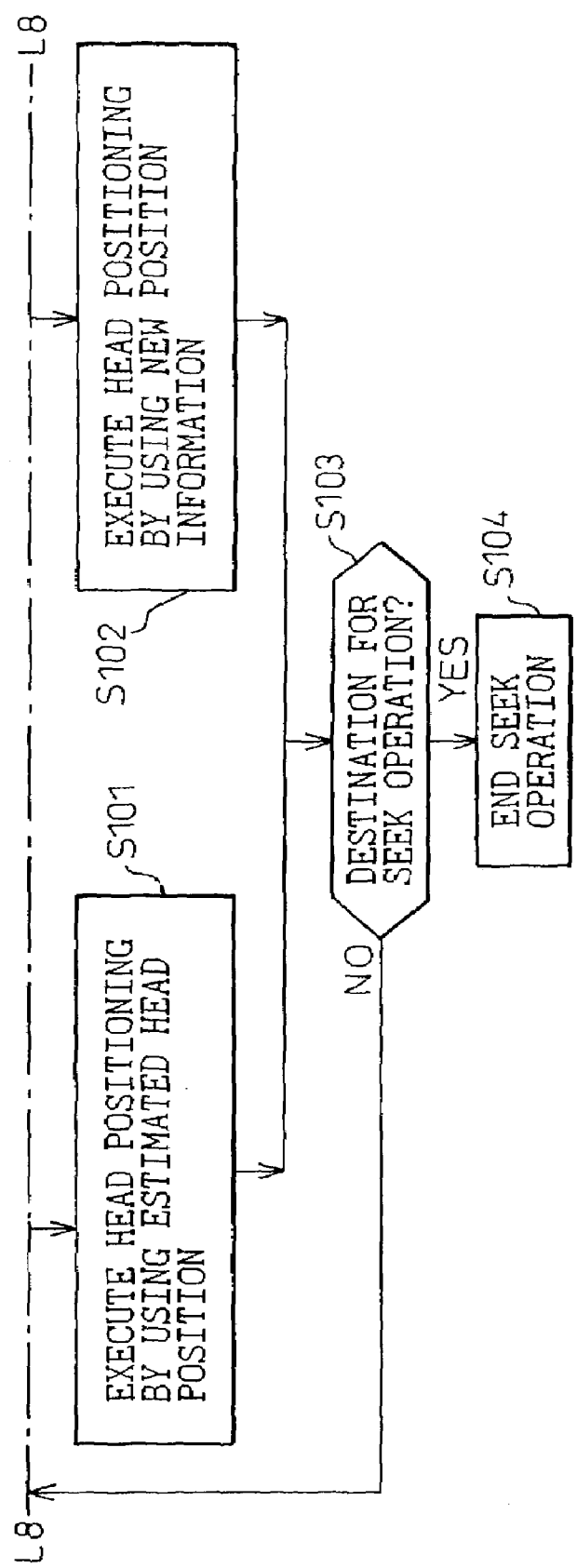
FIG. 27 is a third part of the flowchart for explaining the seek operation according to the fourth embodiment of the present invention.

FIGS. 25 to 27 are the first part to the third part, respectively, of the flowchart for explaining the seek operation according to a fourth embodiment of the present invention.

First, upon issuance of a seek command as shown in step S90, the position of the read/write head concerning the next servo signal pattern is estimated from the VCM current and the stored servo information on the read/write head position (step S91).

By comparing the table of the servo cylinders and the corresponding areas with the estimated read/write head position, the area associated with the estimated read/write head position is determined (step S92).

Further, assume that the estimated read/write head position is located on the outer side of the disk than the central servo cylinder in the area containing the servo signal patterns written with the two servo signal frequencies associated with the estimated read/write head position (step S93 in FIG. 25). Then, before reading the next servo signal pattern, the servo signal frequency of the read channel is set to the servo signal frequency of the servo signal frequency area adjoining the outer side of the area containing the servo signal patterns written with the two servo signal frequencies associated with the estimated read/write head position (step S94 in FIG. 26).

On the other hand, assume that the estimated read/write head position is located on the inner side of the disk than the central servo cylinder in the area containing the servo signal patterns written with two servo signal frequencies associated with the estimated read/write head position (step S93 in FIG. 25). Then, before reading the next servo signal pattern, the servo signal frequency of the read channel is set to the servo signal frequency of the servo signal frequency area adjoining the inner side of the area containing the servo signal patterns written with the two servo signal frequencies associated with the estimated read/write head position (step S95 in FIG. 26).

Further, as shown in step S96 of FIG. 26, each of two servo signals continuously read is demodulated. In view of the fact that the servo signal frequency of the read channel is set to one of those of two servo signals, one of the two servo signals can always be demodulated (steps S97 to S100 in FIG. 26).

The head positioning process is executed by using the positioning information for one of the two servo signals which could be successfully demodulated (owing to the normal detection of the servo sync mark) (step S102 in FIG. 27).

In the case in which the demodulation is impossible (owing to a servo sync mark detection error), on the other hand, the head positioning process is executed by using the estimated read/write head position (step S101 in FIG. 27).

In the case in which the position of the read/write head is on the servo cylinder targeted by the seek operation (step S103 in FIG. 27), the seek operation is terminated (step S104 in FIG. 27). In the case in which the read/write head is not positioned on the servo cylinder targeted by the seek operation, on the other hand, the position of the read/write head for reading the next servo signal pattern is estimated again to thereby repeat the seek operation.

In the case in which the servo cylinder placed in an on-track condition is in the area containing the servo signal patterns written with the servo signal frequencies Fs0 and Fs1, as in the seek operation, the servo signal patterns of two different servo signal frequencies arranged continuously are read successively to thereby demodulate the servo signal.

The servo signal frequency of the read channel is set to one of the servo signal frequencies Fs0 and Fs1. Therefore, the servo signal written with one of the servo signal frequencies (Fs0 and Fs1) can be demodulated. By using the result of demodulation of this servo signal, the head can be set in position.

Next, the effects of the fourth embodiment of the present invention will be explained. In the fourth embodiment described above, assume that the estimation of the read/write head position for reading the next servo signal pattern at the time of the seek operation of the read/write head leads to the fact that the estimated read/write head position is in the neighborhood of the boundary between the servo signal frequency areas. Then, even in the case in which the area of the servo signal frequency associated with the estimated read/write head position is different from the area of the servo signal frequency associated with the actual read/write head position, the areas of the two servo signal frequencies adjoin to each other.

The servo signal patterns of the two fundamental servo signal frequencies are arranged in the areas corresponding to one half of the respective areas of the two servo signal frequencies. Once the two continuously arranged servo signal patterns are read to demodulate the servo signals, therefore, the servo signal written with one of the servo signal frequencies can be demodulated. Thus, a servo signal demodulation error does not occur owing to the setting of the servo signal frequency of the read channel.

Also, the continuous occurrence of a servo signal demodulation error, which otherwise might occur owing to the setting of the servo signal frequency of the read channel even at the time of a low-speed seek operation, can be prevented.

Further, assume that the read/write head is placed on track in the boundary between the areas of the servo signal patterns written with two different servo signal frequencies. In view of the fact that an area is formed, in which two servo signal patterns of the servo signal frequencies used in the two areas are arranged, and the servo signal patterns written with two different servo signal frequencies are arranged continuously along the circumferential direction, the read/write head can read the servo signal of a single servo frequency without reading two servo signals of different servo signal frequencies simultaneously.

Furthermore, as the servo signal frequency of the read channel is set to one of the two servo signal frequencies, the servo signal can be demodulated, and the occurrence of a servo signal demodulation error, which otherwise might be caused by the setting of the servo signal frequency of the read channel, can be prevented.

Figure 28:
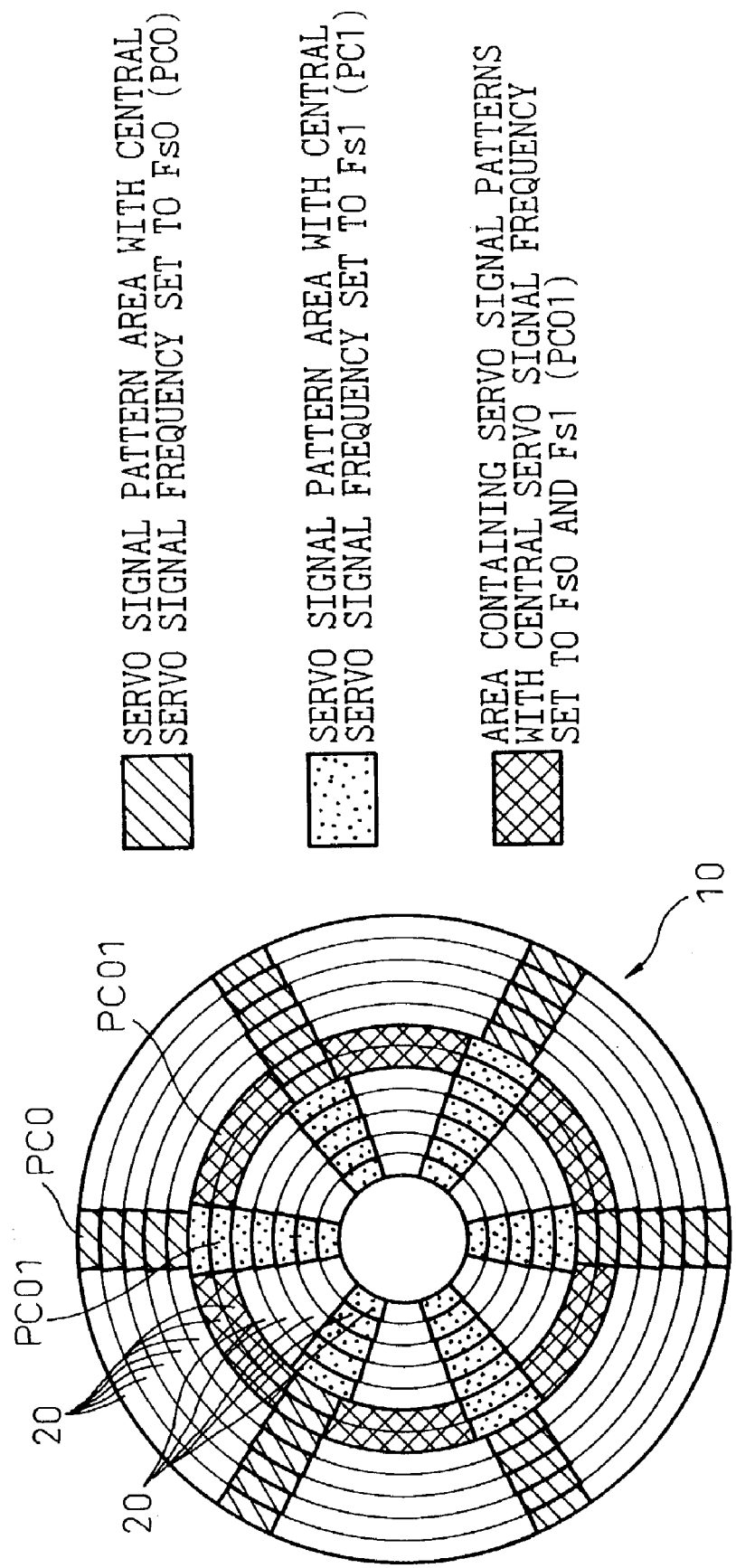
FIG. 28 is a diagram showing a layout of the servo signal patterns according to a fifth embodiment of the present invention.

FIG. 28 is a diagram showing a layout of the servo signal patterns according to a fifth embodiment of the present invention. Also in this embodiment, the servo signal patterns formed on the servo cylinders 20 of a single disk 10 are shown as a typical example.

In the fifth embodiment shown in FIG. 28, the servo signal patterns are recorded on the disk surface with a different recording density in a different area in which the servo signal is written. In this case, the portion from the inner side to the outer side of the disk 10 is divided into two areas (PC0, PC1) on the servo cylinders 20.

For each of the areas of the servo cylinders thus divided, different central servo signal frequencies Fs0 and Fs1 are set, and a servo signal pattern corresponding to the central servo signal frequency thus set is arranged in each area.

Further, for each servo cylinder, the servo signal pattern is arranged by changing the servo signal frequency from the central servo signal frequency within a range in which the servo signal frequencies can be followed by a frequency divider of a servo PLL circuit (a servo PLL circuit included in the read channel 25 of FIG. 9, for example). In this case, the recording density of the servo signal pattern is set in such a range as to secure a relatively satisfactory values of the error rate characteristic of the servo sync mark, the error rate characteristic of the gray code and the distribution characteristic of the burst value. Thus, the servo signal patterns with different servo signal frequencies for each servo cylinder are arranged based on the central servo signal frequency set for each area.

Furthermore, an area PC01, in which the servo signal patterns with the central servo signal frequencies set to Fs0 and Fs1, respectively, on the same servo cylinders, is formed in the boundary between the area PC0 of the servo signal pattern with the central servo signal frequency set to Fs0 and the area PC1 of the servo signal pattern adjoining the area PC0 of the central servo signal frequency Fs0 and having the central servo signal frequency thereof set to Fs1.

In the area PC01 in which the servo signal patterns with the central servo signal frequencies set to Fs0 and Fs1, respectively, are arranged on the same servo cylinders, the servo signal pattern with the servo signal frequency Fs0 set as the central servo signal frequency alternates with the servo signal pattern with the servo signal frequency Fs1 set as the central servo signal frequency.

In the embedded servo system, the servo signal patterns are arranged with the data area therebetween. At the time of seek operation of the read/write head, therefore, the position of the read/write head is required to be estimated before reading the next servo signal pattern.

The area containing the servo signal patterns written with two servo signal frequencies has a width, in terms of the number of servo cylinders, twice as large as the maximum position estimation error for the read/write head position.

Figure 29:
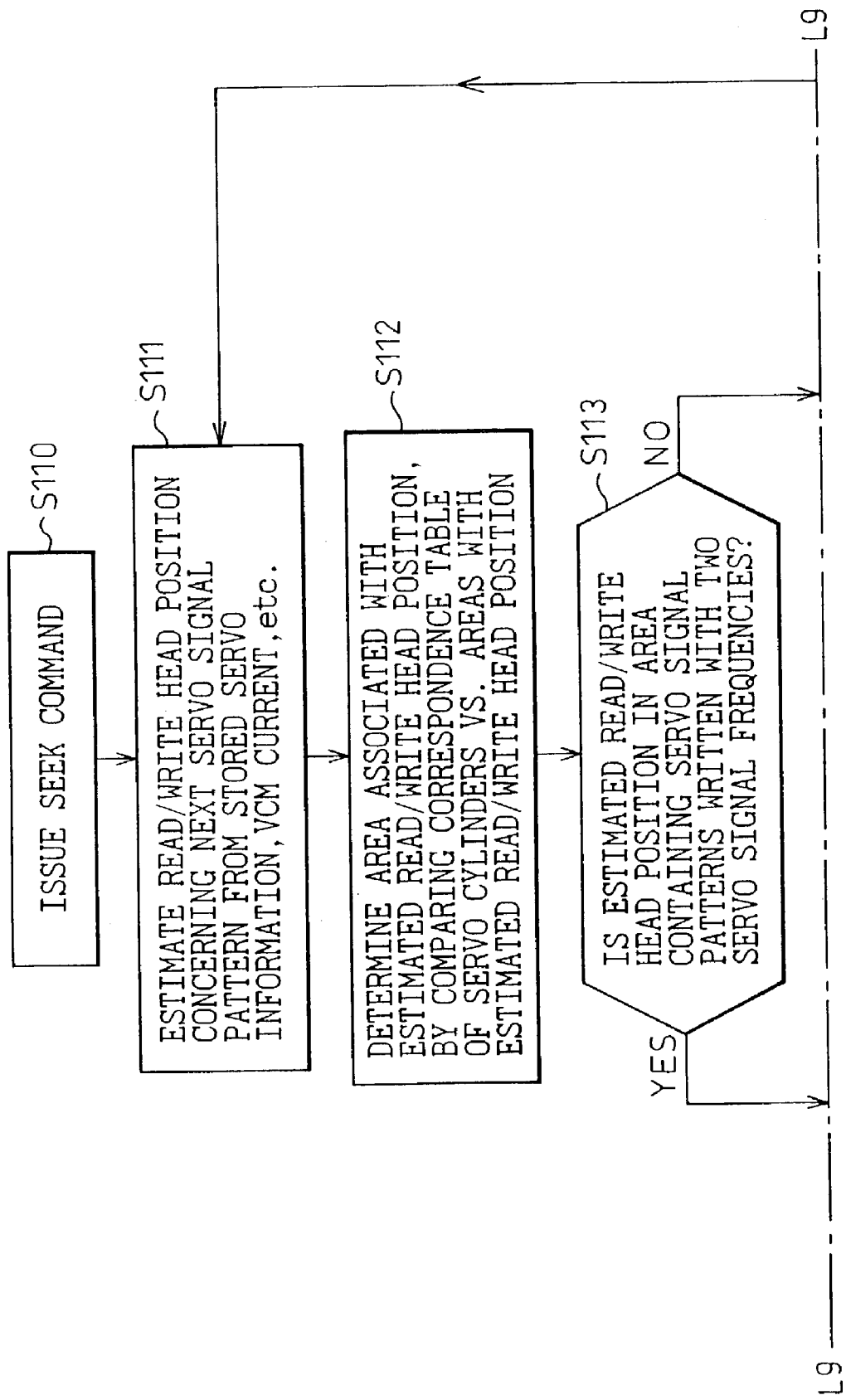
FIG. 29 is a first part of the flowchart for explaining the seek operation according to the fifth embodiment of the present invention.
Figure 30:
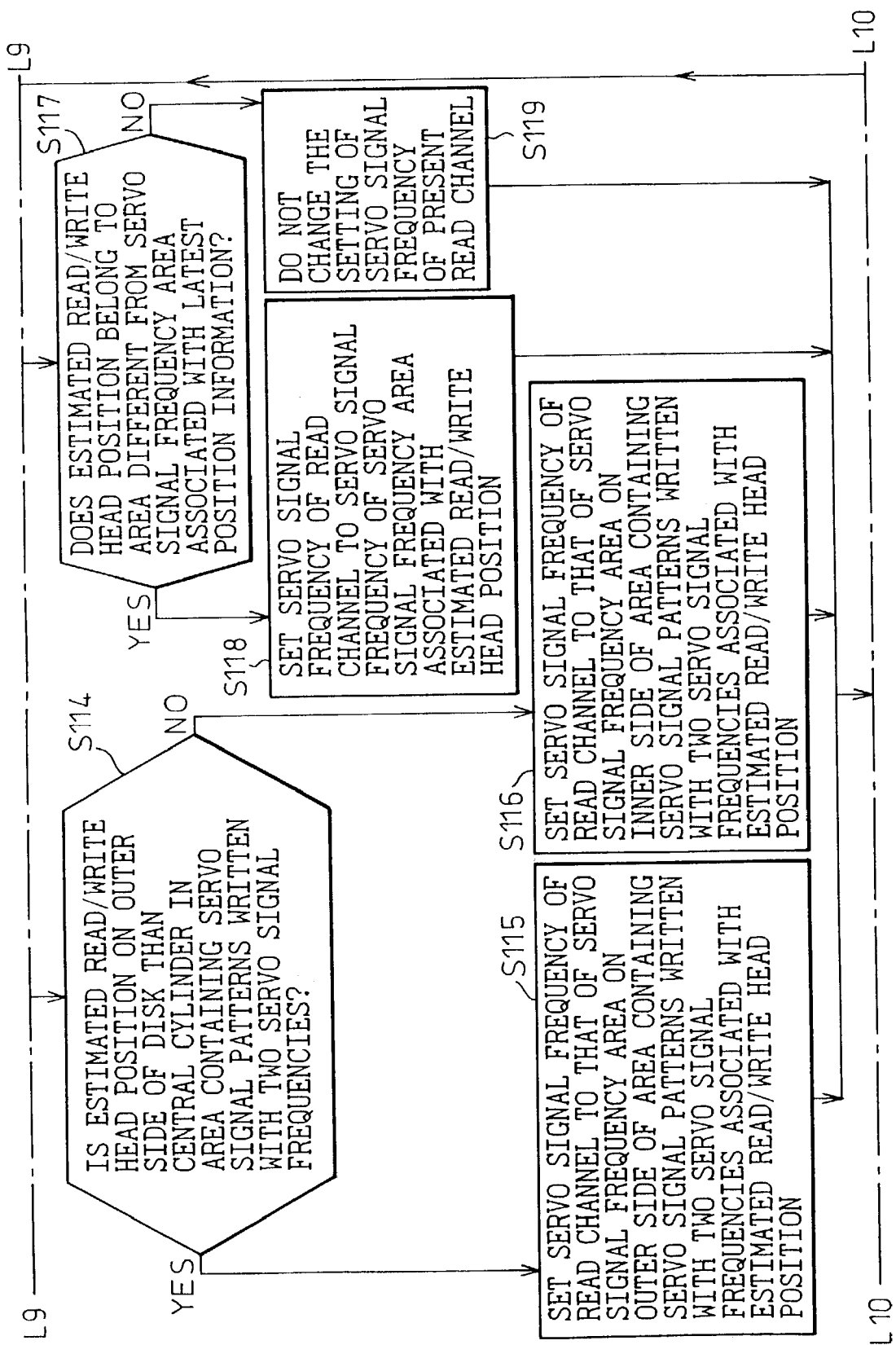
FIG. 30 is a second part of the flowchart for explaining the seek operation according to the fifth embodiment of the present invention.
Figure 31:
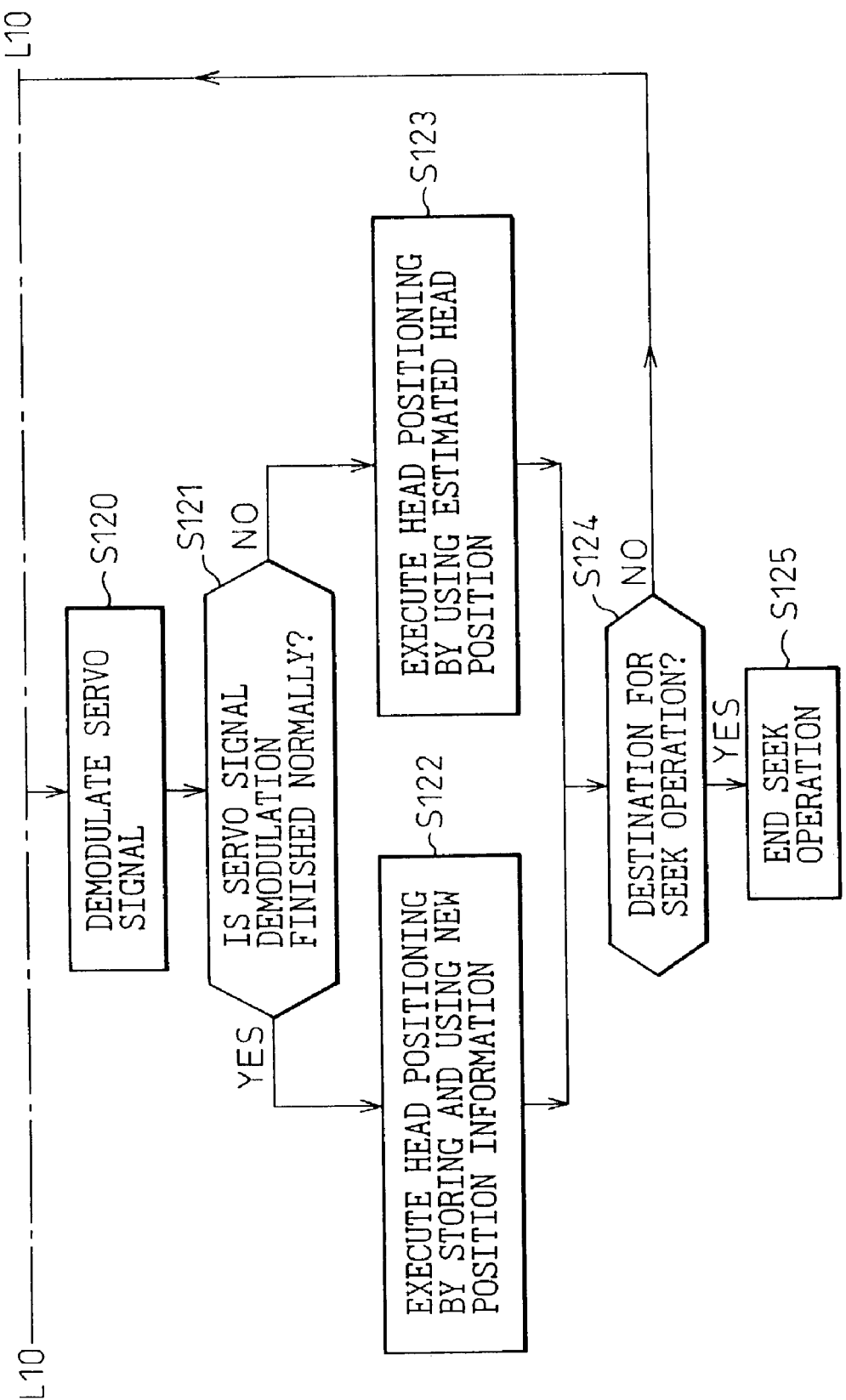
FIG. 31 is a third part of the flowchart for explaining the seek operation according to the fifth embodiment of the present invention.

FIGS. 29 to 31 are the first part to the third part, respectively, of the flowchart for explaining the seek operation according to the fifth embodiment of the present invention.

First, upon issuance of a seek command as shown in step S110, the position of the read/write head for the next servo signal pattern is estimated from the VCM current and the stored servo information on the read/write head (step S111).

By comparing the correspondence table of the servo cylinders versus the areas with the estimated read/write head position, the area associated with the estimated read/write head position is determined (step S112).

Further, assume that the estimated read/write head position is located in the area containing the servo signal patterns written with two servo signal frequencies and arranged anew in the boundary of the servo signal frequencies (step S113 in FIG. 29), and assume that the estimated read/write head position is located on the outer side of the disk than the central servo cylinder in the area containing the servo signal patterns written with the two servo signal frequencies associated with the estimated read/write head position (step S114 in FIG. 30). Then, before reading the next servo signal pattern, the servo signal frequency of the read channel is set to the servo signal frequency of the servo signal frequency area adjoining the outer side of the area containing the servo signal patterns written with the two servo signal frequencies associated with the estimated read/write head position (step S115 in FIG. 30).

On the other hand, assume that the estimated read/write head position is located in the area containing the servo signal patterns written with two servo signal frequencies and arranged anew in the boundary of the servo signal frequencies (step S113 in FIG. 29), and assume that the estimated read/write head position is located on the inner side of the disk than the central servo cylinder in the area containing the servo signal patterns written with the two servo signal frequencies associated with the estimated read/write head position (step S114 in FIG. 30). Then, before reading the next servo signal pattern, the servo signal frequency of the read channel is set to the servo signal frequency of the servo signal frequency area adjoining the inner side of the area containing the servo signal patterns written with the two servo signal frequencies associated with the estimated read/write head position (step S116 in FIG. 30).

Also, assume that the estimated read/write head position is not located in the area containing the servo signal patterns written with two servo signal frequencies and arranged anew in the boundary between the servo signal frequencies (step S113 in FIG. 29), and assume that the estimated read/write head position belongs to an area different from the servo signal frequency area associated with the latest (the most recent) read/write head position (step S117 in FIG. 30). Then, before reading the next servo signal pattern, the servo signal frequency of the read channel is set to the servo signal frequency of the area associated with the estimated read/write head position (step S118 in FIG. 30).

On the other hand, assume that the estimated read/write head position is not located in the area containing the servo signal patterns written with two servo signal frequencies and arranged anew in the boundary between the servo signal frequencies (step S113 in FIG. 29), and assume that the estimated read/write head position belongs to the same area as the servo signal frequency area associated with the latest (the most recent) read/write head position (step S117 in FIG. 30). Then, the setting of the servo signal frequency of the read channel is not changed (step S119 in FIG. 30).

Further, as shown in step S120 of FIG. 31, the servo signal is demodulated by reading the next servo signal pattern.

The servo signal frequency, though different for a different servo cylinder in this case, is included in the range of capability of being followed by the frequency divider of the servo PLL circuit of the read channel. Therefore, the servo frequency of the servo signal can be followed and the servo signal can be demodulated.

In the case in which the servo signal cannot be demodulated (owing to a servo sync mark detection error) (step S121 in FIG. 31), the head positioning process is executed by using the estimated read/write head position (step S123 in FIG. 31).

In the case in which the servo signal can be successfully demodulated (owing to the normal detection of the servo sync mark) (step S121 in FIG. 31), on the other hand, the demodulated positioning information are stored in memory, and the head positioning process executed by using the positioning information newly obtained (step S122 in FIG. 31).

In the case in which the read/write head position is on the servo cylinder targeted by the seek operation (step S124 in FIG. 31), the seek operation is terminated (step S125 in FIG. 31). In the case in which the read/write head position is not on the servo cylinder targeted by the seek operation, on the other hand, the read/write head position for reading the next servo signal pattern is estimated again.

Figure 32:
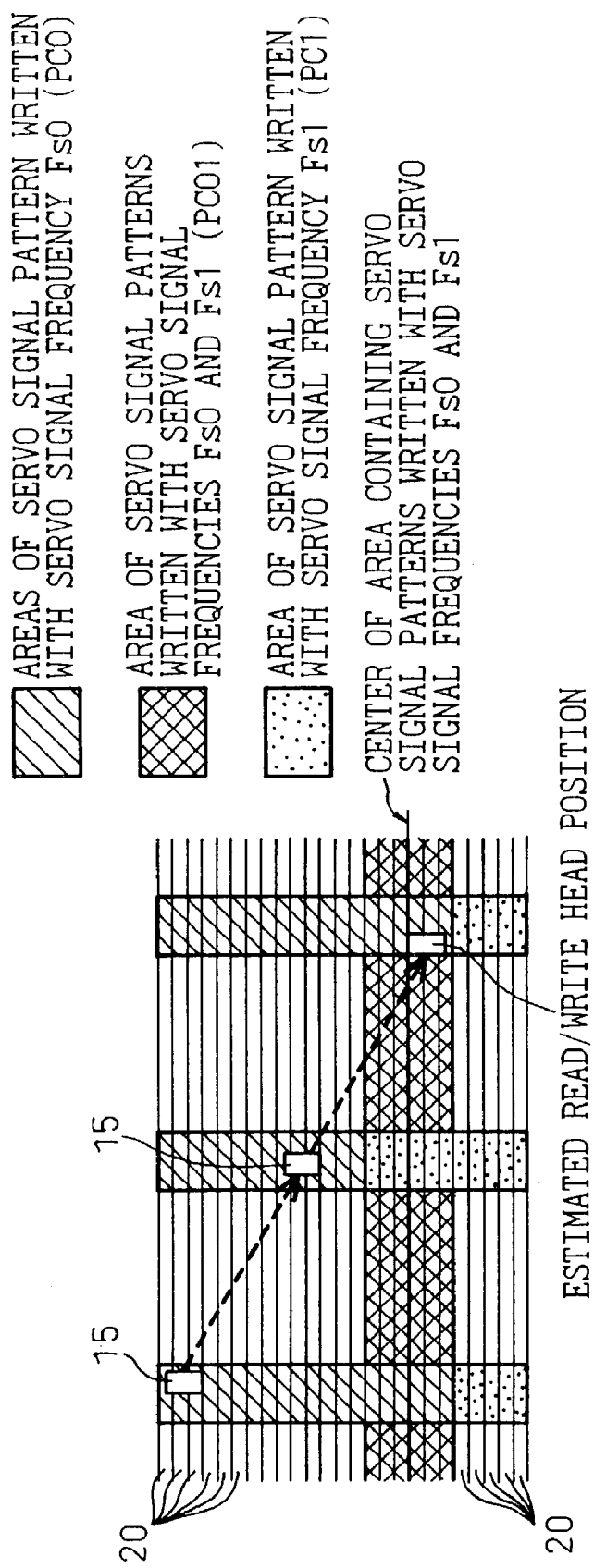
FIG. 32 is a schematic diagram showing the estimated position of the read/write head according to the fifth embodiment of the present invention.

FIG. 32 is a schematic diagram showing the estimated read/write head position according to the fifth embodiment of the present invention. With reference to FIG. 32, the effects of the fifth embodiment will be explained.

In the fifth embodiment, assume that the position of the read/write head for reading the next servo signal is estimated to exist in the boundary between the areas of the servo signal frequencies, i.e., in the area in which the servo signals written with two servo signal frequencies provided anew are arranged on the same servo cylinders. Even in the case in which the estimated read/write head position contains an estimation error and the estimated read/write head position is different from the position actually reached by the read/write head, the area in which the servo signal patterns written with two servo signal frequencies provided anew are arranged on the same servo cylinders is twice as large as the estimation error, in terms of the number of servo cylinders.

By setting the servo signal frequency of the read channel to one of the two servo signal frequencies, therefore, the servo signal can be demodulated with the probability of 1/2, with regard to the servo signal patterns of two different servo signal frequencies arranged alternately on the servo cylinders.

On the other hand, assume that the read/write head passes through the neighborhood of the new area in which the servo signal patterns written with two servo signal frequencies, at the time of a low-speed seek operation. Also, assume that the estimated read/write head position contains an estimation error and the servo signal frequency of the read channel is different from the servo signal frequency of the read servo signal, thereby making the demodulation of the servo signal impossible. Even in such a case, the servo signal frequency of the servo signal next to be read is the set servo signal frequency, and therefore it is possible to demodulate the servo signal. Thus, a seek error, which otherwise might make the continuous demodulation of several servo signals impossible, can be prevented.

In this case, by setting a different servo signal frequency for a different servo cylinder, the range of the recording density of the servo signal pattern on the disk surface can be further reduced. In this way, it becomes possible to use a disk with satisfactory values of the error rate characteristic of the servo sync mark, the error rate characteristic of the gray code and the distribution characteristic of the burst value.

Figure 33:
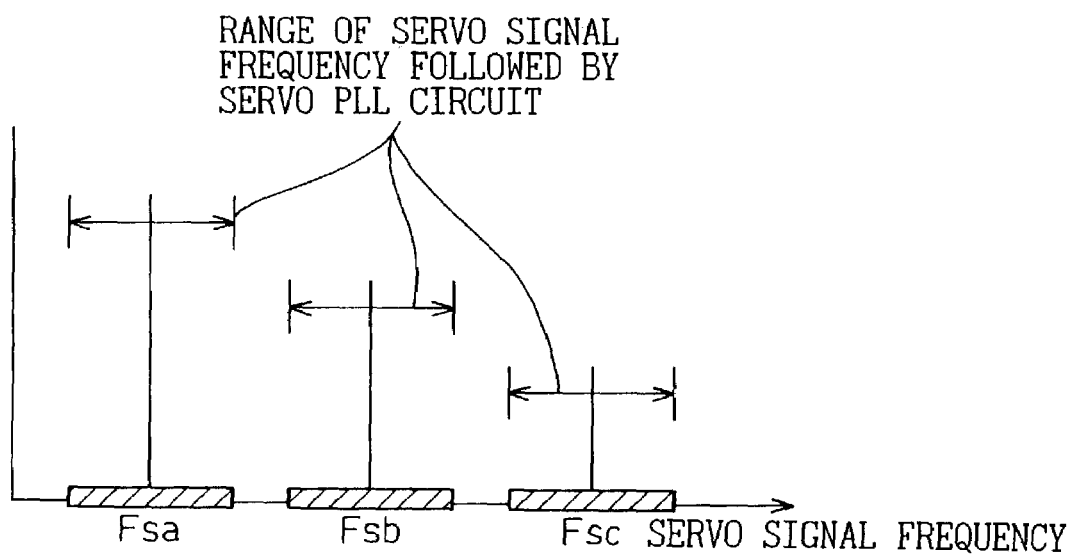
FIG. 33 is a diagram showing an unusable range of the servo signal frequencies handled by a servo PLL circuit, which cannot be demodulated by a read channel in the fifth embodiment of the present invention.
Figure 34:
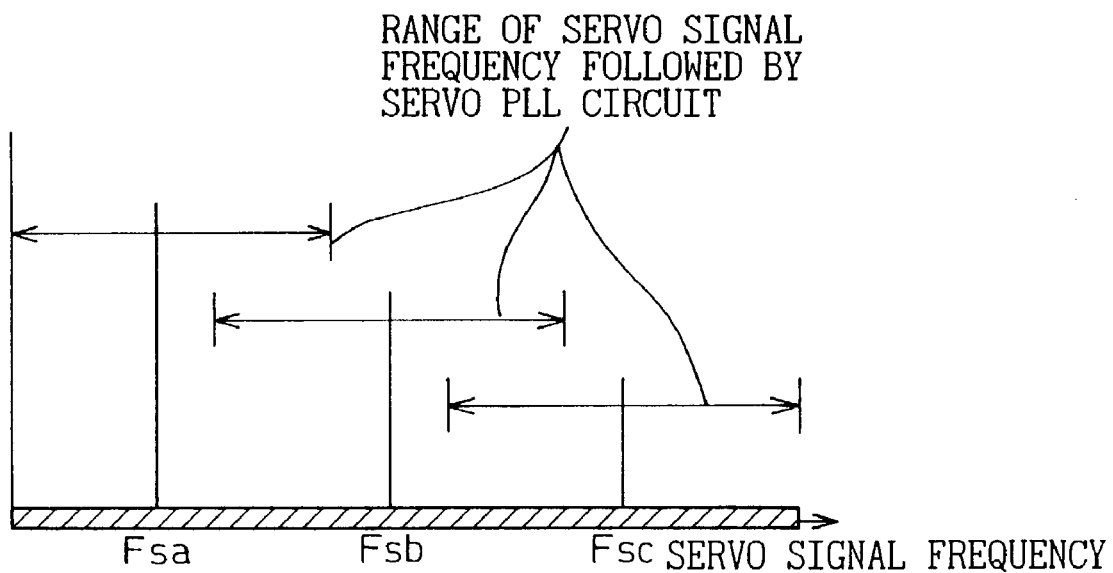
FIG. 34 is a diagram showing a usable range of the servo signal frequencies handled by a servo PLL circuit, which can be demodulated by a read channel in the fifth embodiment of the present invention.

FIG. 33 is a diagram showing an unusable range of the servo signal frequency handled by the servo PLL circuit, which cannot be demodulated by a read channel in the fifth embodiment of the present invention; and FIG. 34 is a diagram showing a usable range of the servo signal frequency handled by the servo PLL circuit, which can be demodulated by a read channel in the fifth embodiment of the present invention.

With reference to FIGS. 33 and 34, a more detailed explanation will be given concerning the range of the servo signal frequency in which the servo PLL circuit can pull in, while the setting of the servo signal frequency is changed for each servo cylinder according to the fifth embodiment.

According to the fifth embodiment, assume that the servo signal patterns are arranged with the servo signal frequency changed for each servo cylinder from the central servo signal frequency set in each area of the servo signal frequency. The frequency range of the servo signal changed from the central servo signal frequency is desirably not limited to the range of the servo signal frequency followed by the servo PLL circuit. In other words, the recording density of the servo signal pattern on the maximum outer diametrical side and the minimum inner diametrical side of the servo signal frequency area are desirably set in a relatively satisfactory range of the error rate characteristic of the servo sync mark, the error rate characteristic of the gray code and the distribution characteristic of the burst value.

As far as the servo signal frequency that can be demodulated by the read channel is concerned, as shown in FIG. 33, only discrete servo signal frequencies (Fsa, Fsb and Fsc, for example) can be set by limiting the size of the servo PLL circuit mounted in the disk device. In the case in which the servo signal frequency is changed by using the servo PLL circuit of the read channel, therefore, there exists a range of the servo signal frequency which the read channel cannot demodulate (i.e. a range in which the servo signal frequency cannot be followed).

To deal with this inconvenient situation, in FIG. 34, the range in which the servo signal frequency can be followed is preset in such a way as to superimpose the ranges of variations of a plurality of servo signal frequencies (Fsa, Fsb and Fsc, for example) set by the servo PLL circuit of the read channel, with each other. By doing so, the ranges of variations of the servo signal frequency that can be followed by the servo PLL circuit are superimposed with each other in all the servo signal frequency bands set on the disk surface. Thus, a servo signal frequency band that cannot be followed is eliminated between a given servo signal frequency set by the servo PLL circuit of the read channel and an adjoining servo signal frequency.

In other words, assume that the area of a single servo signal frequency has a wide range of changing the servo signal frequency and the read channel is set to the central servo signal frequency of each area. A single servo signal frequency may be impossible to follow. Even in such a case, the servo signal frequency can be followed by the servo PLL circuit by resetting the read channel to the servo signal frequency adjoining the central servo signal frequency, thereby making it possible to demodulate the servo signal correctly.

As a result, the recording density of the servo signal pattern on the outermost diametrical side and the innermost diametrical side of the servo signal frequency area can be set in a wider servo signal frequency range in which relatively satisfactory values of the error rate characteristic of the servo sync mark, the error rate characteristic of the gray code and the distribution characteristic of the burst value can be obtained.

Figure 35:
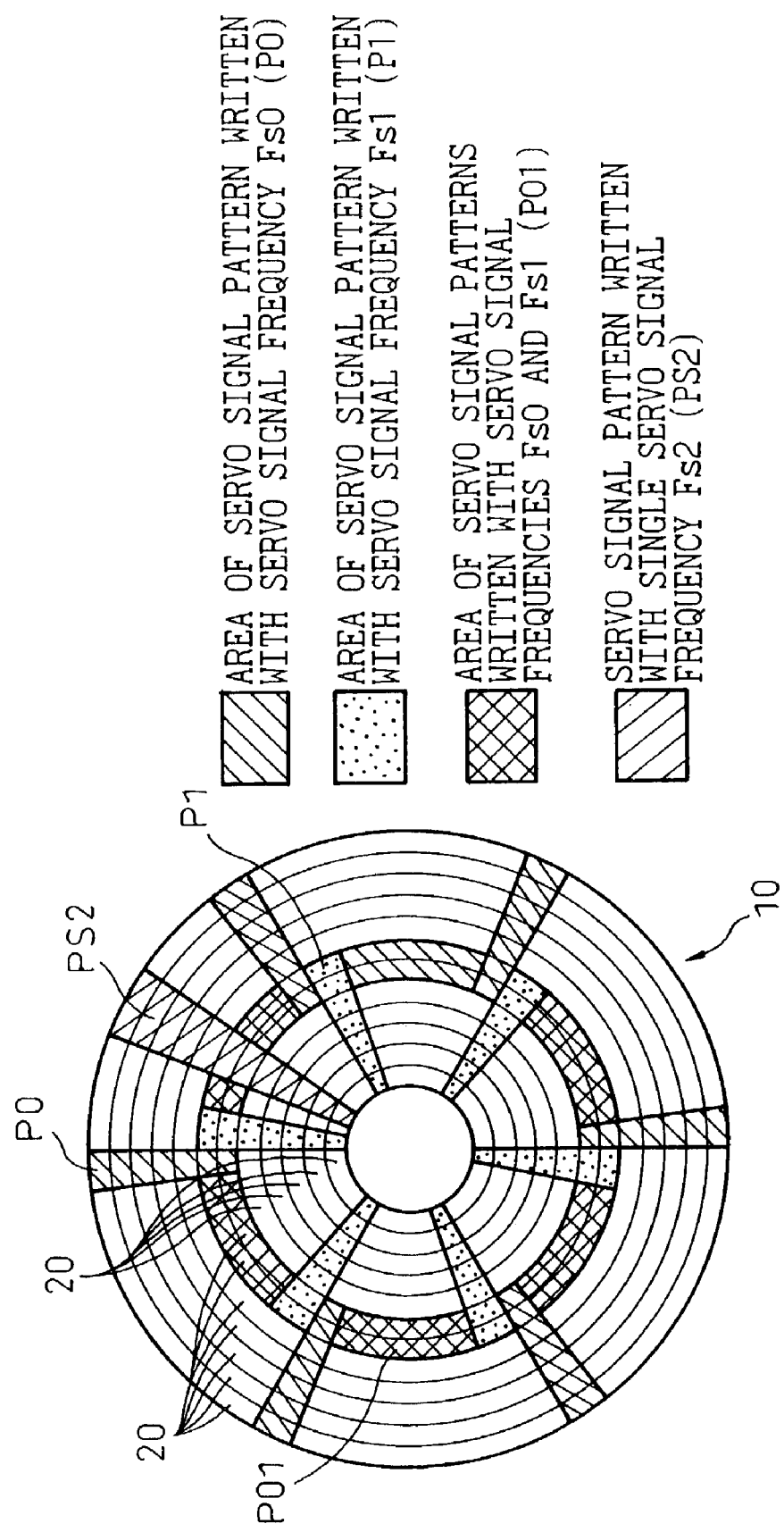
FIG. 35 is a diagram showing a layout of the servo signal patterns according to a sixth embodiment of the present invention.

FIG. 35 is a diagram showing a layout of the servo signal patterns according to a sixth embodiment of the present invention. Also in this case, the servo signal patterns formed on the servo cylinders 20 of a single disk 10 are shown as a typical example.

According to the sixth embodiment shown in FIG. 35, the servo signal patterns on the disk surface are recorded with the recording density changed in the areas in which the servo signal is written on the disk surface. In this case, the portion of the disk 10 from the inner side to the outer side is divided into two areas (P0, P1) on the servo cylinders 20.

In each of the areas of the servo cylinders thus divided, different servo signal frequencies Fs0 and Fs1 are set and the servo signal patterns of the servo signal frequencies thus set are arranged.

In this case, as far as the central servo signal frequency of each area is concerned, the recording density of the servo signal pattern on the outermost diametrical side and the innermost diametrical side of each area is set in such a way as to secure relatively satisfactory values of the error rate characteristic of the servo sync mark, the error rate characteristic and the distribution characteristic of the burst value.

Further, an area P01, in which the servo signal patterns with the central servo signal frequencies set to Fs0 and Fs1, respectively, are arranged on the same servo cylinder, is formed in the boundary between an area P0 of the servo signal pattern with the servo signal frequency set to Fs0 and an area P1 of the servo signal pattern with the servo signal frequency set to Fs1 and adjoining the area P0 of the servo signal pattern with the servo signal frequency set to Fs0.

In the area P01 in which two servo signal patterns written with the servo signal frequency Fs0 and the servo signal frequency Fs1, respectively, are arranged on the same servo cylinders, the servo signal patterns of the two different servo signal frequencies are arranged continuously and closely to each other along the circumferential direction of the disk in such a way as not to be read simultaneously.

On the other hand, even in the case in which the area containing two servo signal patterns and the area of the servo signal frequency are different from each other, the servo signal patterns written with the same servo signal frequency and the servo signal patterns arranged in the area of the servo signal frequency are arranged with the head portions thereof in phase with each other.

In the embedded servo system, the servo signal patterns are arranged with the data area therebetween. At the time of the seek operation of the read/write head, therefore, the position of the read/write head for reading the next servo signal pattern is required to be estimated before reading the next servo signal pattern, and therefore, the estimation error of this read/write head position is required to be taken into consideration. The area, in which the servo signal pattern written with the servo signal frequency Fs0 and the servo signal pattern written with the servo signal frequency Fs1 are arranged on the same servo cylinders, has a width, in terms of the number of servo cylinders, twice as large as the maximum position estimation error of the read/write head position.

In this case, in addition to the servo signal patterns with different servo signal frequencies, a servo signal pattern written with a single servo signal frequency Fs2 (the area PS2, for example) is arranged from the inner side to the outer side of the disk 10 in a portion thereof on the servo cylinders.

Figure 37B:
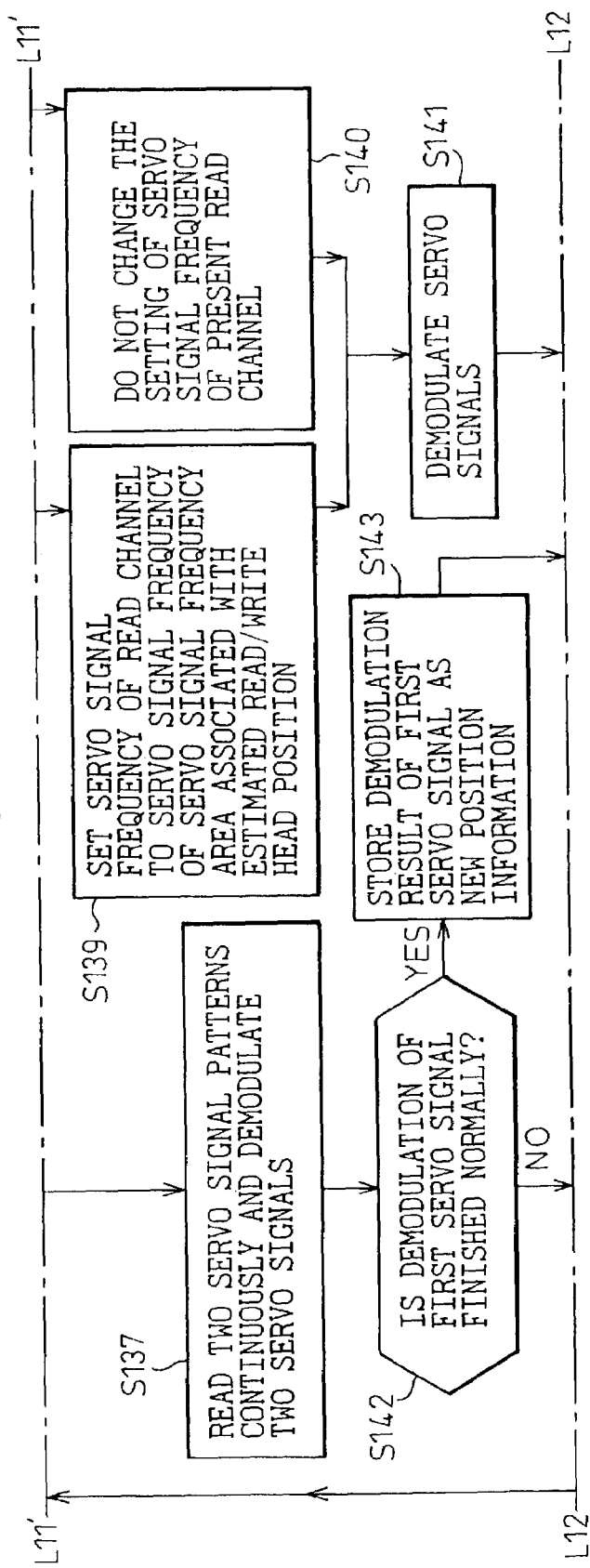
FIG. 37B is a third part of the flowchart for explaining the seek operation according to the sixth embodiment of the present invention.
Figure 38:
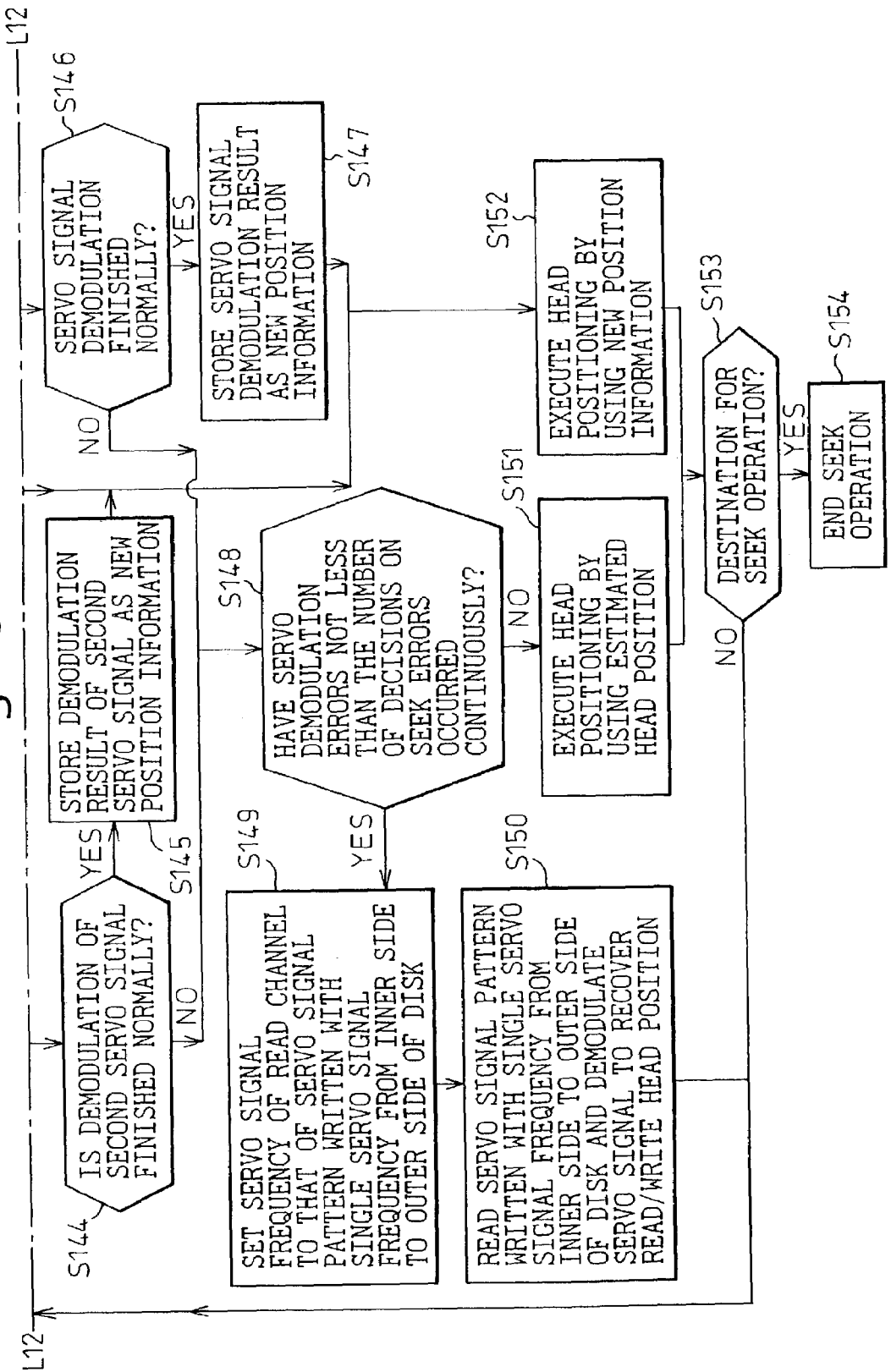
FIG. 38 is a fourth part of the flowchart for explaining the seek operation according to the sixth embodiment of the present invention.

FIGS. 36 to 38 are the first part to the fourth part, respectively, of the flowchart for explaining the seek operation according to a sixth embodiment of the present invention.

First, upon issuance of a seek command as shown in step S130, the position of the read/write head for the next servo signal pattern is estimated from the VCM current and the stored servo information on the read/write head position (step S131).

By comparing the correspondence table of the servo cylinders versus the areas with the estimated read/write head position, the area associated with the estimated read/write head position is determined (step S132).

Further, assume that the estimated read/write head position is located in the area arranged anew in the boundary of the servo signal frequencies and containing the servo signal patterns written with two servo signal frequencies (step S133 in FIG. 36), and assume that the estimated read/write head position is located on the outer side of the disk than the central servo cylinder in the area containing the servo signal patterns written with two servo signal frequencies associated with the estimated read/write head position (step S134 in FIG. 37A). Then, before reading the next servo signal pattern, the servo signal frequency of the read channel is set to the servo signal frequency set for the servo signal frequency area adjoining the outer side of the area containing the servo signal patterns written with two servo signal patterns associated with the estimated read/write head position (step S135 in FIG. 37A).

On the other hand, assume that the estimated read/write head position is located in the area containing the servo signal patterns written with two servo signal frequencies arranged anew in the boundary of the servo signal frequency areas (step S133 in FIG. 36), and assume that the estimated read/write head position is on the inner side of the disk than the central servo cylinder in the area containing the servo signal patterns written with two servo signal frequencies associated with the estimated read/write head position (step S134 in FIG. 37A). Then, before reading the next servo signal pattern, the servo signal frequency of the read channel is set to that of the servo signal frequency area adjoining the inner side of the area containing the servo signal patterns written with two servo signal patterns associated with the estimated read/write head position (step S136 in FIG. 37A).

Also, assume that the estimated read/write head position is not located in the area containing the servo signal patterns written with two servo signal frequencies arranged anew in the boundary of the servo signal frequency areas (step S133 in FIG. 36), and assume that the estimated read/write head position belongs to an area different from the servo signal frequency area associated with the latest (the most recent) read/write head position (step S138 in FIG. 37A). Then, before reading the next servo signal pattern, the servo signal frequency of the read channel is set to that of the servo signal frequency area associated with the estimated read/write head position (step S139 in FIG. 37B).

On the other hand, assume that the estimated read/write head position is not located in the area containing the servo signal patterns written with two servo signal frequencies arranged anew in the boundary of the servo signal frequency areas (step S133 in FIG. 36), and assume that the estimated read/write head position belongs to the same area as the servo signal frequency area associated with the latest (the most recent) read/write head position (step S138 in FIG. 37A). Then, the setting of the servo signal frequency of the read channel is not changed (step S140 in FIG. 37B).

Further, in the case in which the estimated read/write head position is located in the area containing the servo signal patterns written with two servo signal frequencies arranged anew in the boundary of the servo signal frequency areas, the two servo signals continuously read are demodulated individually (step S137 in FIG. 37A).

The servo signal frequency of the read channel is set to one of two different servo signals, and therefore, one of the two servo signals can always be demodulated (steps S142 and S143 in FIG. 37B, and steps S144 and S145 in FIG. 38).

The head positioning process is executed by using the positioning information for that one of the two servo signals which could be demodulated (owing to the normal detection of the servo sync mark) (step S151 in FIG. 38).

In the case in which the estimated read/write head position is not located in the area containing the servo signal patterns written with two servo signal frequencies arranged anew in the boundary of the areas of the servo signal frequency areas, then the next servo signal pattern is read and the servo signal demodulation is executed (step S141 in FIG. 37B).

In the case in which the servo signal could not be demodulated (owing to a servo sync mark detection error) (step S146 in FIG. 38) and the servo signal demodulation error does not continuously occur more than the number of decisions on seek errors (step S148 in FIG. 38), then the head positioning operation is executed by using the estimated read/write head position (step S151 in FIG. 38).

In the case in which the servo signal could be demodulated (owing to the normal detection of the servo sync mark) (step S146 in FIG. 38), on the other hand, the demodulated positioning information is stored in a memory unit (step S147 in FIG. 38), and the head positioning operation is executed by using the positioning information obtained anew (step S152 in FIG. 38).

As long as the read/write head position is located on the servo cylinder targeted by the seek operation (step S153 in FIG. 38), the seek operation is terminated (step S154 in FIG. 38). Unless the read/write head position is located on the servo cylinder targeted by the seek operation, on the other hand, the position of the read/write head for reading the next servo signal pattern is estimated again to thereby repeat the seek operation.

On the other hand, assume that the servo signal demodulation error occurs in the number of times more than the determined number of seek errors continuously and the servo signal could not be demodulated (step S148 in FIG. 38). Then, it is determined that the setting error of the servo signal frequency has occurred and, in order to read the servo signal pattern written with a single servo signal frequency from the inner side to the outer side of the disk, the servo signal frequency of the read channel is set to the servo signal frequency (Fs2) of the servo signal pattern written with a single servo signal frequency from the inner side to the outer side of the disk (step S149 in FIG. 38).

Further, the servo signal pattern written with a single servo signal frequency arranged at one portion on the servo cylinder from the inner side to the outer side of the disk is read to thereby recover the positioning information of the read/write head (step S150 in FIG. 38). The servo signal frequency of the read channel is reset in such a way as to secure a servo signal frequency corresponding to the position of the read/write head again, and the seek operation is continued.

Now, the effects of the sixth embodiment of the present invention will be explained. Once the read/write head position has greatly deviated from the target cylinder owing to an external force or the like, the read/write head position moves to the area of a different servo signal frequency. As a result, the servo signal frequency set in the read channel is considerably differentiated from the servo signal frequency of the servo signal actually read from the read/write head, thereby making it sometimes impossible to demodulate the servo signal.

In the event that a seek error occurs during the seek operation, it is necessary to force the read/write head to move toward a position corresponding to the servo cylinder on the innermost diametrical side or the like, in which the read/write head can move without any positioning information, and the servo signal frequency is clarified, and the read/write head is set in position again.

According to the sixth embodiment described above, one servo signal pattern written with a single servo signal frequency is arranged over a plurality of servo cylinders from the inner side to the outer side, in addition to the servo signal patterns with different servo signal frequencies.

By doing so, even in the case in which the servo signal frequency set for the read channel deviates from the servo signal frequency of the servo signal to be read, the position information can be recovered from the servo signal pattern written with a single servo signal frequency by setting the servo signal frequency of the read channel to that of the servo signal written with the single servo signal frequency, regardless of the servo signal frequency area. As a result, without forcing the read/write head to move toward a specific servo cylinder, such as the servo cylinder on the innermost diametrical side, the servo signal frequency can be set again to that of the area associated with the read/write head position. In this way, the servo signal frequency of the read channel can be reset within a short time length.

The disk mounted on the disk device applicable according to the first to sixth embodiments described above may be removable from the disk device as in the case in which it is used as a single sheet of STW. In such a case, the disk can be shipped as a disk medium, independently of the disk device, with the servo cylinders having written therein the servo signal patterns used in the first to sixth embodiments.

As described above, according to typical embodiments of the present invention, a plurality of servo cylinders are divided into several areas, and at the same time, the servo signal frequency for each area is set so that the recording density of the servo signals recorded from the inner portion to the outer portion of the disk may be included in a relatively superior range of the demodulation characteristic. At the time of the seek operation of the read/write head, therefore, the read/write head position for reading the next servo signal pattern can be accurately estimated, and the servo signal-in the actual read/write head position can be correctly demodulated over all the areas on the disk surface.

Further, according to typical embodiments of the present invention, a plurality of servo cylinders are divided into several areas from the inner portion to the outer portion of the disk, and an area, in which the servo signal pattern written with the servo signal frequency of the area of a first servo signal frequency and the servo signal pattern written with the servo signal frequency of the area of a second servo signal frequency are arranged on the same servo cylinder, is formed in the boundary between the area of the first servo signal frequency and the area of the second servo signal frequency adjoining the area of the first servo signal frequency. Therefore, when the read/write head carries out the seek operation, the position of the read/write head for reading the next servo signal pattern can be accurately estimated, thereby making it possible to demodulate a servo signal with high quality regarding the demodulation characteristic of the servo signal.

The invention claimed is:

1. A disk device in which a plurality of servo cylinders formed concentrically from the inner diametrical portion to the outer diametrical portion of at least one disk are divided into predetermined areas, and different servo signal frequencies are set for the divided predetermined areas, respectively, and a servo signal pattern corresponding to the servo signal frequency set for each of said areas is formed in each of said areas, and the servo signal frequency set for each of said areas is stored in advance, wherein the boundary between the area of a first servo signal frequency and the area of a second servo signal frequency adjoining the area of said first servo signal frequency is formed with an area in which a servo signal pattern written with the servo signal frequency of said first servo signal frequency area and a servo signal pattern written with said second servo signal frequency of said second servo signal frequency area are arranged on the same servo cylinders.

2. A disk device according to claim 1, wherein the number of said servo cylinders in said area in which the servo signal patterns written with two different servo signal frequencies are arranged on the same servo cylinders is not less than the number of servo cylinders corresponding to the maximum estimated error of the estimated position of a read/write head determined by a head position estimation means at the time of a seek operation by using said read/write head.

3. A disk device according to claim 1, wherein among the servo signal patterns arranged in the servo signal frequency areas and the servo signal patterns arranged in said area in which the servo signal patterns written by two different servo signal frequencies are arranged on the same servo cylinders, the servo signal patterns having the same servo signal frequency are arranged in the head portions on the same cylinders so as to make the servo signal patterns in phase with each other.

4. A disk device according to claim 1, wherein two servo signal patterns having the same servo positioning information written with the servo signal frequencies of the adjoining servo signal frequency areas are arranged continuously in said area in which the servo signal patterns written with two different servo signal frequencies are arranged on the same servo cylinders.

5. A disk device according to claim 4, wherein the servo signals obtained by reading two servo signal patterns of different frequencies arranged continuously are demodulated successively, and a read/write head is set in position by using the result of demodulation of that servo positioning information of one of said servo signal patterns which has been demodulated successfully.

6. A disk device according to claim 1, wherein a read/write head carries out a seek operation in such a way that the position of said read/write head for reading the next servo signal pattern is estimated; and
wherein, in the case in which the servo cylinders corresponding to said estimated position of said read/write head belong to an area with the servo signal patterns written with two different servo signal frequencies and arranged on the same servo cylinders, said area is set to the servo signal frequency equal to the servo signal frequency of one of the servo signal frequency areas adjoining said area with the servo signal patterns written with two different servo signal frequencies and arranged on the same servo cylinders which is far from the area associated with the read/write head position with the last servo positioning information thereof demodulated; and
wherein, in the case in which the servo cylinders corresponding to said estimated position of said read/write head belong to the same area as the area associated with the read/write head position with the last servo positioning information thereof demodulated, the present servo signal frequency is set, while in the case in which the servo cylinders corresponding to said estimated position of said read/write head belong to any area other than said area associated with the read/write head position with the last servo positioning information thereof demodulated, the servo signal frequency of the servo signal frequency area associated with said servo cylinders corresponding to said estimated position of said read/write head is set.

7. A disk device according to claim 1, wherein a read/write head carries out a seek operation in such a way that the position of said read/write head for reading the next servo signal pattern is estimated; and
wherein, in the case in which the servo cylinders corresponding to said estimated position of said read/write head belong to an area with the servo signal patterns written with two different servo signal frequencies and arranged on the same servo cylinders, said area is set to the servo signal frequency equal to the servo signal frequency of one of the servo signal frequency areas adjoining said area with the servo signal patterns written with two different servo signal frequencies and arranged on the same servo cylinders which is nearer to the servo cylinders corresponding to the estimated position of said read/write head; and
wherein, in the case in which the servo cylinders corresponding to said estimated position of said read/write head belong to the same area as the area associated with the read/write head position with the last servo positioning information thereof demodulated, the present servo signal frequency is set, while in the case in which the servo cylinders corresponding to said estimated position of said read/write head belong to any area other than said area associated with the read/write head position with the last servo positioning information thereof demodulated, the servo signal frequency of the servo signal frequency area associated with said servo cylinders corresponding to said estimated position of said read/write head is set.

8. A disk device according to claim 1, wherein two servo signal patterns having the same servo positioning information written with the servo signal frequencies of the adjoining servo signal frequency areas are arranged alternately with each other in said area in which the servo signal patterns written with two different servo signal frequencies are arranged on the same servo cylinders.

9. A disk device in which a plurality of servo cylinders formed concentrically from the inner diametrical portion to the outer diametrical portion of at least one disk are divided into predetermined areas, and different servo signal frequencies are set for the divided predetermined areas, respectively, and a servo signal pattern corresponding to the servo signal frequency set for each of said areas is formed in each of said areas, and the servo signal frequency set for each of said areas is stored in advance,
wherein a servo signal pattern written with a servo signal frequency set in the area of a first servo signal frequency, and either a servo signal pattern written with a servo signal frequency set in the area of a second servo signal frequency adjoining said area of said first servo signal frequency or a servo signal pattern written with a servo signal frequency set in the area of a third servo signal frequency adjoining said area of said first servo signal frequency, are arranged on the same servo cylinders in said area of said first servo signal frequency.

10. A disk device in which a plurality of servo cylinders formed concentrically from the inner diametrical portion to the outer diametrical portion of at least one disk are divided into several areas, and different servo signal frequencies are set for different areas thus divided, respectively, and the servo signal pattern of a servo signal frequency set for each of said areas is formed in each of said areas, and the servo signal patterns written with a single servo signal frequency from the inner diametrical portion to the outer diametrical portion of said disk are formed on the same servo cylinders.

11. A disk medium in which a plurality of servo cylinders formed concentrically from the inner diametrical portion to the outer diametrical portion of the surface of at least one disk are divided into predetermined areas, and different servo signal frequencies are set for the divided predetermined areas, respectively, and the servo signal pattern of the servo signal frequency set for each of said areas is formed in each of said areas,
   wherein a plurality of said servo cylinders are divided into predetermined areas and, at the same time, the servo signal frequency for each of said areas is set so that the recording density of a servo signal recorded on the surface of said disk can be set so as to allow the demodulation characteristic of said servo signals to be included in a relatively superior range.

12. A disk medium in which a plurality of servo cylinders formed concentrically from the inner diametrical portion to the outer diametrical portion of the surface of at least one disk are divided into predetermined areas, and different servo signal frequencies are set for the divided predetermined areas, respectively, and the servo signal pattern of the servo signal frequency set for each of said areas is formed in each of said areas,
   wherein the boundary between the area of a first servo signal frequency and the area of a second servo signal frequency adjoining said area of said first servo signal frequency is formed with an area in which a servo signal pattern written with the servo signal frequency of said first servo signal frequency area and a servo signal pattern written with the servo signal frequency of said second servo signal frequency area are arranged on the same servo cylinders.

13. A disk medium according to claim 12, wherein the number of said servo cylinders in said area in which the servo signal patterns written with two different servo signal frequencies are arranged on the same servo cylinders is not less than the number of servo cylinders corresponding to the maximum estimated error of the estimated position of said read/write head at the time of a seek operation by using a read/write head.

14. A disk medium according to claim 12, wherein among the servo signal patterns arranged in the servo signal frequency areas and the servo signal patterns arranged in said area in which the servo signal patterns written by two different servo signal frequencies are arranged on the same servo cylinders, the servo signal patterns having the same servo signal frequency are arranged in the head positions on the same cylinders so as to make the servo signal patterns in phase with each other.

15. A disk medium according to claim 12, wherein two servo signal patterns having the same servo positioning information written with the servo signal frequencies of the adjoining servo signal frequency areas are arranged continuously in said area in which the servo signal patterns written with two different servo signal frequencies are arranged on the same servo cylinders.

16. A disk medium according to claim 12, wherein two servo signal patterns having the same servo positioning information written with the servo signal frequencies of the adjoining servo signal frequency areas are arranged alternately with each other in said area in which the servo signal patterns written with two different servo signal frequencies are arranged on the same servo cylinders.

17. A disk medium in which a plurality of servo cylinders formed concentrically from the inner diametrical portion to the outer diametrical portion of the surface of at least one disk are divided into predetermined areas, and different servo signal frequencies are set for the divided predetermined areas, respectively, and a servo signal pattern of the servo signal frequency set for each of said areas is formed in each of said areas,
   wherein a servo signal pattern written with a servo signal frequency set in the area of a first servo signal frequency, and either a servo signal pattern written with a servo signal frequency set in the area of a second servo signal frequency adjoining said first servo signal frequency area or a servo signal pattern written with a servo signal frequency set in the area of a third servo signal frequency adjoining said first servo signal frequency area, are formed in said first servo signal frequency area on the same servo cylinders.

18. A disk medium in which a plurality of servo cylinders formed concentrically from the inner diametrical portion to the outer diametrical portion of the surface of at least one disk are divided into several areas, and different servo signal frequencies are set for different areas thus divided, respectively, and a servo signal pattern of the servo signal frequency set for each of said areas is formed in each of said areas, and the servo signal patterns written with a single servo signal frequency from the inner diametrical portion to the outer diametrical portion of said disk are formed on the same servo cylinders.

* * * * *